(12) United States Patent
Urbanski et al.

(10) Patent No.: US 12,254,061 B2
(45) Date of Patent: Mar. 18, 2025

(54) APPARATUSES AND METHODS TO ACCELERATE MATRIX MULTIPLICATION

(71) Applicant: Intel Corporation, Santa Clara, CA (US)

(72) Inventors: Maciej Urbanski, Gdansk (PL); Brian J. Hickmann, Sherwood, OR (US); Michael Rotzin, Santa Clara, CA (US); Krishnakumar Nair, Santa Clara, CA (US); Andrew Yang, Cupertino, CA (US); Brian S. Morris, Santa Clara, CA (US); Dennis Bradford, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 712 days.

(21) Appl. No.: 17/256,195

(22) PCT Filed: Sep. 27, 2018

(86) PCT No.: PCT/PL2018/000091
§ 371 (c)(1),
(2) Date: Dec. 26, 2020

(87) PCT Pub. No.: WO2020/067908
PCT Pub. Date: Apr. 2, 2020

(65) Prior Publication Data
US 2021/0263993 A1    Aug. 26, 2021

(51) Int. Cl.
*G06F 17/16*     (2006.01)
*G06F 7/523*     (2006.01)
*G06F 7/544*     (2006.01)

(52) U.S. Cl.
CPC .............. *G06F 17/16* (2013.01); *G06F 7/523* (2013.01); *G06F 7/5443* (2013.01); *G06F 2207/3824* (2013.01)

(58) Field of Classification Search
CPC .................. G06F 7/5443; G06F 17/16; G06F 2207/3824; G06F 5/01–012; G06F 7/38–575; G06F 7/523; H03M 7/24
See application file for complete search history.

(56) References Cited

U.S. PATENT DOCUMENTS

| | | | |
|---|---|---|---|
| 5,953,241 A | 9/1999 | Hansen et al. | |
| 6,205,462 B1 | 3/2001 | Wyland et al. | |
| (Continued) | | | |

OTHER PUBLICATIONS

A. Lopes and G. Constantinides, "A fused hybrid floating-point and fixed-point dot-product for FPGAs," in Reconfigurable Computing: Architectures, Tools and Applications, Berlin, Heidelberg: Springer Berlin Heidelberg, 2010, pp. 157-168. (Year: 2010).*

(Continued)

*Primary Examiner* — Emily E Larocque
(74) *Attorney, Agent, or Firm* — Akona IP PC

(57) ABSTRACT

Methods and apparatuses relating to performing vector multiplication are described. Hardware accelerators to perform vector multiplication are also described. In one embodiment, a combined fixed-point and floating-point vector multiplication circuit includes at least one switch to change the circuit between a first mode and a second mode, where in the first mode, each multiplier of a set of multipliers is to multiply mantissas from a same element position of a first floating-point vector and a second floating-point vector to produce a corresponding product, shift the corresponding products with a set of shift registers based on a maximum exponent of exponents for the corresponding products determined by a maximum exponent determiner to produce shifted products, perform an numeric conversion operation on the shifted products with a set of numeric conversion circuits based on sign bits from the same element position of the first floating-point vector and the second floating-point vector to produce signed representations of the shifted (Continued)

products, add the signed representations of the shifted products with a set of adders to produce a single product, and normalize the single product with a normalization circuit based on the maximum exponent into a single floating-point resultant, and in the second mode, each multiplier of the set of multipliers is to multiply values from a same element position of a first integer vector and a second integer vector to produce a corresponding product, and add each corresponding product with the set of adders to produce a single integer resultant.

25 Claims, 33 Drawing Sheets

(56) References Cited

U.S. PATENT DOCUMENTS

| | | | | |
|---|---|---|---|---|
| 6,282,634 | B1* | 8/2001 | Hinds | G06F 9/3455 |
| | | | | 712/210 |
| 6,480,872 | B1* | 11/2002 | Choquette | G06F 7/5443 |
| | | | | 708/603 |
| 8,930,433 | B2* | 1/2015 | Li | G06F 7/4812 |
| | | | | 708/511 |
| 10,275,247 | B2 | 4/2019 | Mishra et al. | |
| 2012/0079253 | A1* | 3/2012 | Wiedemeier | G06F 9/30018 |
| | | | | 712/222 |
| 2015/0067010 | A1* | 3/2015 | Czajkowski | G06F 7/485 |
| | | | | 708/209 |
| 2018/0157464 | A1* | 6/2018 | Lutz | G06F 7/483 |
| 2018/0321938 | A1* | 11/2018 | Boswell | G06F 9/3012 |
| 2019/0347072 | A1* | 11/2019 | Lo | G06F 17/16 |

OTHER PUBLICATIONS

T. M. Bruintjes, K. H. G. Walters, S. H. Gerez, B. Molenkamp, and G. J. M. Smit, 'Sabrewing: A Lightweight Architecture for Combined Floating-Point and Integer Arithmetic', ACM Trans. Archit. Code Optim., vol. 8, No. 4, Jan. 2012. (Year: 2012).*
N.a., "Virtex-6 FPGA Configuration User Guide," Xilinx, Inc., version 3.9, Nov. 2015, p. 17. (Year: 2015).*
Intention to grant, EP App. No. 18796143.8, Apr. 11, 2023, 9 pages.
Anil et al., "Area and Delay Efficient Fused Four Term Dot Product", International Journal of Innovative Research in Science, vol. 6, No. 5, May 2017, pp. 9016-9024.
IEEE Computer Society, "IEEE Standard for Floating-Point Arithmetic", Available Online at <http://www.dsc.ufcg.edu.br/~cnum/modulos/Modulo2/IEEE754_2008.pdf>, Microprocessor Standards Committee, IEEE Std 754(trademark), (Revision of IEEE Std 754-1985), Aug. 29, 2008, 70 pages.
International Preliminary Report on Patentability, PCT App. No. PCT/PL2018/000091, Apr. 8, 2021, 09 pages.
International Search Report and Written Opinion, PCT App. No. PCT/PL2018/000091, May 29, 2019, 11 pages.
Lopes et al., A Fused Hybrid Floating-Point and Fixed-Point Dot-product for FPGAs, Available Online at <http://cas.ee.ic.ac.uk/people/gac1/pubs/AntonioARC10.pdf>, 2010, 12 pages.
The Institute of Electrical and Electronics Engineers, Inc, "IEEE Standard for Binary Floating-Point Arithmetic", Available Online at <http://kfe.fjfi.cvut.cz/~klimo/nm/ieee754.pdf>, 1985, pp. 1-23.

* cited by examiner

1700

```
┌─────────────────────────────────────────────────────────────────┐
│ SWITCHING A CIRCUIT COMPRISING A SET OF MULTIPLIERS COUPLED TO A SET OF │
│ SHIFT REGISTERS COUPLED TO A SET OF UNSIGNED TO SIGNED CONVERSION │
│ CIRCUITS COUPLED TO A SET OF ADDERS, AND A MAXIMUM EXPONENT DETERMINER │
│ COUPLED TO THE SET OF SHIFT REGISTERS AND A NORMALIZATION CIRCUIT │
│ BETWEEN A FIRST MODE AND A SECOND MODE WITH AT LEAST ONE SWITCH │
│                              1702                                │
└─────────────────────────────────────────────────────────────────┘
                                 │
                                 ▼
┌─────────────────────────────────────────────────────────────────┐
│ IN THE FIRST MODE, EACH MULTIPLIER OF THE SET OF MULTIPLIERS MULTIPLYING │
│ MANTISSAS FROM A SAME ELEMENT POSITION OF A FIRST FLOATING-POINT VECTOR │
│ AND A SECOND FLOATING-POINT VECTOR TO PRODUCE A CORRESPONDING │
│ PRODUCT, SHIFTING THE CORRESPONDING PRODUCTS WITH THE SET OF SHIFT │
│ REGISTERS BASED ON A MAXIMUM EXPONENT OF EXPONENTS FOR THE │
│ CORRESPONDING PRODUCTS DETERMINED BY THE MAXIMUM EXPONENT │
│ DETERMINER TO PRODUCE SHIFTED PRODUCTS, PERFORMING AN UNSIGNED TO │
│ SIGNED CONVERSION OPERATION ON THE SHIFTED PRODUCTS WITH THE SET OF │
│ UNSIGNED TO SIGNED CONVERSION CIRCUITS BASED ON SIGN BITS FROM THE SAME │
│ ELEMENT POSITION OF THE FIRST FLOATING-POINT VECTOR AND THE SECOND │
│ FLOATING-POINT VECTOR TO PRODUCE SIGNED REPRESENTATIONS OF THE SHIFTED │
│ PRODUCTS, ADDING THE SIGNED REPRESENTATIONS OF THE SHIFTED PRODUCTS │
│ WITH THE SET OF ADDERS TO PRODUCE A SINGLE PRODUCT, AND NORMALIZING THE │
│ SINGLE PRODUCT WITH THE NORMALIZATION CIRCUIT BASED ON THE MAXIMUM │
│ EXPONENT INTO A SINGLE FLOATING-POINT RESULTANT │
│                              1704                                │
└─────────────────────────────────────────────────────────────────┘
                                 │
                                 ▼
┌─────────────────────────────────────────────────────────────────┐
│ IN THE SECOND MODE, EACH MULTIPLIER OF THE SET OF MULTIPLIERS MULTIPLYING │
│ VALUES FROM A SAME ELEMENT POSITION OF A FIRST FIXED-POINT VECTOR AND A │
│ SECOND FIXED-POINT VECTOR TO PRODUCE A CORRESPONDING PRODUCT, AND │
│ ADDING EACH CORRESPONDING PRODUCT WITH THE SET OF ADDERS TO PRODUCE A │
│ SINGLE FIXED-POINT RESULTANT │
│                              1706                                │
└─────────────────────────────────────────────────────────────────┘
```

FIG. 17

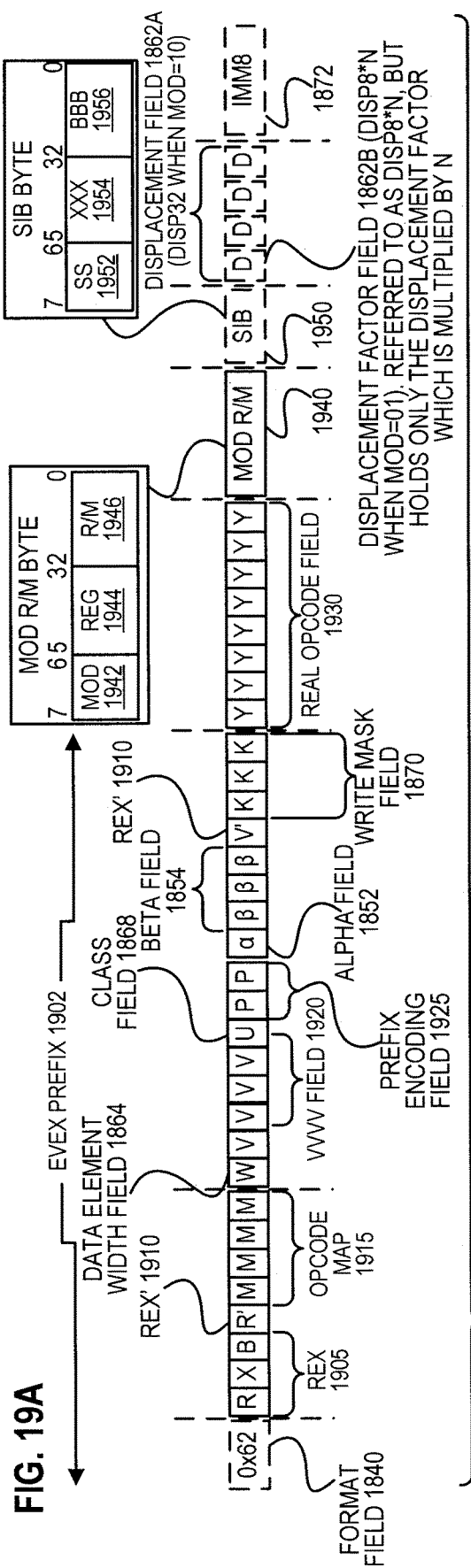
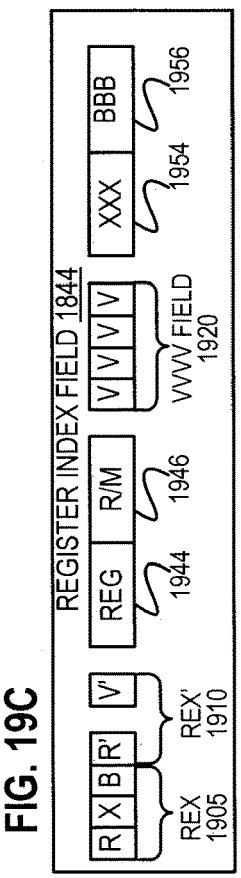
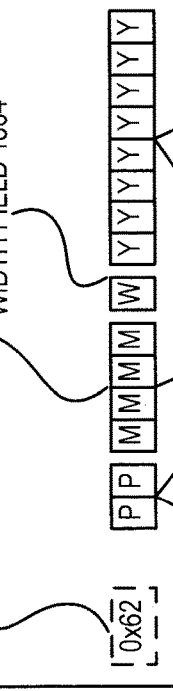
FIG. 19A
FIG. 19B
FIG. 19C

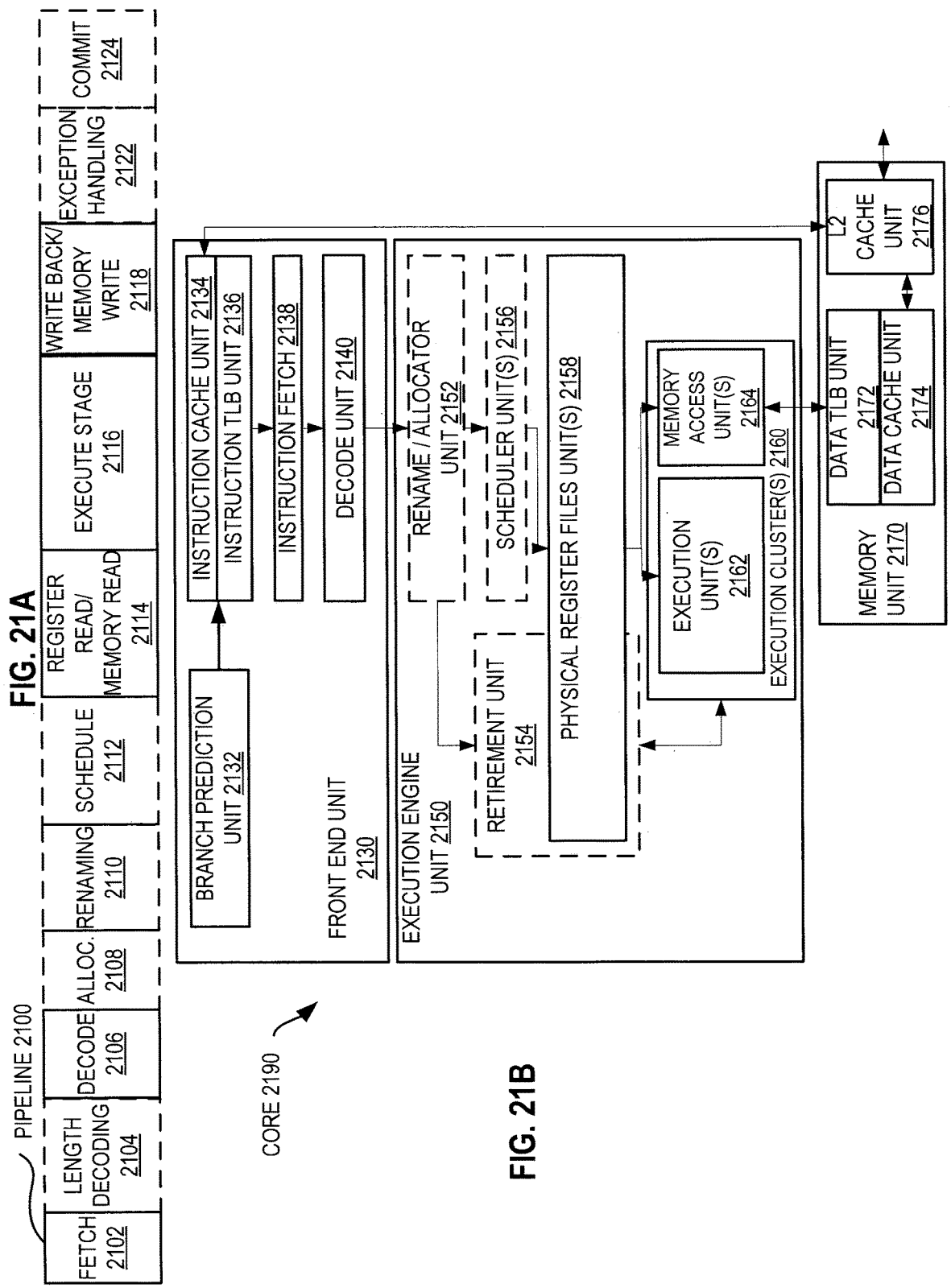

ion No. PCT/PL2018/000091, filed Sep. 27, 2018, and
APPARATUSES AND METHODS TO ACCELERATE MATRIX MULTIPLICATION

CROSS-REFERENCE TO RELATED APPLICATIONS

This application is a national stage of International Application No. PCT/PL2018/000091, filed Sep. 27, 2018, and titled: "Apparatuses and Methods to Accelerate Matrix Multiplication", which is incorporated herein by reference in its entirety.

TECHNICAL FIELD

The disclosure relates generally to electronics, and, more specifically, an embodiment of the disclosure relates to a hardware accelerator to perform vector multiplication.

BACKGROUND

A processor, or set of processors, executes instructions from an instruction set, e.g., the instruction set architecture (ISA). The instruction set is the part of the computer architecture related to programming, and generally includes the native data types, instructions, register architecture, addressing modes, memory architecture, interrupt and exception handling, and external input and output (I/O). It should be noted that the term instruction herein may refer to a macro-instruction, e.g., an instruction that is provided to the processor for execution, or to a micro-instruction, e.g., an instruction that results from a processor's decoder decoding macro-instructions.

BRIEF DESCRIPTION OF THE DRAWINGS

The present disclosure is illustrated by way of example and not limitation in the figures of the accompanying drawings, in which like references indicate similar elements and in which:

FIG. 17 illustrates a flow diagram according to embodiments of the disclosure.

FIG. 19A is a block diagram illustrating fields for the generic vector friendly instruction formats in FIGS. 18A and 18B according to embodiments of the disclosure.

FIG. 19B is a block diagram illustrating the fields of the specific vector friendly instruction format in FIG. 19A that make up a full opcode field according to one embodiment of the disclosure.

FIG. 19C is a block diagram illustrating the fields of the specific vector friendly instruction format in FIG. 19A that make up a register index field according to one embodiment of the disclosure.

FIG. 21A is a block diagram illustrating both an exemplary in-order pipeline and an exemplary register renaming, out-of-order issue/execution pipeline according to embodiments of the disclosure.

FIG. 21B is a block diagram illustrating both an exemplary embodiment of an in-order architecture core and an exemplary register renaming, out-of-order issue/execution architecture core to be included in a processor according to embodiments of the disclosure.

DETAILED DESCRIPTION

Figure 1:
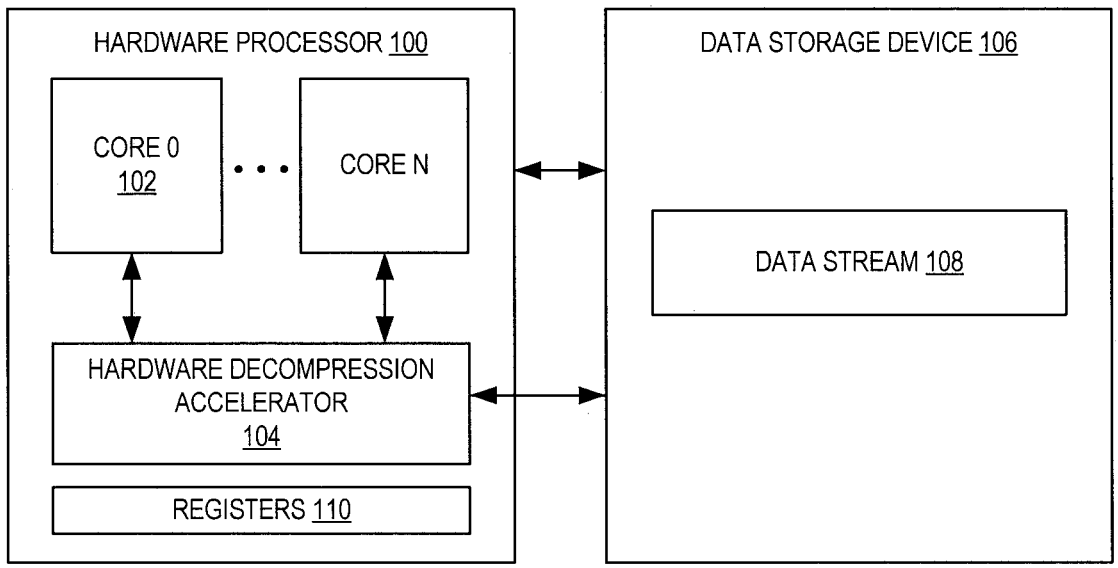
FIG. 1 illustrates a hardware processor with a hardware accelerator according to embodiments of the disclosure.

In the following description, numerous specific details are set forth. However, it is understood that embodiments of the disclosure may be practiced without these specific details. In other instances, well-known circuits, structures and techniques have not been shown in detail in order not to obscure the understanding of this description.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

A (e.g., hardware) processor (e.g., having one or more cores) may execute instructions (e.g., a thread of instructions) to operate on data, for example, to perform arithmetic, logic, or other functions. For example, software may request an operation and a hardware processor (e.g., a core or cores thereof) may perform the operation in response to the request. In one embodiment, a processor is coupled to an (e.g., on die or off die) accelerator (e.g., an offload engine) to perform one or more (e.g., offloaded) operations, for example, instead of those operations being performed only on the processor. In one embodiment, a processor includes an (e.g., on die or off die) accelerator (e.g., an offload engine) to perform one or more operations, for example, instead of those operations being performed only on the processor. Two non-limiting examples of operations are a vector multiplication operation and a matrix multiplication operation. In one embodiment, an accelerator performs an operation in response to a request for a processor (e.g., a central processing unit (CPU)) to perform that operation. An accelerator may be a hardware accelerator (e.g., accelerator circuit). An accelerator may couple to a data storage device (e.g., on die with an accelerator or off die) to store data, e.g., the input data and/or the output data. In one embodiment, an accelerator couples to an input data storage device (e.g., input buffer) to load input therefrom. In one embodiment, an accelerator couples to an output data storage device (e.g., output buffer) to store output thereon. A processor may execute an instruction to offload an operation or operations (e.g., an instruction, a thread of instructions, or other work) to an accelerator. The operations may be performed on numerical data having different formats (e.g., representations) in a computing system (e.g., accelerator and/or processor). In certain embodiments, a number is in fixed-point format or a floating-point format. An integer may be represented in a binary format. A signed integer may be represented in a two's (2's) complement format (e.g., where the leading being zero indicates a positive integer and a leading one indicates a negative integer). A (e.g., real) number may be represented in floating-point format, e.g., to represent, with a fixed number of digits, numbers of different orders of magnitude.

One example of a numerical format is where a number is generally approximated to a fixed number of significant digits (the significand) and scaled using an exponent in some fixed base (e.g., a base of two, ten, or sixteen). An example of a numerical format where S represents a sign bit, M. a mantissa, and E an exponent is as follows:

$$x = \text{significand} \times \text{base}^{exponent} \quad (1)$$

An example of a floating-point format is as follows:

$$x = (-1)^S \times 1 \cdot M \times 2^{E-bias} \quad (2)$$

In accordance with the IEEE 754 standard for binary floating-point (FP) arithmetic, the mantissa is an unsigned number (e.g., a binary fraction) and a normalized floating-point number has a single one in the most-significant-bit (MSB) position. In certain embodiments, this bit (e.g., to the left of the decimal point) is implicit and therefore the mantissa does not need to store it. In certain embodiments, the exponent is represented here as a non-negative integer from which a constant bias is subtracted. Examples of floating-point formats are floating point 16 (e.g., binary16), floating point 32 (e.g., binary32), floating point 64 (e.g., binary64), floating point 128 (e.g., binary128), and floating point 256 (e.g., binary256), although any number of sign, significand (e.g., mantissa thereof), or exponent bits may be used in certain embodiments. In one embodiment, binary16 format has one bit for the sign bit, 5 bits for the exponent, and 11 bits implicit (10 bits explicitly stored) for the significand. In one embodiment, binary32 format has one bit for the sign bit, 8 bits for the exponent, and 24 bits implicit (23 bits explicitly stored) for the significand. In one embodiment, binary64 format has one bit for the sign bit, 11 bits for the exponent, and 53 bits implicit (52 bits explicitly stored) for the significand. In one embodiment, binary128 format has one bit for the sign bit, 15 bits for the exponent, and 113 bits implicit (112 bits explicitly stored) for the significand. In one embodiment, binary256 format has one bit for the sign bit, 19 bits for the exponent, and 237 bits implicit (236 bits explicitly stored) for the significand.

Another number format is Flexpoint (Flex). Flexpoint is based on numbers with an N-bit mantissa storing an integer value in two's complement form, and an M-bit exponent e, shared across all elements of a tensor. This format is denoted as FlexN+M. As one example, a Flexpoint format with a 16-bit mantissa and 5-bit exponent may be referred to as flex16+5, in contrastto floating-point (FP) format. Flex number representation has a shared exponent for a given tensor. In certain embodiments, a vector (and/or matrix) multiply accelerator for Flexpoint is based on an integer circuit (e.g., pipeline) (e.g., as opposed to a purely floating-point pipeline) since Flexpoint is essentially an integer based system.

In certain embodiments, a vector (and/or matrix) multiply accelerator is included to perform operations on numbers in more than one format (e.g., fixed-point, Flexpoint, or floating point). In certain embodiments, a vector (and/or matrix) multiply accelerator is included to perform operations on numbers in any (e.g., all) of fixed-point, Flexpoint, or floating-point format.

FIG. 1 illustrates a hardware processor 100 with a hardware accelerator 104 according to embodiments of the disclosure. Hardware processor 100 (e.g., core 102) may receive a request (e.g., from software) to perform a vector multiplication (or matrix multiplication) thread (e.g., operation) and may offload (e.g., at least part of) the vector multiplication (or matrix multiplication) thread (e.g., operation) to a hardware accelerator (e.g., hardware accelerator 104). Hardware processor 100 may include one or more cores (0 to N). In one embodiment, each core may communicate with (e.g., be coupled to) hardware accelerator 104. In one embodiment, each core may communicate with (e.g., be coupled to) one of multiple hardware decompression accelerators. Core(s), accelerator(s), data storage device 106, and registers 110 may communicate (e.g., be coupled) with each other. Arrows indicate two way communication (e.g., to and from a component), but one way communication may be used. In one embodiment, a (e.g., each) core may communicate (e.g., be coupled) with the data storage device, for example, storing and/or outputting a data stream 108. Hardware accelerator may include any hardware (e.g., circuit or circuitry) discussed herein. In one embodiment, an (e.g., each) accelerator may communicate (e.g., be coupled) with the data storage device, for example, to receive a stream of vector data (e.g., elements thereof).

Figure 2:
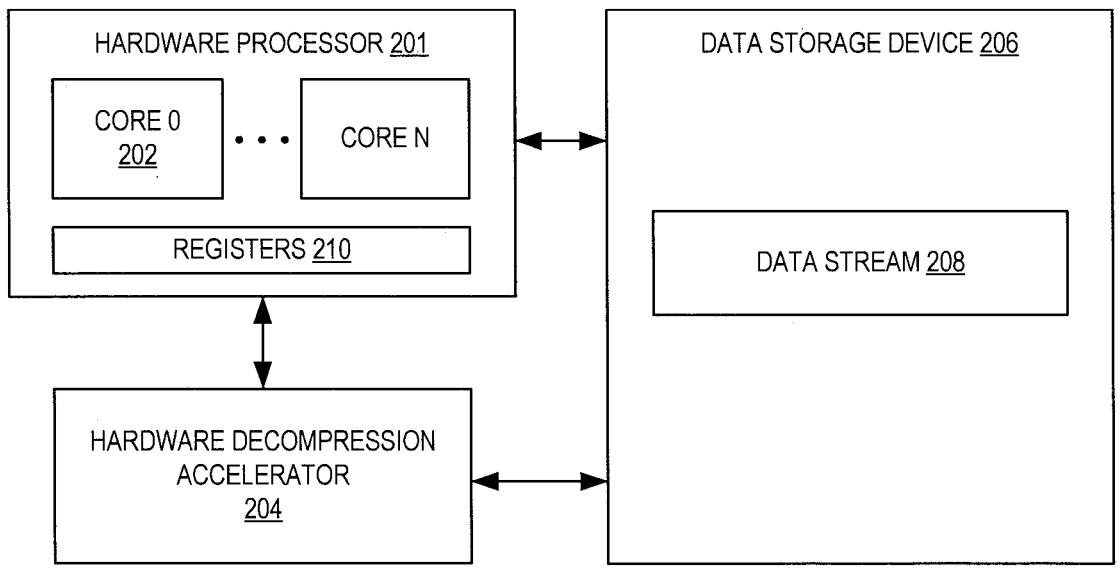
FIG. 2 illustrates a hardware processor and a hardware accelerator according to embodiments of the disclosure.

FIG. 2 illustrates a hardware processor 201 and a hardware accelerator 204 according to embodiments of the disclosure. In one embodiment, a hardware accelerator is on die with a hardware processor. In one embodiment, a hardware accelerator is off die of a hardware processor. In one embodiment, system 200 including at least a hardware processor 201 and a hardware accelerator 204 are a SoC. Hardware processor 201 (e.g., core 202) may receive a request (e.g., from software) to perform a vector (and/or matrix) thread (e.g., operation) and may offload (e.g., at least part of) the thread (e.g., operation) to a hardware accelerator (e.g., hardware accelerator 204). Hardware processor 201 may include one or more cores (0 to N). In one embodiment, each core may communicate with (e.g., be coupled to) hardware decompression accelerator 204. In one embodiment, each core may communicate with (e.g., be coupled to) one of multiple hardware accelerators. Core(s), accelerator(s), data storage device 206, and registers 210 may communicate (e.g., be coupled) with each other. Arrows indicate two way communication (e.g., to and from a component), but one way communication may be used. In one embodiment, a (e.g., each) core may communicate (e.g., be coupled) with the data storage device, for example, storing and/or outputting a data stream 208. Hardware accelerator may include any hardware (e.g., circuit or circuitry) discussed herein. In one embodiment, an (e.g., each) accelerator may communicate (e.g., be coupled) with the data storage device, for example, to receive a stream of vector data (e.g., elements thereof). Data stream 208 may be previously loaded into data storage device 206, e.g., by a hardware compression accelerator or a hardware processor.

A hardware accelerator may include one or more fixed-point (e.g., fixed-point only) adder circuits and/or fixed-point (e.g., fixed-point only) multiplier circuits. A hardware accelerator may include one or more floating-point (e.g., floating-point only) adder circuits and/or floating-point (e.g., floating-point only) multiplier circuits.

Figure 3:
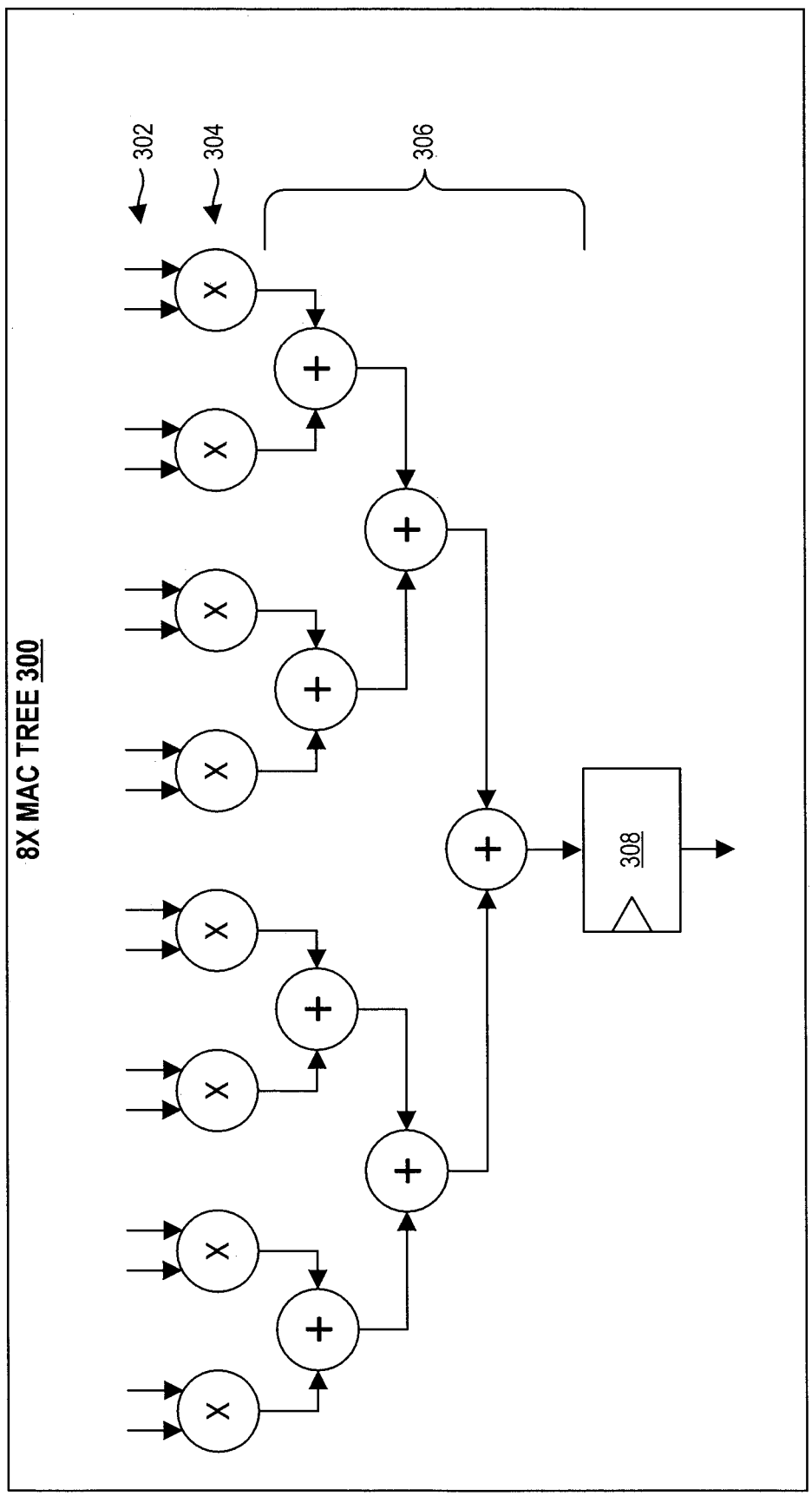
FIG. 3 illustrates a fixed-point multiplier and accumulator (MAC) tree circuit according to embodiments of the disclosure.

FIG. 3 illustrates a fixed-point multiplier and accumulator (MAC) tree circuit 300 according to embodiments of the disclosure. In one embodiment, the MAC tree circuit 300 is to take only fixed-point numbers in as inputs 302 (shown as 16 inputs). In one embodiment, each left input of a pair of inputs of multipliers 304 is a respective element of a first input vector and each right input of the pair of inputs of multipliers 304 is a respective element of a second input vector, for example, two input vectors that each have eight fixed-point elements (e.g., indexed as 0-7). Depicted MAC tree circuit 300 is to multiply pairs of inputs 302 together and then add those products together with adders 306 to generate a single resultant 308.

Figure 4:
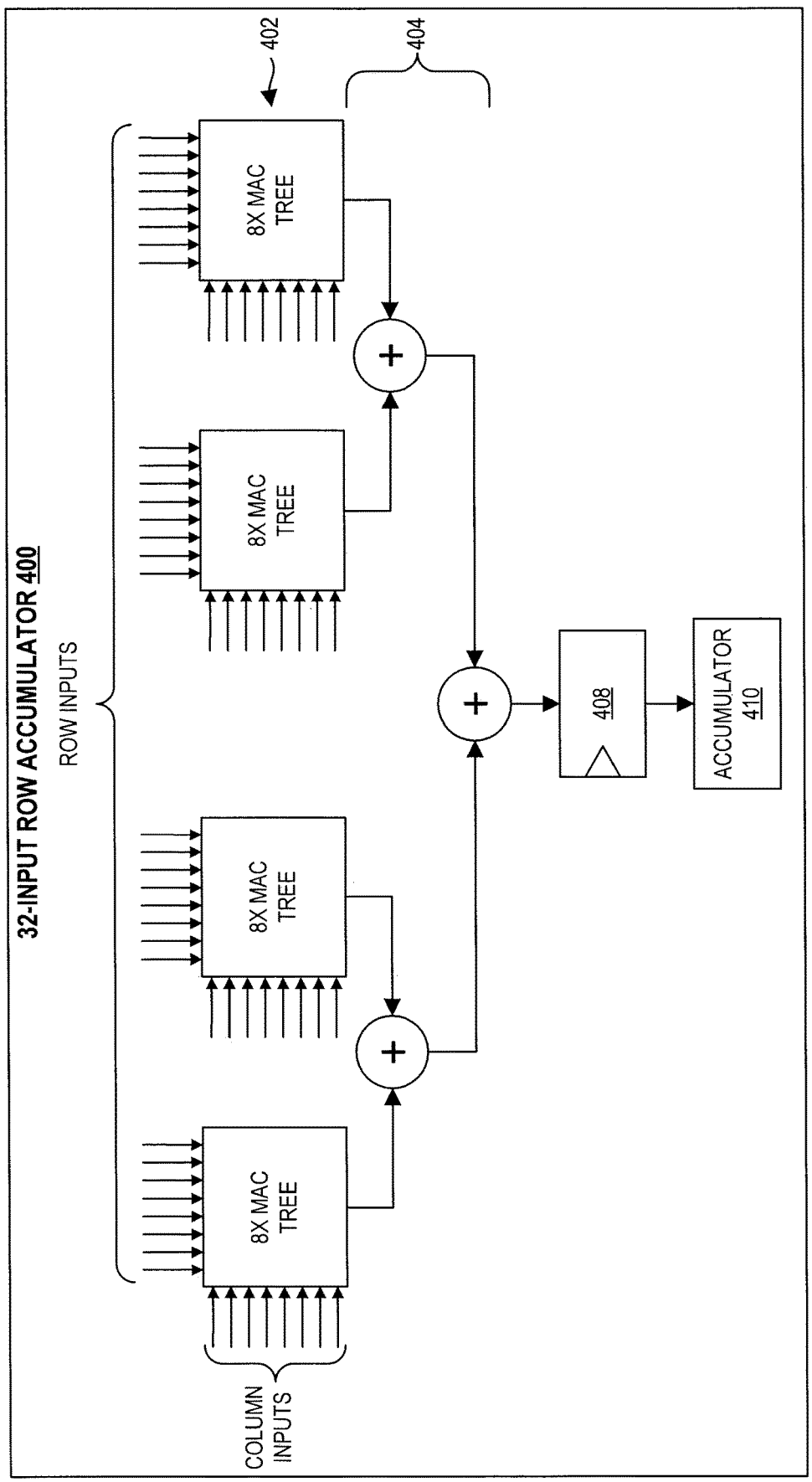
FIG. 4 illustrates a fixed-point accumulator circuit having multiple fixed-point multiplier and accumulator (MAC) tree circuits according to embodiments of the disclosure.

FIG. 4 illustrates a fixed-point accumulator circuit 400 (e.g., accelerator) having multiple fixed-point (e.g., integer) multiplier and accumulator (MAC) tree circuits 402 according to embodiments of the disclosure. In one embodiment, each MAC tree circuit 402 is an instance of a fixed-point (e.g., integer) MAC tree circuit 300 from FIG. 3. In the depicted embodiment, each output from MAC tree circuit 402 is added together with adders 404 to generate a single resultant 408, which may be accumulated with previous resultants with accumulator circuit 410.

Figure 5:
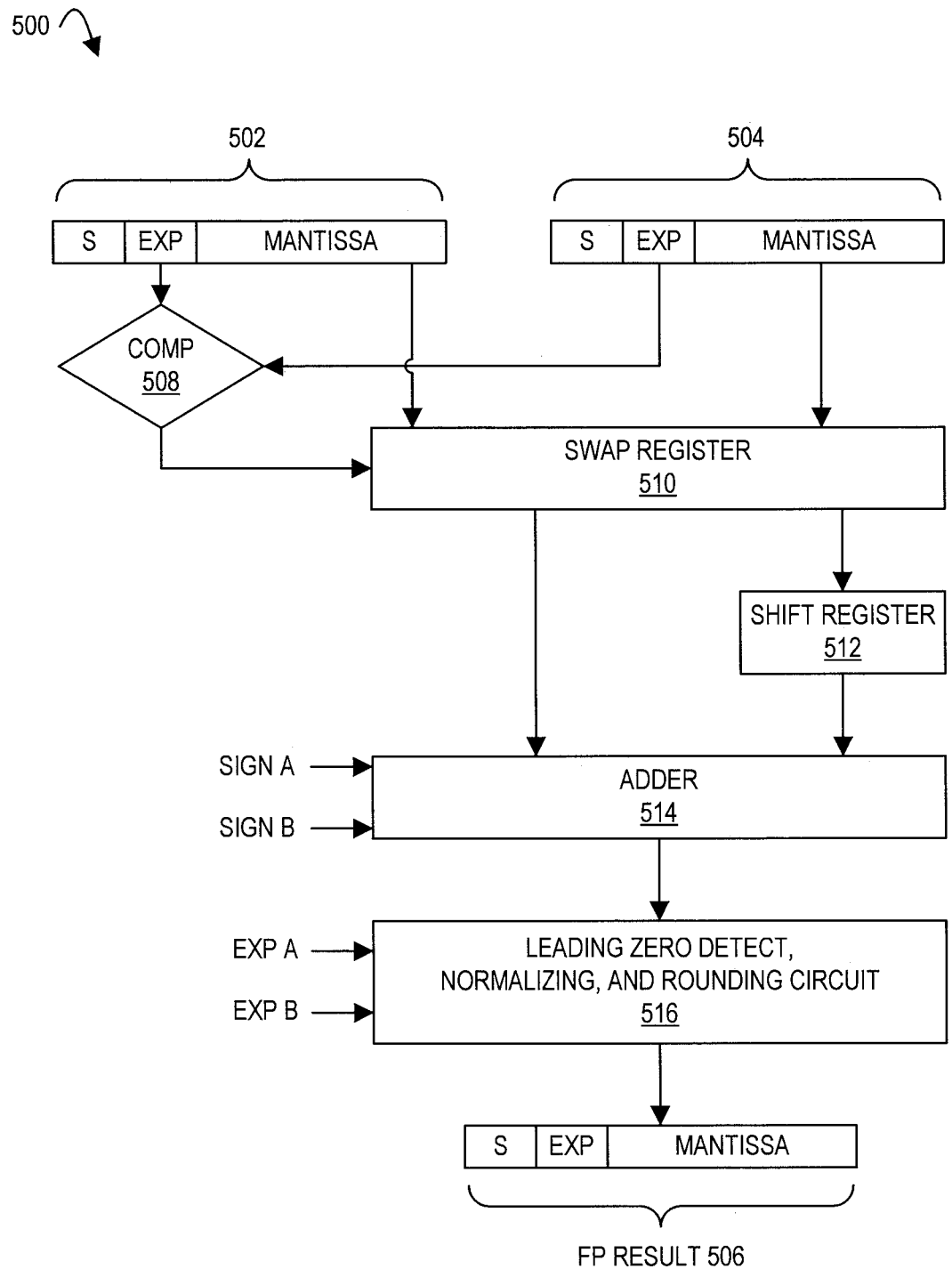
FIG. 5 illustrates a floating-point adder circuit according to embodiments of the disclosure.

FIG. 5 illustrates a floating-point adder circuit 500 according to embodiments of the disclosure. Floating-point adder circuit 500 is to add a first floating-point value (first input) 502 and a second floating-point value (second input) 504 to produce a resultant floating-point value (output) 506. Values may take any floating-point format, for example, depicted with a sign field (s) (e.g., SignA and Sign B, respectively for inputs 502 and 504), an exponent field (exp) (e.g., ExpA and ExpB, respectively for inputs 502 and 504), and a mantissa field (mantissa). Comparator (comp) 508 is to compare the exponents of the first floating-point value (first input) 502 and a second floating-point value (second input) 504, and swap the mantissa of first input value 502 and mantissa of second input value 504 in swap register 510 if the exponent of second input value 506 is greater than the exponent of first input value 504. Shift register 512 may shift a mantissa to align for the exponent thereof based on the exponent of the other mantissa (e.g., such that the mantissa of the lower number is aligned to the same magnitude of the larger number). Adder 514 (e.g., 2's complement adder or fixed-point adder) then adds the mantissa values of the first floating-point value (first input) 502 and a second floating-point value (second input) 504, and the leading zero detection, normalizing, and rounding circuit 516 to generate the resultant floating-point value (output) 506. In certain embodiments, it is required that the most significant digit of the significand of a non-zero number be non-zero (e.g., except when the corresponding exponent would be smaller than the minimum one). This process may generally be referred to as normalization. For binary formats (e.g., which uses only the digits 0 and 1), this non-zero digit is necessarily 1. Therefore, it does not need to be explicitly represented and allowing the format to have one more bit of implicit precision. This may also be referred to as the leading bit convention, the implicit bit convention, the hidden bit convention, or the assumed bit convention.

Figure 6:
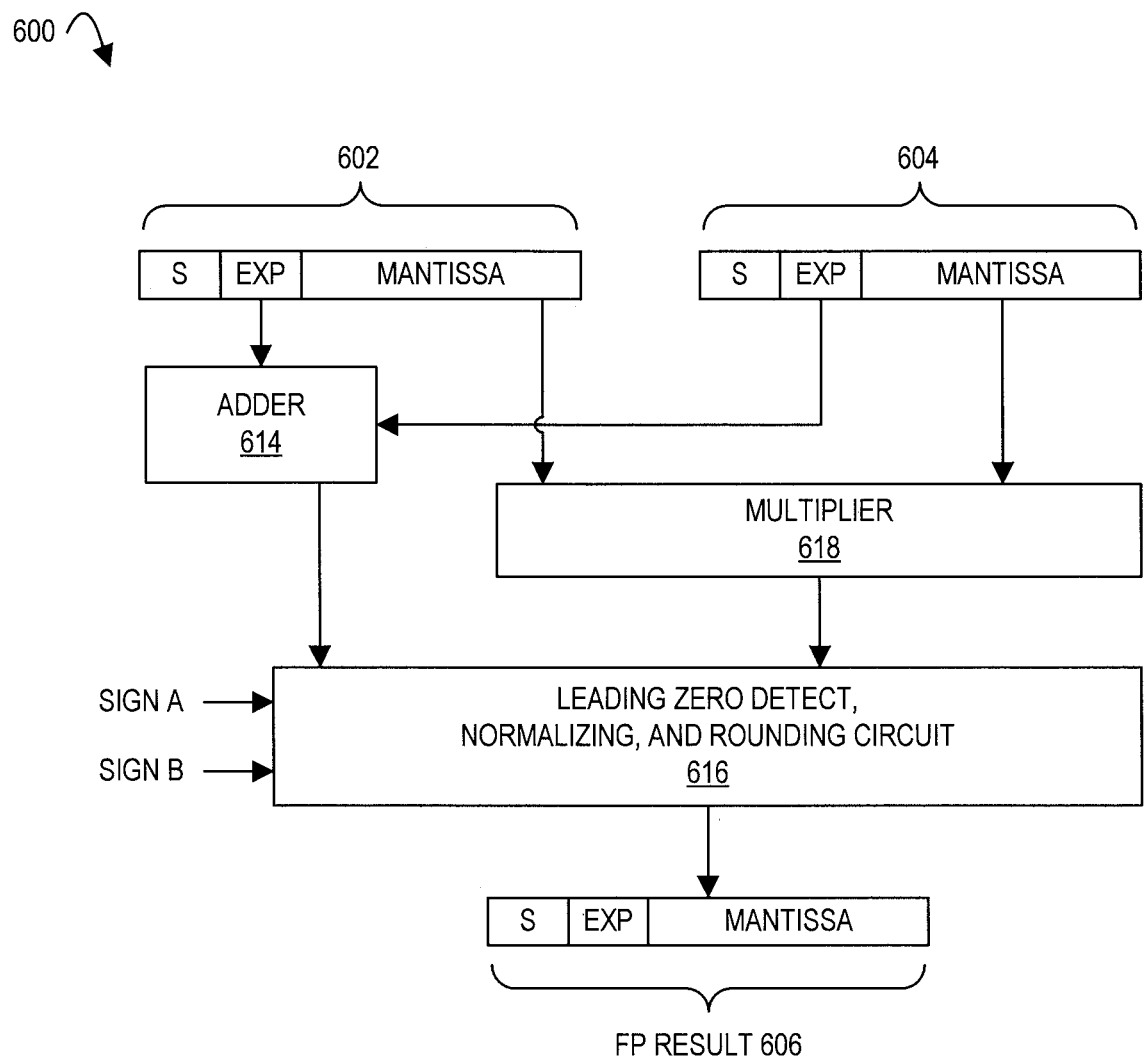
FIG. 6 illustrates a floating-point multiplier circuit according to embodiments of the disclosure.

FIG. 6 illustrates a floating-point multiplier circuit 600 according to embodiments of the disclosure. Floating-point multiplier circuit 600. Floating-point multiplier circuit 600 is to multiply a first floating-point value (first input) 602 and a second floating-point value (second input) 604 to produce a resultant floating-point value (output) 606. Adder circuit

614 is to add the exponents together from first floating-point value (first input) 602 and a second floating-point value (second input) 604. Multiplier 618 (e.g., 2's complement multiplier or fixed-point multiplier) is to multiply the mantissas together from first floating-point value (first input) 602 and a second floating-point value (second input) 604. The leading zero detection, normalizing, and rounding circuit 616 is to generate the resultant floating-point value (output) 606.

Figure 7:
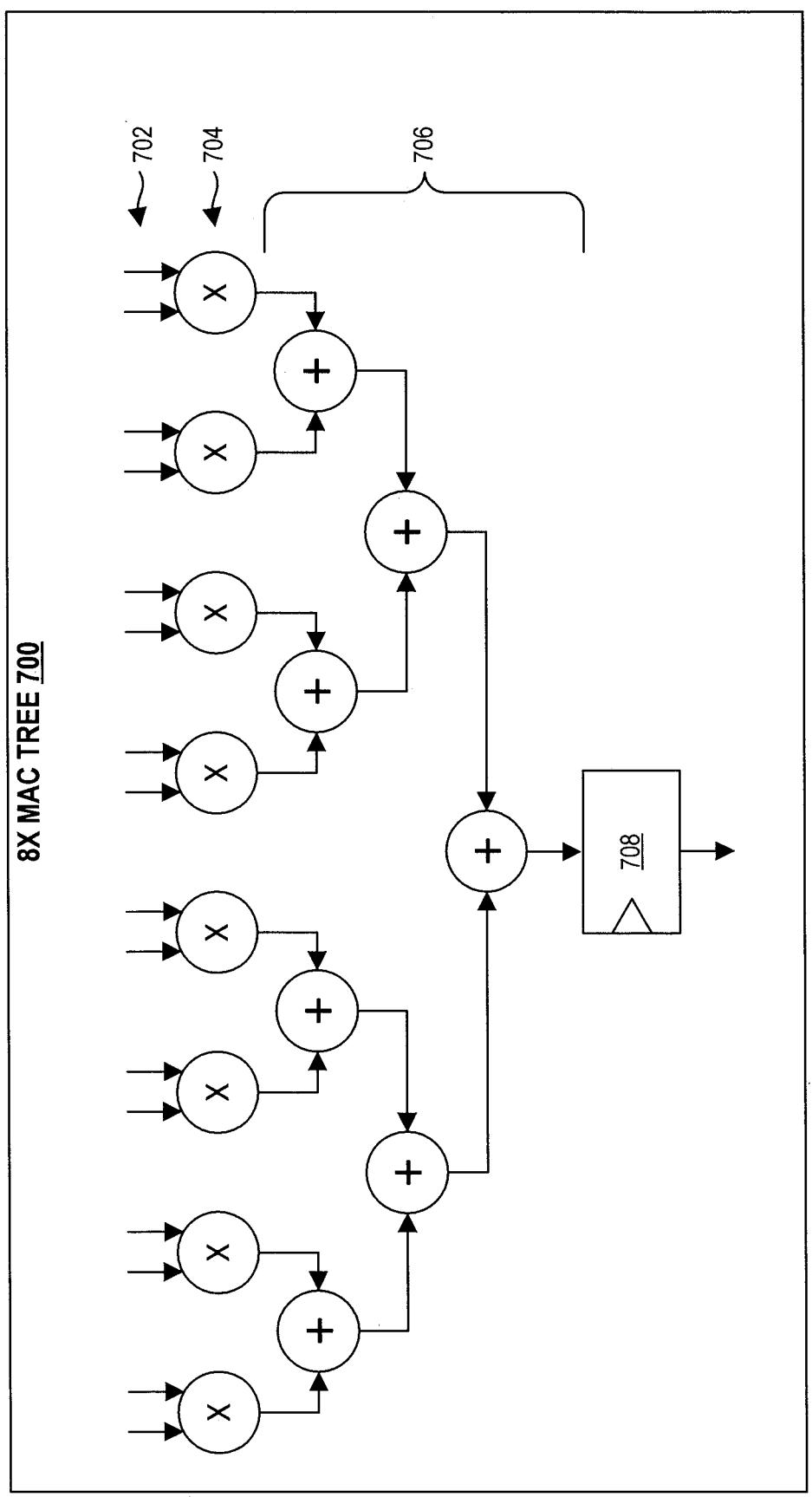
FIG. 7 illustrates a floating-point multiplier and accumulator (MAC) tree circuit according to embodiments of the disclosure.

FIG. 7 illustrates a floating-point multiplier and accumulator (MAC) tree circuit 700 according to embodiments of the disclosure. In one embodiment, the MAC tree circuit 700 is to take only floating-point numbers in as inputs 702 (shown as 16 inputs). In one embodiment, each left input of a pair of inputs of multipliers 704 is a respective element of a first input vector and each right input of the pair of inputs of multipliers 704 is a respective element of a second input vector, for example, two input vectors that each have eight floating-point elements (e.g., indexed as 0-7). Note that each element of a floating-point number may include multiple fields (e.g., a sign field, exponent field, and mantissa field for each element). Depicted MAC tree circuit 700 is to multiply pairs of inputs 702 together and then add those products together with adders 706 to generate a single resultant 708. In one embodiment, each of multipliers 704 is an instance of floating-point multiplier circuit 600 of FIG. 6 and/or each of adders 706 is an instance of floating-point adder circuit 500 of FIG. 5 (e.g., including multiple occurrences of exponent comparison, shifting, leading zero detection, and/or normalization).

Figure 8:
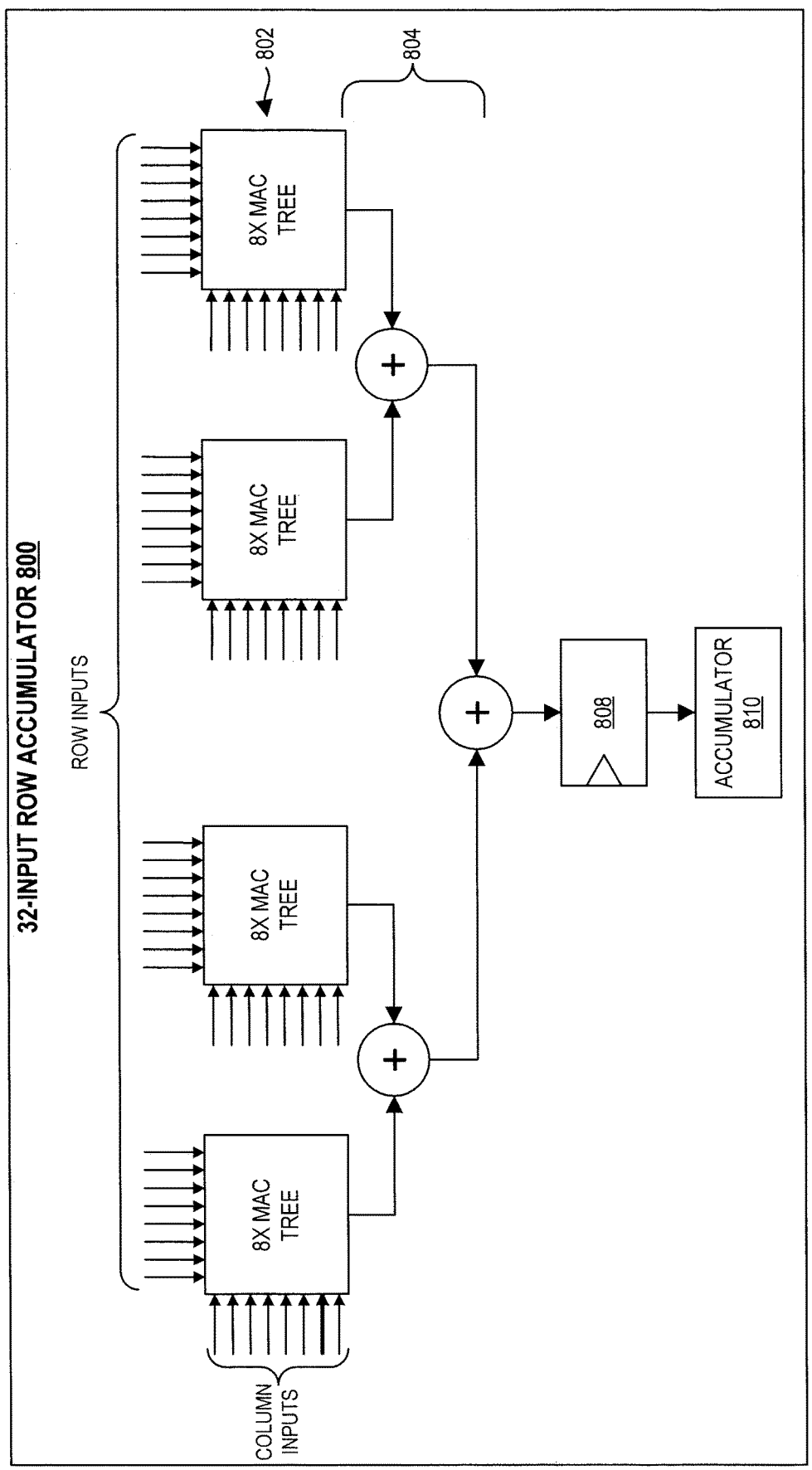
FIG. 8 illustrates a floating-point accumulator circuit having multiple floating-point multiplier and accumulator (MAC) tree circuits according to embodiments of the disclosure.

FIG. 8 illustrates a floating-point accumulator circuit 800 (e.g., accelerator) having multiple floating-point multiplier and accumulator (MAC) tree circuits 802 according to embodiments of the disclosure. In one embodiment, each MAC tree circuit 802 is an instance of a (e.g., floating-point) MAC tree circuit 700 from FIG. 7 and/or each of adders 804 is an instance of floating-point adder circuit 500 from FIG. 5. In the depicted embodiment, each output from MAC tree circuit 802 is added together with adders 804 to generate a single resultant 808, which may be accumulated with previous resultants with accumulator circuit 810.

Figure 9:
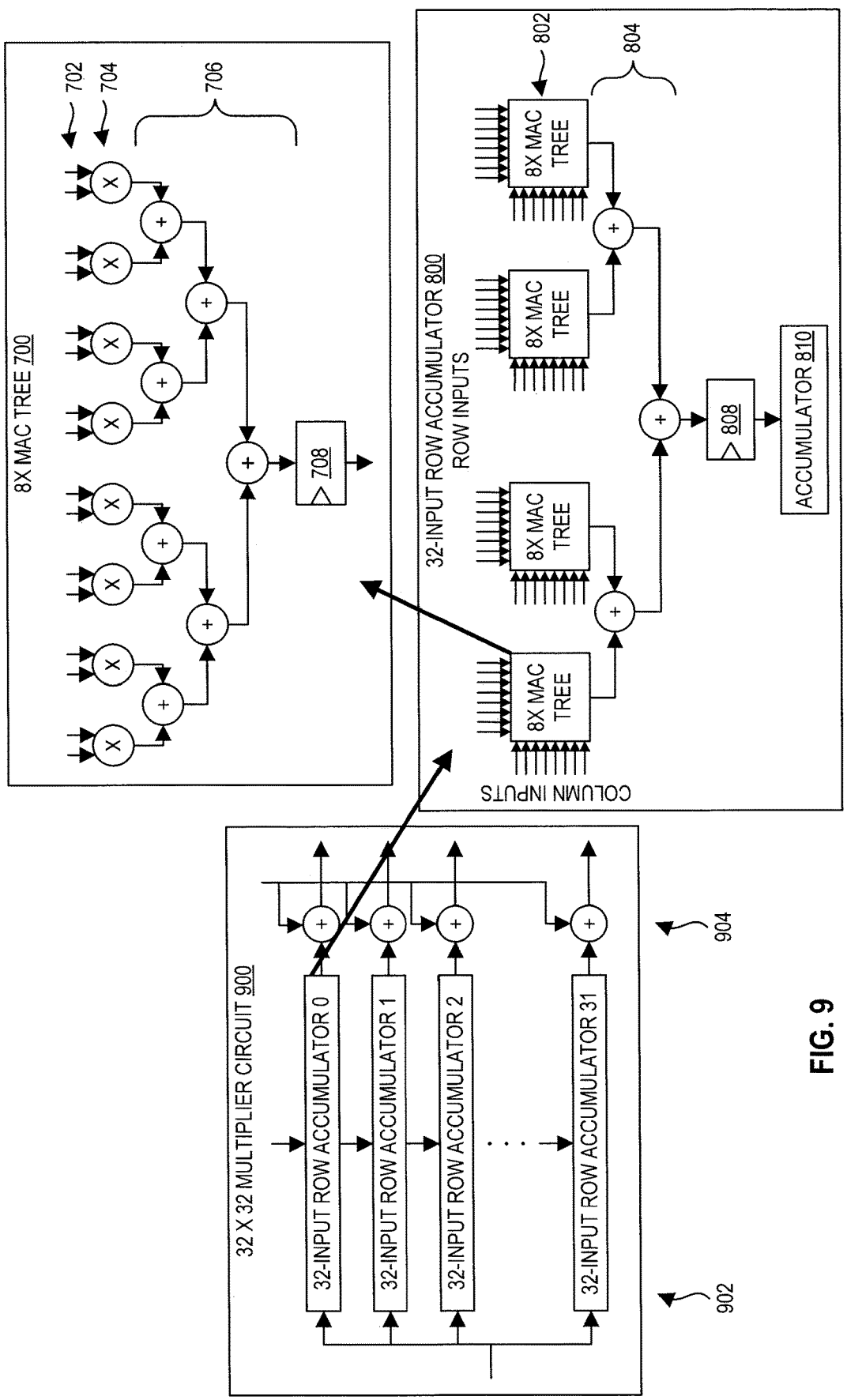
FIG. 9 illustrates a floating-point matrix multiplication circuit according to embodiments of the disclosure.

FIG. 9 illustrates a floating-point matrix multiplication circuit 900 according to embodiments of the disclosure. Floating-point matrix multiplication circuit 900 includes a plurality (e.g., 32, indexed as 0-31) of floating-point accumulator circuits 902 and may include a set of adders 904 to allow a summation of the accumulated outputs of the floating-point accumulator circuits 902. In one embodiment, each of floating-point accumulator circuits 902 is an instance of floating-point accumulator circuit 800 of FIG. 8 (e.g., with each of the four MAC trees an instance of MAC tree circuit 700 of FIG. 7).

In certain embodiments, a circuit includes multiple occurrences of exponent comparison, shifting, leading zero detection, and/or normalization (e.g., for every addition within a MAC tree and/or accumulator circuit). It may be desired to minimize the exponent comparison, shifting, leading zero detection, rounding, and/or normalization by a circuit, for example, to save circuit area (e.g., gate count) and power (e.g., energy) consumption by that circuit. Certain embodiments herein save circuit area and power (e.g., energy) consumption by having a single circuit (e.g., accelerator) for both fixed-point and floating-point operations, e.g., without having a separate fixed-point (e.g., integer) circuit and a separate floating-point circuit. In certain embodiments, a single circuit (e.g., accelerator) for both fixed-point and floating-point operations saves circuit area and power consumption compared to having a separate fixed-point (e.g., integer) circuit and a separate floating-point circuit. Utilizing such a single circuit effectively translates into higher operations per second as it increases the number of overall (e.g., vector and/or matrix multiply) circuits that can be instantiated for a given area and power budget. In one embodiment, the circuit is part of a processor (e.g., computer) and improves the functionality of the processor (e.g., computer) itself. Certain embodiments herein have a single circuit (e.g., accelerator) for any (e.g., all) of fixed-point, Flexpoint, and floating-point operations.

In reference to one embodiment of FIG. 7, there are seven instances of a floating-point addition that includes exponent comparison, shifting, leading zero detection, rounding, and/or normalization, for example, seven instances of floating-point adder circuit 500 of FIG. 5 and thus seven instances of the components therein (e.g., including the comparator 508, swap register 510, shift register 512, and/or leading zero detection, normalizing, and rounding circuit 516). Further in reference to that embodiment of FIG. 7, there are eight instances of a floating-point multiplication that includes exponent comparison, shifting, leading zero detection, rounding, and/or normalization, for example, eight instances of floating-point multiplier circuit 600 of FIG. 6 and thus eight instances of the components therein (e.g., including the leading zero detection, normalizing, and rounding circuit 616). In reference to an embodiment of FIG. 8 where each MAC tree circuit 802 is an instance of a floating-point MAC tree circuit 700 from FIG. 7 and each of adders 804 is an instance of floating-point adder circuit 500 from FIG. 5, the number of components (e.g., comparator 508, swap register 510, shift register 512, leading zero detection, normalizing, and rounding circuit 516, and/or the leading zero detection, normalizing, and rounding circuit 616) is even greater. In reference to an embodiment of FIG. 9 where each of floating-point accumulator circuits 902 is an instance of floating-point accumulator circuit 800 of FIG. 8, the number of components (e.g., comparator 508, swap register 510, shift register 512, leading zero detection, normalizing, and rounding circuit 516, and/or the leading zero detection, normalizing, and rounding circuit 616) is even greater yet. Certain embodiments herein minimize the number of replicated components (e.g., exponent comparison, shifting, leading zero detection, rounding, and/or normalization components) used, e.g., to perform a floating-point operation.

Certain embodiments herein provide a circuit for floating-point operations that minimizes the exponent comparison, shifting, leading zero detection, rounding, and/or normalization for the floating-point operations by the circuit (e.g., accelerator) by performing a single exponent comparison, shifting, leading zero detection, rounding, and/or normalization for a (e.g., each) vector multiplication (e.g., once in a pipeline), e.g., in contrast to performing an exponent comparison, shifting, leading zero detection, rounding, and/or normalization for each addition in the vector multiplication.

Certain embodiments herein provide a (e.g., fixed-point and floating-point) vector multiplication circuit that uses fixed-point multipliers (e.g., multiplier circuits) and fixed-point adders (e.g., adder circuits) to perform a floating-point vector multiplication by using a maximum exponent to quantize the fixed-point value(s) produced by the fixed-point multipliers and fixed-point adders into a floating-point resultant.

Figure 10:
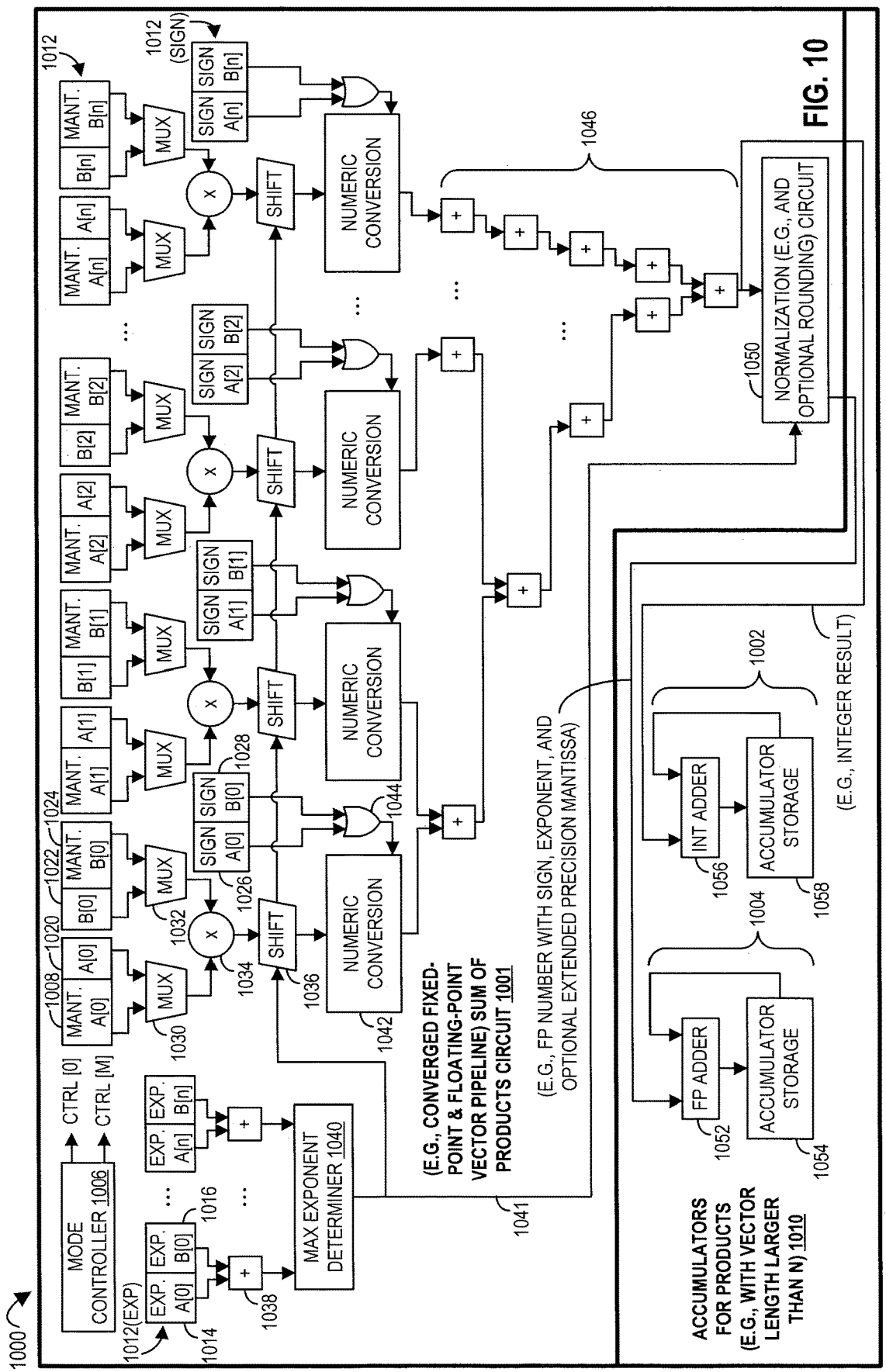
FIG. 10 illustrates a fixed-point and floating-point vector multiplication circuit with a fixed-point accumulator circuit and a floating-point accumulator circuit according to embodiments of the disclosure.

FIG. 10 illustrates a fixed-point and floating-point vector multiplication circuit 1000 with a fixed-point accumulator circuit 1002 and a floating-point accumulator circuit 1004 according to embodiments of the disclosure. Circuit 1000 includes a mode controller 1006 (e.g., circuit) to switch (e.g., select) between a fixed-point mode and a floating-point mode. In one embodiment, mode controller 1006 is to switch between (e.g., any of) fixed-point mode, Flexpoint mode, and floating-point mode. In one embodiment, a mode controller sends out a plurality of control values (e.g., 0 to M) to control the circuit components (e.g., switches). Circuit 1000 includes a sum of products circuit (e.g., pipeline) 1001 and accumulators 1010 (e.g., fixed-point accumulator circuit 1002 and floating-point accumulator circuit 1004). In the depicted embodiment, the floating-point (and/or Flexpoint) inputs (e.g., input registers) and fixed-point inputs are shown as being separate inputs. In one embodiment, a same register is used for either fixed-point data or floating-point data (e.g., or Flexpoint data). For example, a first register to store fixed-point data or floating-point data (e.g., or Flexpoint data) for a first vector (e.g., vector A) and a second register to store fixed-point data or floating-point data (e.g., or Flexpoint data) for a second vector (e.g., vector B). In one embodiment, a separate register is used for fixed-point data and floating-point data (e.g., and Flexpoint data). For example, a first register to store fixed-point data for a first, fixed-point vector (e.g., fixed-point vector A), a second register to store fixed-point data for a second, fixed-point vector (e.g., fixed-point vector B), a third register to store floating-point data for a third, floating-point vector (e.g., floating-point vector A), and a fourth register to store floating-point data for a fourth, floating-point vector (e.g., floating-point vector B). In one embodiment. Flexpoint data is stored in its own register(s). In one embodiment, inputs 1012 include an input for each element of a fixed-point vector (e.g., including input 1020 for a first element [0] of a first (e.g., integer) vector A (e.g., where integer vector A is separate or distinct from a floating-point vector A) and/or input 1022 for a first element [0] of a second (e.g., integer) vector B (e.g., where integer vector B is separate or distinct from a floating-point vector B)) and an input for each element (e.g., a sign bit (sign), exponent (exp), and mantissa of each element) of a floating-point vector (e.g., including input 1026 for the sign bit for a first element [0] of a first vector A, input 1014 for the exponent bits for the first element [0] of the first vector A, and input 1008 for the mantissa bits for the first element [0] of the first vector A, and/or including input 1026 for the sign bit for a first element [0] of a second vector B, input 1014 for the exponent bits for the first element [0] of the second vector B, and input 1008 for the mantissa bits for the first element [0] of the second vector B). In certain embodiments, inputs 1012 include an input for each element (e.g., an exponent and mantissa of each element) of a Flexpoint vector (e.g., including input 1014 for the exponent bits for the first element [0] of a first vector A and input 1008 for the mantissa bits for the first element [0] of the first vector A, and/or including input 1014 for the exponent bits for the first element [0] of a second vector B, and input 1008 for the mantissa bits for the first element [0] of the second vector B). In one embodiment, the vectors (e.g., A[N+1] and B[N+1]) to be operated on by combined (e.g., single) fixed-point and floating-point vector multiplication circuit 1000 have a same number of elements equal to N+1. N may be any positive integer in certain embodiments.

A reference number for the other inputs (e.g., for elements 1 through N) are not drawn in this figure so as not obfuscate the data flow/lines. Further, the control inputs/lines (e.g., for the switches, shifters, numeric conversion circuits (e.g., 2's complement circuits)) are not drawn so as not obfuscate the data flow/lines. Control inputs/lines to components may extend from a mode controller.

In certain embodiments, each element position (e.g., 0 to N) of the vectors to be processed includes a respective multiplier, shift register, and numeric conversion circuit (e.g., unsigned to signed conversion circuit) to process the mantissas in that element position, XOR logic gate, and/or an adder to process (e.g., add together) the exponents in that element position. Those set of components may be referred to as an element block (e.g., with N+1 element blocks in FIG. 10).

First Mode

In one embodiment, mode controller (e.g., via a request to perform a sum of products operation) is in a first (e.g., floating-point) mode to perform an operation on floating-point input data.

As one example, in the first (e.g., floating-point) mode, each of these floating-point numbers is partitioned into its sign-bit, exponent-bits, and mantissa-bits. At this initial partitioning, the leading hidden bit which can be 1 or 0, depending on the exponent, is concatenated on to the mantissa. Subsequently a pair-wise multiplication is performed between corresponding mantissas of each vector, exponents are added together, and respective sign-bits are logically XORed. At the output of the multiplication stage, the mantissas can be truncated or expanded into a desirable internal bit length (e.g., word-length) to trade-off resource utilization with solution accuracy. In parallel, all the exponents are compared in a tree with $\log_2$ n of stages. The highest exponent becomes the reference and all the mantissas are aligned to this reference. After this alignment, the mantissas are converted into a fixed-point (e.g., 2's complement) number representation. In one embodiment of the next stage, the sum-reduction is performed on the mantissas, and at each level of this reduction-tree the bit-length (e.g., word-length) is increased by one bit to prevent overflow. After this summation, the fixed-point number is reconverted to sign and magnitude, aligned to drop the leading one, and the exponent corrected. From these values, a standards compliant floating-point number is generated and output in this example. In one embodiment, the standard is an IEEE floating-point arithmetic standard (e.g., 754-2008—the IEEE Computer Society's Standard for Floating-Point Arithmetic published on Aug. 29, 2008).

As another example, in the first mode, input sourcing switches (for example, multiplexers, e.g., multiplexers 1030 and 1032) are sent a control value to source a pair of mantissas from corresponding (e.g., having the same element position in the vectors) elements of the input vectors (e.g., sourcing mantissas of both elements with index 0 of floating-point vectors A and B as one pair, mantissas of both elements with index 1 of floating-point vectors A and B as a second pair, mantissas of both elements with index 2 of floating-point vectors A and B as a third pair, etc.). In this example, each pair of mantissas are multiplied together by a multiplier to produce a respective product (e.g., n+1 corresponding products in this Figure), for example, mantissa A[0] 1008 from the element having index 0 of vector A and mantissa B[0] 1024 from the element having index 0 of vector B are multiplied by (e.g., fixed-point) multiplier 1034 to produce a product. The products from each multiplier in the depicted embodiment are output to a shift register (e.g., shifter) to shift (e.g., move) each product based on its determined exponent (e.g., of the products) and a maximum exponent (e.g., of the products). In this example, a pair of exponents from corresponding (e.g., having the same element position in the vectors) elements of the input vectors (e.g., sourcing exponents of both elements with index 0 of floating-point vectors A and B as one pair, exponents of both elements with index 1 of floating-point vectors A and B as a second pair, exponents of both elements with index 2 of floating-point vectors A and B as a third pair, etc.) are added together by a respective (e.g., fixed-point) (e.g., integer) adder to produce a sum of the exponents (e.g., the exponent of the product of a pair of elements from vector A and vector B). In this example, the sum of the exponents (e.g., n+1 sums in this Figure) are each input into a maximum exponent determiner 1040 (e.g., comparator circuit). For example, the exponent A[0] 1014 from the element having index 0 of vector A and exponent B[0] 1016 from the element having index 0 of vector B are added together by (e.g., fixed-point) (e.g., integer) adder 1038 to produce the sum of exponent A[0] 1014 and exponent B[0] 1016. The maximum exponent determiner 1040 (e.g., circuit) is then to compare the sums of the exponents against each other to determine the maximum (e.g., largest value) of the sums of the exponents, e.g., the maximum exponent of the exponents for the corresponding products of mantissas. In one embodiment, the maximum of the sums of the exponents is the maximum exponent of the mantissa products. The maximum exponent in the depicted embodiment is then used to shift the other mantissa products accordingly, e.g., to align the other mantissa products to the maximum exponent. In one embodiment, a maximum exponent is 4 (e.g., the sum of two exponents each having a value of 2), and the other of the exponents is 3, so the mantissa product for the others of the exponents is shifted one place (e.g., one element) (e.g., to the left) to align the mantissa products to have a same exponent as the maximum exponent. In the depicted embodiment, the maximum exponent (e.g., a value indicative of the maximum exponent) is output along path 1041 to the set of shift registers (e.g., including to shift register 1036) (e.g., shown as the horizontal lines going between each of the shift registers from shift register 1036) and normalization circuit 1050. In this example, each shifted mantissa product is output to a respective numeric conversion circuit (e.g., 2's complement circuit) (e.g., unsigned to signed conversion circuit). For example, numeric conversion circuit 1042 (e.g., 2's complement circuit) receiving an unsigned (e.g. and shifted) mantissa product output from shift register 1036. Each respective numeric conversion circuit (e.g., 2's complement circuit) is to then convert the (e.g., shifted) mantissa product from an unsigned format (e.g., value) to a signed format (e.g., value). In one embodiment, this conversion is a 2's complement operation performed on the (e.g., shifted) mantissa product (for example, to convert from unsigned (e.g., binary) format to 2's complement format) based on the output from each respective XOR logic gate (e.g., that output indicating a positive mantissa product or a negative mantissa product).

In one embodiment, a shift register passes a value through without shifting, e.g., when the maximum exponent (e.g., sum of two exponents) is the same as the exponent for the index position, e.g., where numeric conversion circuit 1042 and shift register 1036 are used for index position 0 of the input vectors.

In the depicted embodiment, each sign bit for a pair of sign bits from corresponding (e.g., having the same element position in the vectors) elements of the input vectors (e.g., sourcing sign bits of both elements with index 0 of floating-point vectors A and B as one pair, sign bits of both elements with index 1 of floating-point vectors A and B as a second pair, sign bits of both elements with index 2 of floating-point vectors A and B as a third pair, etc.) are logically, exclusively ORed (XORed) together by a respective (e.g., fixed-point) logic gate that implements an XOR to produce a value that indicate if the mantissa product is negative or positive, for example, the value being 0 for positive and 1 for negative. In the depicted embodiment, XOR logic gate 1044 receives a sign bit from input 1026 for the first element [0] of the first vector A and a sign bit from input 1028 for the first element [0] of the second vector B and outputs a first value (e.g., 1 indicating the product is negative) when only one of the inputs 1026, 1028 is a 1 to indicate false (e.g., negative) and a second value (e.g., 0 indicating the product is positive) otherwise.

The converted (e.g., signed) values for each pair of elements (e.g., at a same element position) are then all added together with the set of (e.g., fixed-point) (e.g., integer) adders 1046 into a single product. Normalization circuit 1050 is then used in this first mode to convert the single product into a floating-point representation based on the maximum exponent. In one embodiment, circuit 1050 is to further perform a rounding or other operation to convert the (e.g., integer) format of the single product into floating-point format to create the resultant of the sum of products circuit 1001. In one embodiment, normalization circuit 1050 moves the most significant digit of the significand (e.g., the single product) of a non-zero number to be non-zero (e.g. and moves the maximum exponent value accordingly according to the move of the single product).

Second Mode

In one embodiment, mode controller (e.g., via a request to perform a sum of products operation) is in a second (e.g., fixed-point) mode to perform an operation on fixed-point input data.

As one example, in the second (e.g., fixed-point) mode, the sum of products circuit is to multiply each pair of fixed-point (e.g., integer) values from a same element position (e.g., 0 to N) of the input vectors to be a product, and sum those products to produce a single, fixed-point resultant.

As another example, in the second (e.g., fixed-point) mode, input sourcing multiplexers (e.g., multiplexers 1030 and 1032) are sent a control value to source a pair of values from corresponding (e.g., having the same element position in the vectors) elements of the input vectors (e.g., sourcing values of both elements with index 0 of fixed-point vectors A and B as one pair, values of both elements with index 1 of fixed-point vectors A and B as a second pair, values of both elements with index 2 of fixed-point vectors A and B as a third pair, etc.). In this example, each pair of values are multiplied together by a multiplier to produce a respective product (e.g., n+1 corresponding products in this Figure), for example, value A[0] 1020 from the element having index 0 of vector A and value B [0] 1022 from the element having index 0 of vector B are multiplied by (e.g., fixed-point) multiplier 1034 to produce a product. The products from each multiplier in the depicted embodiment are output to a respective shift register (e.g., shifter), but in the second mode the products pass through the shift register without being changed, e.g., the products are not shifted (e.g., moved). In this example, each unshifted products output from each shift register are input into a respective numeric conversion circuit (e.g., 2's complement circuit), but in the second mode the products pass through the numeric conversion circuit without being changed, e.g., the products are already in 2's complement representation so they are not further converted. The (e.g., signed) products for each pair of elements (e.g., at a same element position) are then all added together with the set of (e.g., fixed-point) (e.g., integer) adders 1046 into a single fixed-point resultant. In one embodiment, the single fixed-point resultant passes through normalization circuit 1050 without any modification to the single fixed-point resultant.

Third Mode

In one embodiment, mode controller (e.g., via a request to perform a sum of products operation) is in a third (e.g., Flexpoint) mode to perform an operation on Flexpoint input data.

As one example, in the third (e.g., Flexpoint) mode, each of these Flexpoint numbers is partitioned into exponent-bits, and integer (2's complement) mantissa-bits, e.g., instead of binary mantissa-bits as in a floating-point format. Subsequently a pair-wise multiplication is performed between corresponding mantissas of each vector, and exponents are added together. At the output of the multiplication stage, the mantissas can be truncated or expanded into a desirable internal bit length (e.g., word-length) to trade-off resource utilization with solution accuracy. In parallel, all the exponents are compared in a tree with $\log_2 n$ of stages. The highest exponent becomes the reference and all the mantissas are aligned to this reference. After this alignment in one embodiment of the third mode, the mantissas are not converted into a fixed-point (e.g., 2's complement) number representation as they are already in that format. In one embodiment of the next stage, the sum-reduction is performed on the mantissas, and at each level of this reduction-tree the bit-length (e.g., word-length) is increased by one bit to prevent overflow. After this summation, on one embodiment, the resultant (e.g., mantissa and exponent) is shifted to the desired magnitude (e.g., in a FlexN+M format discussed above).

As another example, in the third mode, input sourcing multiplexers (e.g., multiplexers 1030 and 1032) are sent a control value to source a pair of Flexpoint (2's complement) mantissas from corresponding (e.g., having the same element position in the vectors) elements of the input vectors (e.g., sourcing mantissas of both elements with index 0 of Flexpoint vectors A and B as one pair, mantissas of both elements with index 1 of Flexpoint vectors A and B as a second pair, mantissas of both elements with index 2 of Flexpoint vectors A and B as a third pair, etc.). In this example, each pair of mantissas are multiplied together by a multiplier to produce a respective product (e.g., n+1 corresponding products in this Figure), for example, mantissa A[0] 1008 from the element having index 0 of vector A and mantissa B[0] 1024 from the element having index 0 of vector B are multiplied by (e.g., fixed-point) multiplier 1034 to produce a product. The products from each multiplier in the depicted embodiment are output to a shift register (e.g., shifter) to shift (e.g., move) each product based on its determined exponent (e.g., of the products) and a maximum exponent (e.g., of the products). In this example, a pair of exponents from corresponding (e.g., having the same element position in the vectors) elements of the input vectors (e.g., sourcing exponents of both elements with index 0 of Flexpoint vectors A and B as one pair, exponents of both elements with index 1 of Flexpoint vectors A and B as a second pair, exponents of both elements with index 2 of Flexpoint vectors A and B as a third pair, etc.) are added together by a respective (e.g., fixed-point) (e.g., integer) adder to produce a sum of the exponents (e.g., the exponent of the product of a pair of elements from vector A and vector B). In this example, the sum of the exponents (e.g., n+1 sums in this Figure) are each input into a maximum exponent determiner 1040 (e.g., comparator circuit). For example, the exponent A[0] 1014 from the element having index 0 of vector A and exponent B[0] 1016 from the element having index 0 of vector B are added together by (e.g., fixed-point) (e.g., integer)adder 1038 to produce the sum of exponent A[0] 1014 and exponent B[0] 1016. The maximum exponent determiner 1040 (e.g., circuit) is then to compare the sums of the exponents against each other to determine the maximum (e.g., largest value) of the sums of the exponents, e.g., the maximum exponent of the exponents for the corresponding products of mantissas. In one embodiment, the maximum of the sums of the exponents is the maximum exponent of the mantissa products. The maximum exponent in the depicted embodiment is then used to shift the other mantissa products accordingly, e.g., to align the other mantissa products to the maximum exponent. In one embodiment, a maximum exponent is 6 (e.g., the sum of two exponents each having a value of 3), and the other of the exponents is 4, so the mantissa product for the others of the exponents is shifted two places (e.g., two elements) (e.g., to the left) to align the mantissa products to have a same exponent as the maximum exponent. In the depicted embodiment, the maximum exponent (e.g., a value indicative of the maximum exponent) is output along path 1041 to the set of shift registers (e.g., including shift register 1036) and normalization circuit 1050. In this example, each shifted mantissa product is output into a respective numeric conversion circuit (e.g., 2's complement circuit), but in the third mode the products pass through the numeric conversion circuit without being changed, e.g., the products are already in 2's complement representation so they are not further converted.

In one embodiment, a shift register passes a value through without shifting, e.g., when the maximum exponent (e.g., sum of two exponents) is the same as the exponent for the index position, e.g., where numeric conversion circuit 1042 and shift register 1036 are used for index position 0 of the input vectors.

In the depicted embodiment, the shifted mantissa products for each pair of elements (e.g., at a same element position) are then all added together with the set of (e.g., fixed-point) (e.g., integer) adders 1046 into a single product. Normalization circuit 1050 may then be used in this third mode to convert the single product into a Flexpoint representation based on the maximum exponent. In one embodiment, instead of a full normalization operation in this mode, circuit 1050 is to perform a rounding to reduce the bit width of the sum from adders 1046 to the desired bit width of the Flexpoint format to create the resultant of the sum of products circuit 1001 (e.g., where the exponent has no impact on this reduction and the sign is already accounted because the fixed-point representation is 2's complement). In one embodiment, circuit 1050 moves the most significant digit of the significand (e.g., the single product) of a non-zero number to be non-zero (e.g. and moves the maximum exponent value accordingly according to the move of the single product).

Accumulators

Optionally, the circuit 1000 includes accumulators 1010 to accumulate resultants from the sum of products circuit 1001. In one embodiment, a separate fixed-point accumulator circuit 1002 and floating-point accumulator circuit 1004 are used in accumulators 1010. In certain embodiments, the mode controller 1006 being in the first mode causes the resultants from the sum of products circuit 1001 to be (e.g., only) accumulated with floating-point accumulator circuit 1004 and/or the mode controller 1006 being in the second mode causes the resultants from the sum of products circuit 1001 to be (e.g., only) accumulated with fixed-point accumulator circuit 1002. Depicted fixed-point accumulator circuit 1002 includes a (e.g., fixed-point) (e.g., integer) adder 1056 and fixed-point accumulator storage 1058. Depicted floating-point accumulator circuit 1004 includes a floating-point adder 1052 and floating-point accumulator storage 1054. In one embodiment, floating-point adder 1052 is an instance of floating-point adder circuit 500 from FIG. 5.

In certain embodiments, circuit 1000 receives a value (e.g., from a core offloading to an accelerator embodiment of circuit 1000) indicating the iterations to be performed by the sum of products circuit 1001, e.g., to decouple the width of a vector (e.g., having a number of elements greater than N+1) to be processed by the circuit 1000 from the hardware width (e.g., a vector having a maximum of N+1 elements) of the sum of products circuit 1001. In one embodiment, circuit 1000 is to notify to the requesting entity (e.g., core) of completion by performing a notification action (e.g., raising a flag so that the appropriate accumulator storage 1054 or accumulator storage 1058 is read by the requesting entity). In one embodiment, the floating-point accumulator (e.g., adder) or fixed-point accumulator (e.g., adder) is used to accumulate Flexpoint resultants from circuit 1001, for example, not using the sign field in floating-point accumulator (e.g., adder).

Figure 11:
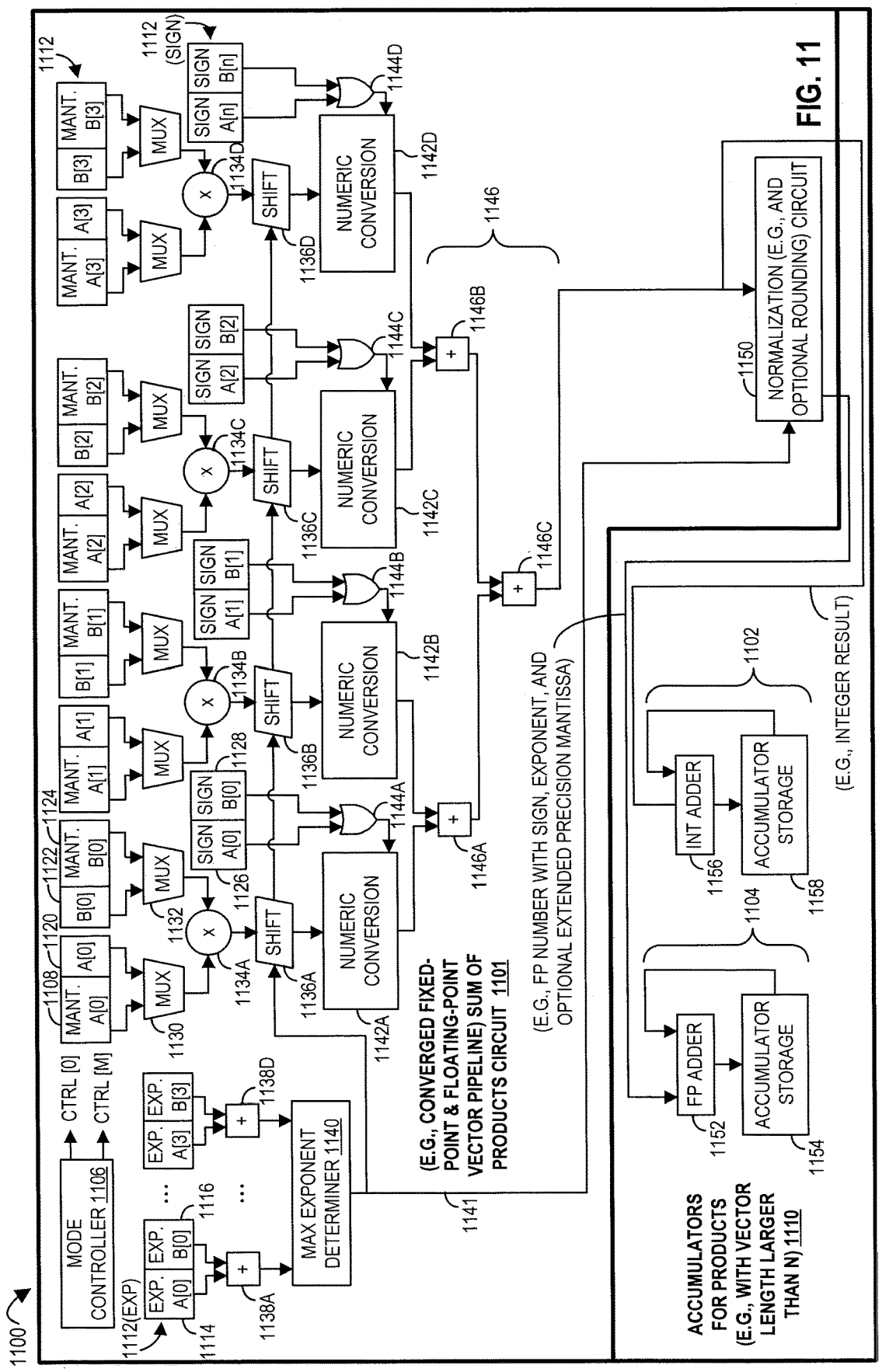
FIG. 11 illustrates a four-by-four fixed-point and floating-point vector multiplication circuit with a fixed-point accumulator circuit and a floating-point accumulator circuit according to embodiments of the disclosure.

FIG. 11 illustrates a four-by-four fixed-point and floating-point vector multiplication circuit 1100 with a fixed-point accumulator circuit 1102 and a floating-point accumulator circuit 1104 according to embodiments of the disclosure. In this embodiment, each input vector has a maximum of 4 elements (e.g., each having the same bit width of elements).

In FIG. 11, each of the four element positions (e.g., 0, 1, 2, and 3, where N=3) of the vectors to be processed includes a respective multiplier (1134A, 1134B, 1134C, 1134D), shift register (1136A, 1136B, 1136C, 1136D), and numeric conversion circuit (1142A, 1142B, 1142C, 1142D) to process the mantissas in that element position, XOR logic gate (1144A, 1144B, 1144C, 1144D), and/or an adder (1138A, 1138B, 1138C, 1138D) to process (e.g., add together) the exponents in that element position. Those set of components may be referred to as an element block (e.g., with four element blocks in FIG. 11). The adders 1146 include three adders (1146A, 1146B, and 1146C) that each have two inputs. In another embodiment, adder 1146 is a single adder with N+1 inputs (e.g., four inputs in FIG. 11).

Circuit 1100 includes a mode controller 1106 (e.g., circuit) to switch (e.g., select) between a fixed-point mode and a floating-point mode. In one embodiment, mode controller 1106 is to switch between (e.g., any of) fixed-point mode, Flexpoint mode, and floating-point mode. Circuit 1100 includes a sum of products circuit (e.g., pipeline) 1101 and accumulators 1110 (e.g., fixed-point accumulator circuit 1102 and floating-point accumulator circuit 1104). In the depicted embodiment, the floating-point (and/or Flexpoint) inputs (e.g., input registers) and fixed-point inputs are shown as being separate inputs. In one embodiment, a same register is used for either fixed-point data or floating-point data (e.g., or Flexpoint data). For example, a first register to store fixed-point data or floating-point data (e.g., or Flexpoint data) for a first vector (e.g., vector A) and a second register to store fixed-point data or floating-point data (e.g., or Flexpoint data) for a second vector (e.g., vector B). In one embodiment, a separate register is used for fixed-point data and floating-point data (e.g., and Flexpoint data). For example, a first register to store fixed-point data for a first, fixed-point vector (e.g., fixed-point vector A), a second register to store fixed-point data for a second, fixed-point vector (e.g., fixed-point vector B), a third register to store floating-point data for a third, floating-point vector (e.g., floating-point vector A), and a fourth register to store floating-point data for a fourth, floating-point vector (e.g., floating-point vector B). In one embodiment. Flexpoint data is stored in its own register(s). In one embodiment, inputs 1112 include an input for each element of a fixed-point vector (e.g., including input 1120 for a first element [0] of a first vector A and/or input 1122 for a first element [0] of a second vector B) and an input for each element (e.g., a sign bit 1112(sign), exponent 1112(exp), and mantissa of each element) of a floating-point vector (e.g., including input 1126 for the sign bit for a first element [0] of a first vector A, input 1114 for the exponent bits for the first element [0] of the first vector A, and input 1108 for the mantissa bits for the first element [0] of the first vector A, and/or including input 1126 for the sign bit for a first element [0] of a second vector B, input 1114 for the exponent bits for the first element [0] of the second vector B, and input 1108 for the mantissa bits for the first element [0] of the second vector B). In certain embodiments, inputs 1112 include an input for each element (e.g., for an exponent 1112(exp) and mantissa of each element) of a Flexpoint vector (e.g., including input 1114 for the exponent bits for the first element [0] of a first vector A and input 1108 for the mantissa bits for the first element [0] of the first vector A, and/or including input 1114 for the exponent bits for the first element [0] of a second vector B, and input 1108 for the mantissa bits for the first element [0] of the second vector B). In one embodiment, the vectors (e.g., A[N+1] and B[N+1]) to be operated on by fixed-point and floating-point vector multiplication circuit 1100 have a same number of elements equal to N+1 (e.g., four in FIG. 11). N may be any positive integer in certain embodiments.

A reference number for the other inputs (e.g., for elements 1 through 3) are not drawn in this figure so as not obfuscate the data flow/lines. Further, the control inputs/lines (e.g., for the switches, shifters, numeric conversion circuits (e.g., 2's complement circuits)) are not drawn so as not obfuscate the data flow/lines. Control inputs/lines to components may extend from a mode controller.

In certain embodiments, each element position (e.g., 0 to 3) of the vectors to be processed includes a respective multiplier, shift register, and numeric conversion circuit to process the mantissas in that element position, and an adder to process (e.g., add together) the exponents in that element position. Those set of components may be referred to as an element block (e.g., with four element blocks in FIG. 11).

First Mode

In one embodiment, mode controller (e.g., via a request to perform a sum of products operation) is in a first (e.g., floating-point) mode to perform an operation on floating-point input data.

As one example, in the first (e.g., floating-point) mode, each of these floating-point numbers is partitioned into its sign-bit, exponent-bits, and mantissa-bits. At this initial partitioning, the leading hidden bit which can be 1 or 0, depending on the exponent, is concatenated on to the mantissa. Subsequently a pair-wise multiplication is performed between corresponding mantissas of each vector, exponents are added together, and respective sign-bits are logically XORed. At the output of the multiplication stage, the mantissas can be truncated or expanded into a desirable internal bit length (e.g., word-length) to trade-off resource utilization with solution accuracy. In parallel, all the exponents are compared in a tree with $\log_2 n$ of stages. The highest exponent becomes the reference and all the mantissas are aligned to this reference. After this alignment, the mantissas are converted into a fixed-point (e.g., 2's complement) number representation. In one embodiment of the next stage, the sum-reduction is performed on the mantissas, and at each level of this reduction-tree the bit-length (e.g., word-length) is increased by one bit to prevent overflow. After this summation, the fixed-point number is reconverted to sign and magnitude, aligned to drop the leading one, and the exponent corrected. From these values, a standards compliant floating-point number is generated and output in this example. In one embodiment, the standard is an IEEE floating-point arithmetic standard (e.g., 754-2008—the IEEE Computer Society's Standard for Floating-Point Arithmetic published on Aug. 29, 2008).

As another example, in the first mode, input sourcing multiplexers (e.g., multiplexers 1130 and 1132) are sent a control value to source a pair of mantissas from corresponding (e.g., having the same element position in the vectors) elements of the input vectors (e.g., sourcing mantissas of both elements with index 0 of floating-point vectors A and B as one pair, mantissas of both elements with index 1 of floating-point vectors A and B as a second pair, mantissas of both elements with index 2 of floating-point vectors A and B as a third pair, etc.). In this example, each pair of mantissas are multiplied together by a multiplier to produce a respective product (e.g., n+1 corresponding products in this Figure), for example, mantissa A[0] 1108 from the element having index 0 of vector A and mantissa B[0] 1124 from the element having index 0 of vector B are multiplied by (e.g., fixed-point) multiplier 1134A to produce a product. The products from each multiplier in the depicted embodiment are output to a shift register (e.g., shifter) to shift (e.g., move) each product based on its determined exponent (e.g., of the products) and a maximum exponent (e.g., of the products). In this example, a pair of exponents from corresponding (e.g., having the same element position in the vectors) elements of the input vectors (e.g., sourcing exponents of both elements with index 0 of floating-point vectors A and B as one pair, exponents of both elements with index 1 of floating-point vectors A and B as a second pair, exponents of both elements with index 2 of floating-point vectors A and B as a third pair, etc.) are added together by a respective (e.g., fixed-point) (e.g., integer) adder to produce a sum of the exponents (e.g., the exponent of the product of a pair of elements from vector A and vector B). In this example, the sum of the exponents (e.g., n+1 sums in this Figure) are each input into a maximum exponent determiner 1140 (e.g., comparator circuit). For example, the exponent A[0] 1114 from the element having index 0 of vector A and exponent B[0] 1116 from the element having index 0 of vector B are added together by (e.g., fixed-point) (e.g., integer) adder 1138A to produce the sum of exponent A[0] 1114 and exponent B[0] 1116. The maximum exponent determiner 1140 (e.g., circuit) is then to compare the sums of the exponents against each other to determine the maximum (e.g., largest value) of the sums of the exponents, e.g., the maximum exponent of the exponents for the corresponding products of mantissas. In one embodiment, the maximum of the sums of the exponents is the maximum exponent of the mantissa products. The maximum exponent in the depicted embodiment is then used to shift the other mantissa products accordingly, e.g., to align the other mantissa products to the maximum exponent. In one embodiment, a maximum exponent is 4 (e.g., the sum of two exponents each having a value of 2), and the other of the exponents is 3, so the mantissa product for the others of the exponents is shifted one place (e.g., to the left) to align the mantissa products to have a same exponent as the maximum exponent. In the depicted embodiment, the maximum exponent (e.g., a value indicative of the maximum exponent) is output along path 1141 to the set of shift registers (e.g., including shift register 1136A) and to the normalization circuit 1150. In this example, each shifted mantissa product is output to a respective numeric conversion circuit (e.g., 2's complement circuit). For example, numeric conversion circuit 1142A (e.g., 2's complement circuit) receiving an unsigned (e.g. and shifted) mantissa product output from shift register 1136A. Each respective numeric conversion circuit (e.g., 2's complement circuit) is to then convert the (e.g., shifted) mantissa product from an unsigned format (e.g., value) to a signed format (e.g., value). In one embodiment, this conversion is a 2's complement operation performed on the (e.g., shifted) mantissa product (for example, to convert from unsigned (e.g., binary) format to 2's complement format) based on the output from each respective XOR logic gate.

In one embodiment, a shift register passes a value through without shifting, e.g., when the maximum exponent (e.g., sum of two exponents) is the same as the exponent for the index position, e.g., where numeric conversion circuit 1142A and shift register 1136A are used for index position 0 of the input vectors.

In the depicted embodiment, each sign bit for a pair of sign bits from corresponding (e.g., having the same element position in the vectors) elements of the input vectors (e.g., sourcing sign bits of both elements with index 0 of floating-point vectors A and B as one pair, sign bits of both elements with index 1 of floating-point vectors A and B as a second pair, sign bits of both elements with index 2 of floating-point vectors A and B as a third pair, etc.) are logically, exclusively ORed (XORed) together by a respective (e.g., fixed-point) logic gate that implements an XOR to produce a value that indicate if the mantissa product is negative or positive, for example, the value being 0 for positive and 1 for negative. In the depicted embodiment, XOR logic gate 1144A receives a sign bit from input 1126 for the first element [0] of the first vector A and a sign bit from input 1128 for the first element [0] of the second vector B and outputs a first value (e.g., 1 indicating the product is negative) when only one of the inputs 1126, 1128 is a 1 to indicate false (e.g., negative) and a second value (e.g., 0 indicating the product is positive) otherwise.

The converted (e.g., signed) values for each pair of elements (e.g., at a same element position) are then all added together with the set of (e.g., fixed-point) (e.g., integer) adders 1146 into a single product. Normalization circuit 1150 is then used in this first mode to convert the single product into a floating-point representation based on the maximum exponent. In one embodiment, circuit 1150 is to further perform a rounding or other operation to convert the (e.g., integer) format of the single product into floating-point format to create the resultant of the sum of products circuit 1101. In one embodiment, normalization circuit 1150 moves the most significant digit of the significand (e.g., the single product) of a non-zero number to be non-zero (e.g. and moves the maximum exponent value accordingly according to the move of the single product).

Second Mode

In one embodiment, mode controller (e.g., via a request to perform a sum of products operation) is in a second (e.g., fixed-point) mode to perform an operation on fixed-point input data.

As one example, in the second (e.g., fixed-point) mode, the sum of products circuit is to multiply each pair of fixed-point (e.g., integer) values from a same element position (e.g., 0 to 3) of the input vectors to be a product, and sum those products to produce a single, fixed-point resultant.

As another example, in the second (e.g., fixed-point) mode, input sourcing multiplexers (e.g., multiplexers 1130 and 1132) are sent a control value to source a pair of values from corresponding (e.g., having the same element position in the vectors) elements of the input vectors (e.g., sourcing values of both elements with index 0 of fixed-point vectors A and B as one pair, values of both elements with index 1 of fixed-point vectors A and B as a second pair, values of both elements with index 2 of fixed-point vectors A and B as a third pair, etc.). In this example, each pair of values are multiplied together by a multiplier to produce a respective product (e.g., n+1 corresponding products in this Figure), for example, value A[0] 1120 from the element having index 0 of vector A and value B[0] 1122 from the element having index 0 of vector B are multiplied by (e.g., fixed-point) multiplier 1134A to produce a product. The products from each multiplier in the depicted embodiment are output to a respective shift register (e.g., shifter), but in the second mode the products pass through the shift register without being changed, e.g., the products are not shifted (e.g., moved). In this example, each unshifted products output from each shift register are input into a respective numeric conversion circuit (e.g., 2's complement circuit), but in the second mode the products pass through the numeric conversion circuit without being changed, e.g., the products are already in 2's complement representation so they are not further converted. The (e.g., signed) products for each pair of elements (e.g., at a same element position) are then all added together with the set of (e.g., fixed-point) (e.g., integer) adders 1146 into a single fixed-point resultant. In one embodiment, the single fixed-point resultant passes through normalization circuit 1150 without any modification to the single fixed-point resultant.

Third Mode

In one embodiment, mode controller (e.g., via a request to perform a sum of products operation) is in a third (e.g., Flexpoint) mode to perform an operation on Flexpoint input data.

As one example, in the third (e.g., Flexpoint) mode, each of these Flexpoint numbers is partitioned into exponent-bits, and integer (2's complement) mantissa-bits, e.g., instead of binary mantissa-bits as in a floating-point format. Subsequently a pair-wise multiplication is performed between corresponding mantissas of each vector, and exponents are added together. At the output of the multiplication stage, the mantissas can be truncated or expanded into a desirable internal bit length (e.g., word-length) to trade-off resource utilization with solution accuracy. In parallel, all the exponents are compared in a tree with $\log_2 n$ of stages. The highest exponent becomes the reference and all the mantissas are aligned to this reference. After this alignment in one embodiment of the third mode, the mantissas are not converted into a fixed-point (e.g., 2's complement) number representation as they are already in that format. In one embodiment of the next stage, the sum-reduction is performed on the mantissas, and at each level of this reduction-tree the bit-length (e.g., word-length) is increased by one bit to prevent overflow. After this summation, on one embodiment, the resultant (e.g., mantissa and exponent) is shifted to the desired magnitude (e.g., in a FlexN+M format discussed above).

As another example, in the third mode, input sourcing multiplexers (e.g., multiplexers 1130 and 1132) are sent a control value to source a pair of Flexpoint (2's complement) mantissas from corresponding (e.g., having the same element position in the vectors) elements of the input vectors (e.g., sourcing mantissas of both elements with index 0 of Flexpoint vectors A and B as one pair, mantissas of both elements with index 1 of Flexpoint vectors A and B as a second pair, mantissas of both elements with index 2 of Flexpoint vectors A and B as a third pair, etc.). In this example, each pair of mantissas are multiplied together by a multiplier to produce a respective product (e.g., n+1 corresponding products in this Figure), for example, mantissa A[0] 1108 from the element having index 0 of vector A and mantissa B[0] 1124 from the element having index 0 of vector B are multiplied by (e.g., fixed-point) multiplier 1134A to produce a product. The products from each multiplier in the depicted embodiment are output to a shift register (e.g., shifter) to shift (e.g., move) each product based on its determined exponent (e.g., of the products) and a maximum exponent (e.g., of the products). In this example, a pair of exponents from corresponding (e.g., having the same element position in the vectors) elements of the input vectors (e.g., sourcing exponents of both elements with index 0 of Flexpoint vectors A and B as one pair, exponents of both elements with index 1 of Flexpoint vectors A and B as a second pair, exponents of both elements with index 2 of Flexpoint vectors A and B as a third pair, etc.) are added together by a respective (e.g., fixed-point) (e.g., integer) adder to produce a sum of the exponents (e.g., the exponent of the product of a pair of elements from vector A and vector B). In this example, the sum of the exponents (e.g., n+1 sums in this Figure) are each input into a maximum exponent determiner 1140 (e.g., comparator circuit). For example, the exponent A[0] 1114 from the element having index 0 of vector A and exponent B[0] 1116 from the element having index 0 of vector B are added together by (e.g., fixed-point) (e.g., integer) adder 1138 to produce the sum of exponent A[0] 1114 and exponent B[0] 1116. The maximum exponent determiner 1140 (e.g., circuit) is then to compare the sums of the exponents against each other to determine the maximum (e.g., largest value) of the sums of the exponents, e.g., the maximum exponent of the exponents for the corresponding products of mantissas. In one embodiment, the maximum of the sums of the exponents is the maximum exponent of the mantissa products. The maximum exponent in the depicted embodiment is then used to shift the other mantissa products accordingly, e.g., to align the other mantissa products to the maximum exponent. In one embodiment, a maximum exponent is 4 (e.g., the sum of two exponents each having a value of 2), and the other of the exponents is 3, so the mantissa product for the others of the exponents is shifted one place (e.g., to the left) to align the mantissa products to have a same exponent as the maximum exponent. In the depicted embodiment, the maximum exponent (e.g., a value indicative of the maximum exponent) is output along path 1141 to the set of shift registers (e.g., including shift register 1136A) and normalization circuit 1150. In this example, each shifted mantissa product is output into a respective numeric conversion circuit (e.g., 2's complement circuit), but in the third mode the products pass through the numeric conversion circuit without being changed, e.g., the products are already in 2's complement representation so they are not further converted.

In one embodiment, a shift register passes a value through without shifting, e.g., when the maximum exponent (e.g., sum of two exponents) is the same as the exponent for the index position, e.g., where numeric conversion circuit 1142A and shift register 1136A are used for index position 0 of the input vectors.

In the depicted embodiment, the shifted mantissa products for each pair of elements (e.g., at a same element position) are then all added together with the set of (e.g., fixed-point) (e.g., integer) adders 1146 into a single product. Normalization circuit 1150 may then be used in this third mode to convert the single product into a Flexpoint representation based on the maximum exponent. In one embodiment, instead of a full normalization operation in this mode, circuit 1150 is to perform a rounding to reduce the bit width of the sum from adders 1146 to the desired bit width of the Flexpoint format to create the resultant of the sum of products circuit 1101 (e.g., where the exponent has no impact on this reduction and the sign is already accounted because the fixed-point representation is 2's complement). In one embodiment, circuit 1150 moves the most significant digit of the significand (e.g., the single product) of a non-zero number to be non-zero (e.g. and moves the maximum exponent value accordingly according to the move of the single product).

Accumulators

Optionally, the circuit 1100 includes accumulators 1110 to accumulate resultants from the sum of products circuit 1101. In one embodiment, a separate fixed-point accumulator circuit 1102 and floating-point accumulator circuit 1104 are used in accumulators 1110. In certain embodiments, the mode controller 1106 being in the first mode causes the resultants from the sum of products circuit 1101 to be (e.g., only) accumulated with floating-point accumulator circuit 1104 and/or the mode controller 1106 being in the second mode causes the resultants from the sum of products circuit 1101 to be (e.g., only) accumulated with fixed-point accumulator circuit 1102. Depicted fixed-point accumulator circuit 1102 includes a (e.g., fixed-point) (e.g., integer) adder 1156 and fixed-point accumulator storage 1158. Depicted floating-point accumulator circuit 1104 includes a floating-point adder 1152 and floating-point accumulator storage 1154. In one embodiment, floating-point adder 1152 is an instance of floating-point adder circuit 500 from FIG. 5.

In certain embodiments, circuit 1100 receives a value (e.g., from a core offloading to an accelerator embodiment of circuit 1100) indicating the iterations to be performed by the sum of products circuit 1101, e.g., to decouple the width of a vector (e.g., having a number of elements greater than four) to be processed by the circuit 1100 from the hardware width (e.g., a vector having a maximum of four elements) of the sum of products circuit 1101. In one embodiment, circuit 1100 is to notify to the requesting entity (e.g., core) of completion by performing a notification action (e.g., raising a flag so that the appropriate accumulator storage 1154 or accumulator storage 1158 is read by the requesting entity). In one embodiment, the floating-point accumulator (e.g., adder) or fixed-point accumulator (e.g., adder) is used to accumulate Flexpoint resultants from circuit 1101, for example, not using the sign field in floating-point accumulator (e.g., adder).

Figure 12:
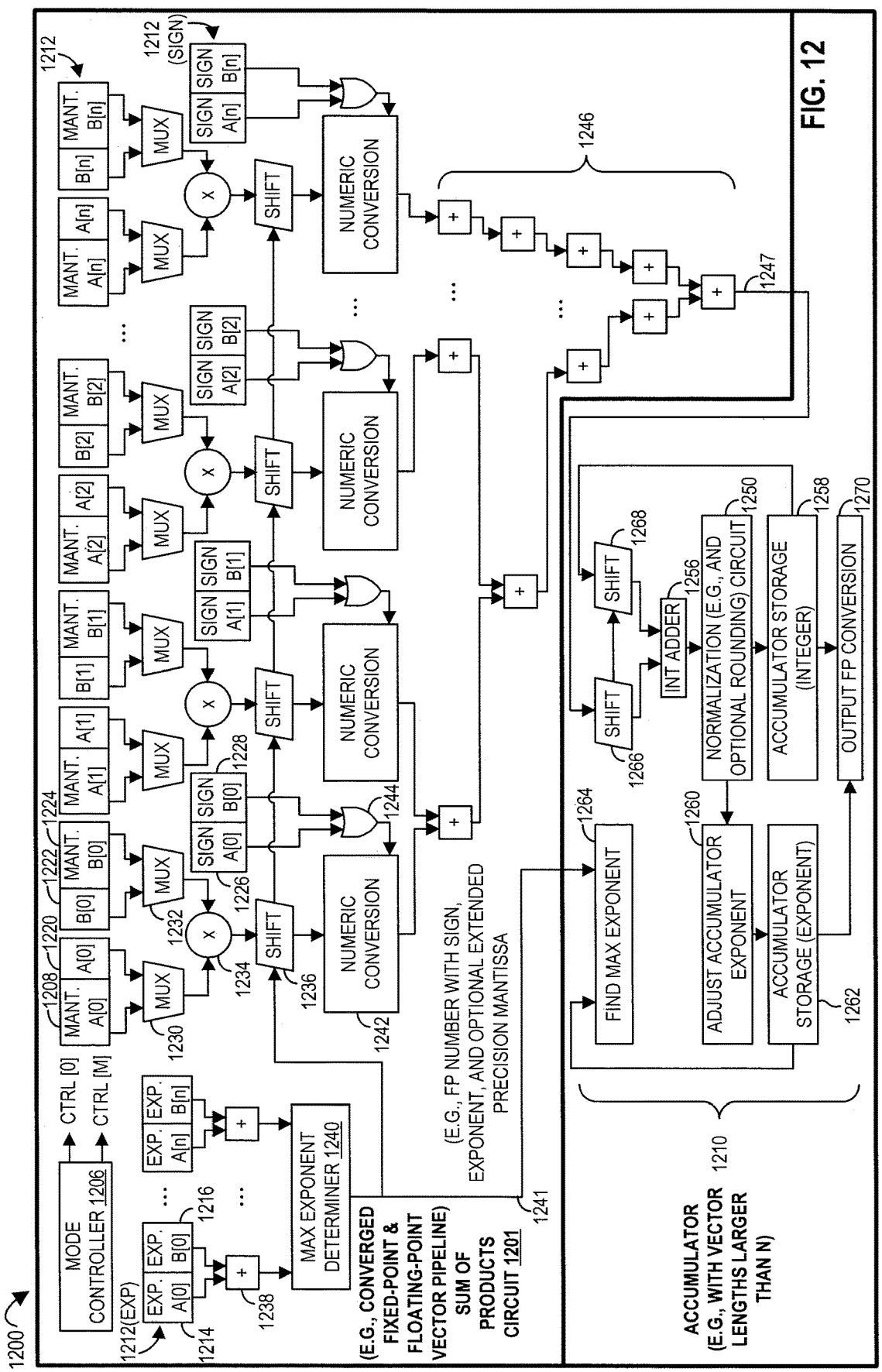
FIG. 12 illustrates a fixed-point and floating-point vector multiplication circuit with a fixed-point accumulator circuit and a floating-point conversion circuit to convert fixed-point to floating point at the end of accumulation according to embodiments of the disclosure.

FIG. 12 illustrates a fixed-point and floating-point vector multiplication circuit 1200 with a fixed-point accumulator circuit 1210 and a floating-point conversion circuit 1270 to convert fixed-point to floating point at the end of accumulation according to embodiments of the disclosure.

In one embodiment, accumulation for floating-point inputs is performed on floating-point format values (e.g., for each resultant from a sum of products circuit) and each of the resultants has a fixed-point (e.g., integer) to floating-point conversion is performed. However, in certain embodiments, the integer length of the sum of products circuit (e.g., pipeline) is larger than the number of mantissa bits of the floating-point accumulator, and thus some accuracy is lost as a result of this conversion. In one embodiment of FIG. 12, a fixed-point (e.g., integer) accumulator 1210 is employed and conversion to floating-point format from fixed-point format is done only at the end of overall computation (e.g., when the last accumulation is done).

Circuit 1200 includes a mode controller 1206 (e.g., circuit) to switch (e.g., select) between a fixed-point mode and a floating-point mode. In one embodiment, mode controller 1206 is to switch between (e.g., any of) fixed-point mode, Flexpoint mode, and floating-point mode. Circuit 1200 includes a sum of products circuit (e.g., pipeline) 1201 and fixed-point accumulator 1210. In the depicted embodiment, the floating-point (and/or Flexpoint) inputs (e.g., input registers) and fixed-point inputs are shown as being separate inputs. In one embodiment, a same register is used for either fixed-point data or floating-point data (e.g., or Flexpoint data). For example, a first register to store fixed-point data or floating-point data (e.g., or Flexpoint data) for a first vector (e.g., vector A) and a second register to store fixed-point data or floating-point data (e.g., or Flexpoint data) for a second vector (e.g., vector B). In one embodiment, a separate register is used for fixed-point data and floating-point data (e.g., and Flexpoint data). For example, a first register to store fixed-point data for a first, fixed-point vector (e.g., fixed-point vector A), a second register to store fixed-point data for a second, fixed-point vector (e.g., fixed-point vector B), a third register to store floating-point data for a third, floating-point vector (e.g., floating-point vector A), and a fourth register to store floating-point data for a fourth, floating-point vector (e.g., floating-point vector B). In one embodiment. Flexpoint data is stored in its own register(s). In one embodiment, inputs 1212 include an input for each element of a fixed-point vector (e.g., including input 1220 for a first element [0] of a first vector A and/or input 1222 for a first element [0] of a second vector B) and an input for each element (e.g., a sign bit 1212(sign), exponent 1212 (exp), and mantissa of each element) of a floating-point vector (e.g., including input 1226 for the sign bit for a first element [0] of a first vector A, input 1214 for the exponent bits for the first element [0] of the first vector A, and input 1208 for the mantissa bits for the first element [0] of the first vector A, and/or including input 1226 for the sign bit for a first element [0] of a second vector B, input 1214 for the exponent bits for the first element [0] of the second vector B, and input 1208 for the mantissa bits for the first element [0] of the second vector B). In certain embodiments, inputs 1212 include an input for each element (e.g., an exponent 1212(exp) and mantissa of each element) of a Flexpoint vector (e.g., including input 1214 for the exponent bits for the first element [0] of a first vector A and input 1208 for the mantissa bits for the first element [0] of the first vector A, and/or including input 1214 for the exponent bits for the first element [0] of a second vector B, and input 1208 for the mantissa bits for the first element [0] of the second vector B). In one embodiment, the vectors (e.g., A[N+1] and B[N+1]) to be operated on by fixed-point and floating-point vector multiplication circuit 1200 have a same number of elements equal to N+1. N may be any positive integer in certain embodiments.

A reference number for the other inputs (e.g., for elements 1 through N) are not drawn in this figure so as not obfuscate the data flow/lines. Further, the control inputs/lines (e.g., for the switches, shifters, numeric conversion circuits (e.g., 2's complement circuits)) are not drawn so as not obfuscate the data flow/lines. Control inputs/lines to components may extend from a mode controller.

In certain embodiments, each element position (e.g., 0 to N) of the vectors to be processed includes a respective multiplier, shift register, and numeric conversion circuit to process the mantissas in that element position, XOR logic gate, and/or an adder to process (e.g., add together) the exponents in that element position. Those set of components may be referred to as an element block (e.g., with N+1 element blocks in FIG. 12).

First Mode

In one embodiment, mode controller (e.g., via a request to perform a sum of products operation) is in a first (e.g., floating-point) mode to perform an operation on floating-point input data.

As one example, in the first (e.g., floating-point) mode, each of these floating-point numbers is partitioned into its sign-bit, exponent-bits, and mantissa-bits. At this initial partitioning, the leading hidden bit which can be 1 or 0, depending on the exponent, is concatenated on to the mantissa. Subsequently a pair-wise multiplication is performed between corresponding mantissas of each vector, exponents are added together, and respective sign-bits are logically XORed. At the output of the multiplication stage, the mantissas can be truncated or expanded into a desirable internal bit length (e.g., word-length) to trade-off resource utilization with solution accuracy. In parallel, all the exponents are compared in a tree with $\log_2 n$ of stages. The highest exponent becomes the reference and all the mantissas are aligned to this reference. After this alignment, the mantissas are converted into a fixed-point (e.g., 2's complement) number representation. In one embodiment of the next stage, the sum-reduction is performed on the mantissas, and at each level of this reduction-tree the bit-length (e.g., word-length) is increased by one bit to prevent overflow. After this summation, the fixed-point number is reconverted to sign and magnitude, aligned to drop the leading one, and the exponent corrected. From these values, a standards compliant floating-point number is generated and output in this example. In one embodiment, the standard is an IEEE floating-point arithmetic standard (e.g., 754-2008—the IEEE Computer Society's Standard for Floating-Point Arithmetic published on Aug. 29, 2008).

As another example, in the first mode, input sourcing multiplexers (e.g., multiplexers 1230 and 1232) are sent a control value to source a pair of mantissas from corresponding (e.g., having the same element position in the vectors) elements of the input vectors (e.g., sourcing mantissas of both elements with index 0 of floating-point vectors A and B as one pair, mantissas of both elements with index 1 of floating-point vectors A and B as a second pair, mantissas of both elements with index 2 of floating-point vectors A and B as a third pair, etc.). In this example, each pair of mantissas are multiplied together by a multiplier to produce a respective product (e.g., n+1 corresponding products in this Figure), for example, mantissa A[0] 1208 from the element having index 0 of vector A and mantissa B[0] 1224 from the element having index 0 of vector B are multiplied by (e.g., fixed-point) multiplier 1234 to produce a product. The products from each multiplier in the depicted embodiment are output to a shift register (e.g., shifter) to shift (e.g., move) each product based on its determined exponent (e.g., of the products) and a maximum exponent (e.g., of the products). In this example, a pair of exponents from corresponding (e.g., having the same element position in the vectors) elements of the input vectors (e.g., sourcing exponents of both elements with index 0 of floating-point vectors A and B as one pair, exponents of both elements with index 1 of floating-point vectors A and B as a second pair, exponents of both elements with index 2 of floating-point vectors A and B as a third pair, etc.) are added together by a respective (e.g., fixed-point) (e.g., integer) adder to produce a sum of the exponents (e.g., the exponent of the product of a pair of elements from vector A and vector B). In this example, the sum of the exponents (e.g., n+1 sums in this Figure) are each input into a maximum exponent determiner 1240 (e.g., comparator circuit). For example, the exponent A[0] 1214 from the element having index 0 of vector A and exponent B[0] 1216 from the element having index 0 of vector B are added together by (e.g., fixed-point) (e.g., integer) adder 1238 to produce the sum of exponent A[0] 1214 and exponent B[0] 1216. The maximum exponent determiner 1240 (e.g., circuit) is then to compare the sums of the exponents against each other to determine the maximum (e.g., largest value) of the sums of the exponents, e.g., the maximum exponent of the exponents for the corresponding products of mantissas. In one embodiment, the maximum of the sums of the exponents is the maximum exponent of the mantissa products. The maximum exponent in the depicted embodiment is then used to shift the other mantissa products accordingly, e.g., to align the other mantissa products to the maximum exponent. In one embodiment, a maximum exponent is 4 (e.g., the sum of two exponents each having a value of 2), and the other of the exponents is 3, so the mantissa product for the others of the exponents is shifted one place (e.g., to the left) to align the mantissa products to have a same exponent as the maximum exponent. In the depicted embodiment, the maximum exponent (e.g., a value indicative of the maximum exponent) is output along path 1241 to the set of shift registers (e.g., including shift register 1236) and a second maximum exponent determiner circuit 1264. In this example, each shifted mantissa product is output to a respective numeric conversion circuit (e.g., 2's complement circuit). For example, numeric conversion circuit 1242 (e.g., 2's complement circuit) receiving an unsigned (e.g., and shifted) mantissa product output from shift register 1236. Each respective numeric conversion circuit (e.g., 2's complement circuit) is to then convert the (e.g., shifted) mantissa product from an unsigned format (e.g., value) to a signed format (e.g., value). In one embodiment, this conversion is a 2's complement operation performed on the (e.g., shifted) mantissa product (for example, to convert from unsigned (e.g., binary) format to 2's complement format) based on the output from each respective XOR logic gate.

In one embodiment, a shift register passes a value through without shifting, e.g., when the maximum exponent (e.g., sum of two exponents) is the same as the exponent for the index position, e.g., where numeric conversion circuit 1242 and shift register 1236 are used for index position 0 of the input vectors.

In the depicted embodiment, each sign bit for a pair of sign bits from corresponding (e.g., having the same element position in the vectors) elements of the input vectors (e.g., sourcing sign bits of both elements with index 0 of floating-point vectors A and B as one pair, sign bits of both elements with index 1 of floating-point vectors A and B as a second pair, sign bits of both elements with index 2 of floating-point vectors A and B as a third pair, etc.) are logically, exclusively ORed (XORed) together by a respective (e.g., fixed-point) logic gate that implements an XOR to produce a value that indicate if the mantissa product is negative or positive, for example, the value being 0 for positive and 1 for negative. In the depicted embodiment, XOR logic gate 1244 receives a sign bit from input 1226 for the first element [0] of the first vector A and a sign bit from input 1228 for the first element

[0] of the second vector B and outputs a first value (e.g., 1 indicating the product is negative) when only one of the inputs 1226, 1228 is a 1 to indicate false (e.g., negative) and a second value (e.g., 0 indicating the product is positive) otherwise.

The converted (e.g., signed) values for each pair of elements (e.g., at a same element position) are then all added together with the set of (e.g., fixed-point) (e.g., integer) adders 1246 into a single product. In one embodiment, single product is sent from output 1247 to accumulator 1210, e.g., as discussed below.

Second Mode

In one embodiment, mode controller (e.g., via a request to perform a sum of products operation) is in a second (e.g., fixed-point) mode to perform an operation on fixed-point input data.

As one example, in the second (e.g., fixed-point) mode, the sum of products circuit is to multiply each pair of fixed-point (e.g., integer) values from a same element position (e.g., 0 to N) of the input vectors to be a product, and sum those products to produce a single, fixed-point resultant.

As another example, in the second (e.g., fixed-point) mode, input sourcing multiplexers (e.g., multiplexers 1230 and 1232) are sent a control value to source a pair of values from corresponding (e.g., having the same element position in the vectors) elements of the input vectors (e.g., sourcing values of both elements with index 0 of fixed-point vectors A and B as one pair, values of both elements with index 1 of fixed-point vectors A and B as a second pair, values of both elements with index 2 of fixed-point vectors A and B as a third pair, etc.). In this example, each pair of values are multiplied together by a multiplier to produce a respective product (e.g., n+1 corresponding products in this Figure), for example, value A[0] 1220 from the element having index 0 of vector A and value B[0] 1222 from the element having index 0 of vector B are multiplied by (e.g., fixed-point) multiplier 1234 to produce a product. The products from each multiplier in the depicted embodiment are output to a respective shift register (e.g., shifter), but in the second mode the products pass through the shift register without being changed, e.g., the products are not shifted (e.g., moved). In this example, each unshifted products output from each shift register are input into a respective numeric conversion circuit (e.g., 2's complement circuit), but in the second mode the products pass through the numeric conversion circuit without being changed, e.g., the products are already in 2's complement representation so they are not further converted. The (e.g., signed) products for each pair of elements (e.g., at a same element position) are then all added together with the set of (e.g., fixed-point) (e.g., integer) adders 1246 into a single fixed-point resultant. In one embodiment, single fixed-point resultant (e.g., product) is sent from output 1247 to accumulator 1210, e.g., as discussed below.

Third Mode

In one embodiment, mode controller (e.g., via a request to perform a sum of products operation) is in a third (e.g., Flexpoint) mode to perform an operation on Flexpoint input data.

As one example, in the third (e.g., Flexpoint) mode, each of these Flexpoint numbers is partitioned into exponent-bits, and integer (2's complement) mantissa-bits, e.g., instead of binary mantissa-bits as in a floating-point format. Subsequently a pair-wise multiplication is performed between corresponding mantissas of each vector, and exponents are added together. At the output of the multiplication stage, the mantissas can be truncated or expanded into a desirable internal bit length (e.g., word-length) to trade-off resource utilization with solution accuracy. In parallel, all the exponents are compared in a tree with $\log_2 n$ of stages. The highest exponent becomes the reference and all the mantissas are aligned to this reference. After this alignment in one embodiment of the third mode, the mantissas are not converted into a fixed-point (e.g., 2's complement) number representation as they are already in that format. In one embodiment of the next stage, the sum-reduction is performed on the mantissas, and at each level of this reduction-tree the bit-length (e.g., word-length) is increased by one bit to prevent overflow. After this summation, on one embodiment, the resultant (e.g., mantissa and exponent) is shifted to the desired magnitude (e.g., in a FlexN+M format discussed above).

As another example, in the third mode, input sourcing multiplexers (e.g., multiplexers 1230 and 1232) are sent a control value to source a pair of Flexpoint (2's complement) mantissas from corresponding (e.g., having the same element position in the vectors) elements of the input vectors (e.g., sourcing mantissas of both elements with index 0 of Flexpoint vectors A and B as one pair, mantissas of both elements with index 1 of Flexpoint vectors A and B as a second pair, mantissas of both elements with index 2 of Flexpoint vectors A and B as a third pair, etc.). In this example, each pair of mantissas are multiplied together by a multiplier to produce a respective product (e.g., n+1 corresponding products in this Figure), for example, mantissa A[0] 1208 from the element having index 0 of vector A and mantissa B[0] 1224 from the element having index 0 of vector B are multiplied by (e.g., fixed-point) multiplier 1234 to produce a product. The products from each multiplier in the depicted embodiment are output to a shift register (e.g., shifter) to shift (e.g., move) each product based on its determined exponent (e.g., of the products) and a maximum exponent (e.g., of the products). In this example, a pair of exponents from corresponding (e.g., having the same element position in the vectors) elements of the input vectors (e.g., sourcing exponents of both elements with index 0 of Flexpoint vectors A and B as one pair, exponents of both elements with index 1 of Flexpoint vectors A and B as a second pair, exponents of both elements with index 2 of Flexpoint vectors A and B as a third pair, etc.) are added together by a respective (e.g., fixed-point) (e.g., integer) adder to produce a sum of the exponents (e.g., the exponent of the product of a pair of elements from vector A and vector B). In this example, the sum of the exponents (e.g., n+1 sums in this Figure) are each input into a maximum exponent determiner 1240 (e.g., comparator circuit). For example, the exponent A[0] 1214 from the element having index 0 of vector A and exponent B [0] 1216 from the element having index 0 of vector B are added together by (e.g., fixed-point) (e.g., integer) adder 1238 to produce the sum of exponent A[0] 1214 and exponent B[0] 1216. The maximum exponent determiner 1240 (e.g., circuit) is then to compare the sums of the exponents against each other to determine the maximum (e.g., largest value) of the sums of the exponents, e.g., the maximum exponent of the exponents for the corresponding products of mantissas. In one embodiment, the maximum of the sums of the exponents is the maximum exponent of the mantissa products. The maximum exponent in the depicted embodiment is then used to shift the other mantissa products accordingly, e.g., to align the other mantissa products to the maximum exponent. In one embodiment, a maximum exponent is 4 (e.g., the sum of two exponents each having a value of 2), and the other of the exponents is 3, so the mantissa product for the others of the exponents is shifted one place (e.g., to the left) to align the mantissa products to have a same exponent as the maximum exponent. In the depicted embodiment, the maximum exponent (e.g., a value indicative of the maximum exponent) is output along path 1241 to the set of shift registers (e.g., including shift register 1236) and normalization circuit 1250. In this example, each shifted mantissa product is output into a respective numeric conversion circuit (e.g., 2's complement circuit), but in the third mode the products pass through the numeric conversion circuit without being changed, e.g., the products are already in 2's complement representation so they are not further converted.

In one embodiment, a shift register passes a value through without shifting, e.g., when the maximum exponent (e.g., sum of two exponents) is the same as the exponent for the index position, e.g., where numeric conversion circuit 1242 and shift register 1236 are used for index position 0 of the input vectors.

In the depicted embodiment, the shifted mantissa products for each pair of elements (e.g., at a same element position) are then all added together with the set of (e.g., fixed-point) (e.g., integer) adders 1246 into a single product. In one embodiment, single product is sent from output 1247 to accumulator 1210, e.g., as discussed below.

Accumulators

Optionally, the circuit 1200 includes accumulator 1210 to accumulate resultants from the sum of products circuit 1201. In one embodiment, accumulator 1210 incudes a fixed-point (e.g., integer) adder 1256, e.g., and no floating-point adder (s).

In certain embodiments, the mode controller 1206 being in the second mode causes the resultants sent from output 1247 of the sum of products circuit 1201 to be accumulated with accumulator circuit 1210 (e.g., added to previously accumulated resultants from (e.g., fixed-point) accumulator storage 1258 by fixed-point adder 1256). In one embodiment, the other circuitry (e.g., shift register 1266, shift register 1268, and fixed-point to floating-point conversion circuit 1270) allows passage through in this mode without modifying the data (e.g., resultants).

In certain embodiments, the mode controller 1206 being in the first mode causes the resultants sent from output 1247 of the sum of products circuit 1201 to be (e.g., only) accumulated by using the maximum exponent from path 1241 determined for the current resultant. In one embodiment, the mode controller 1206 being in the first mode causes the current resultant (e.g., the sum of the products of the mantissa pairs) to be sent from output 1247 of the sum of products circuit 1201 to first shift register 1266 and any accumulated resultant (e.g., from accumulator storage 1258) sent to the second shift register 1268 so that shift register 1266 and/or shift register 1268 respectively shift (e.g., align) the current resultant and/or the accumulated resultant based on the maximum exponent stored in exponent accumulator storage 1262 for the accumulation operation (e.g., for multiple floating-point resultants that have been accumulated over a time period from output 1247) from second maximum exponent determiner circuit 1264 and the current maximum exponent from path 1241 determined for the current resultant. After the resultants have been shifted (e.g., aligned), in one embodiment they are added together by (e.g., fixed-point) (e.g., integer) adder 1256 and that updated resultant (and its exponent) may then be sent to normalization circuit 1250, e.g., to move the most significant digit of the significand (e.g., the single product) of a non-zero number to be non-zero (e.g., and moves the maximum exponent value accordingly according to the move of the single product). In certain embodiments, the (e.g., unsigned) version of the accumulated sum of products of the mantissas is stored in accumulator storage 1258. The current exponent for the accumulated sum of products of the mantissas may then be compared by the adjust accumulator exponent circuit 1260 against the previous exponent for the accumulated sum of products of the mantissas in accumulator storage 1262, e.g., and that value updated if the current exponent is greater than the previous exponent. In certain embodiments, at the end of the accumulation, the accumulated sum of products of the mantissas from accumulator storage 1258 and the exponent for the accumulated sum of products of the mantissas from accumulator storage 1262 are sent to fixed-point to floating-point conversion circuit 1270 (e.g., including a 2's complement circuit) to convert the accumulated sum and its exponent into a floating-point format.

In certain embodiments, circuit 1200 receives a value (e.g., from a core offloading to an accelerator embodiment of circuit 1200) indicating the iterations to be performed by the sum of products circuit 1201, e.g., to decouple the width of a vector (e.g., having a number of elements greater than N+1) to be processed by the circuit 1200 from the hardware width (e.g., a vector having a maximum of N+1 elements) of the sum of products circuit 1201. In one embodiment, circuit 1200 is to notify to the requesting entity (e.g., core) of completion by performing a notification action (e.g., raising a flag so that the appropriate output data is read by the requesting entity).

Figure 13A:
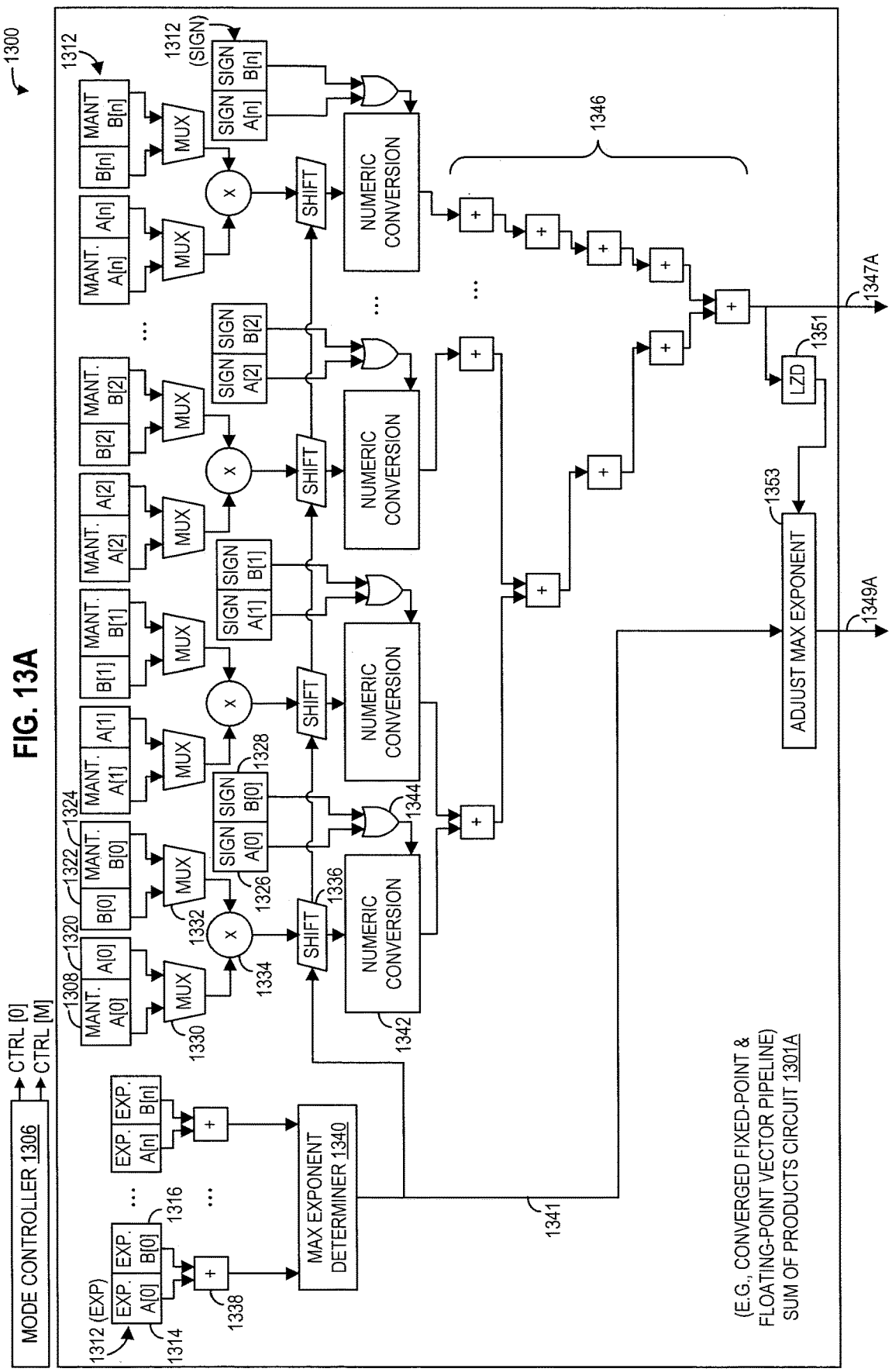
FIGS. 13A-13C illustrate a fixed-point and floating-point vector multiplication circuit subdivided into multiple sections that each have their own maximum exponent according to embodiments of the disclosure.
Figure 13B:
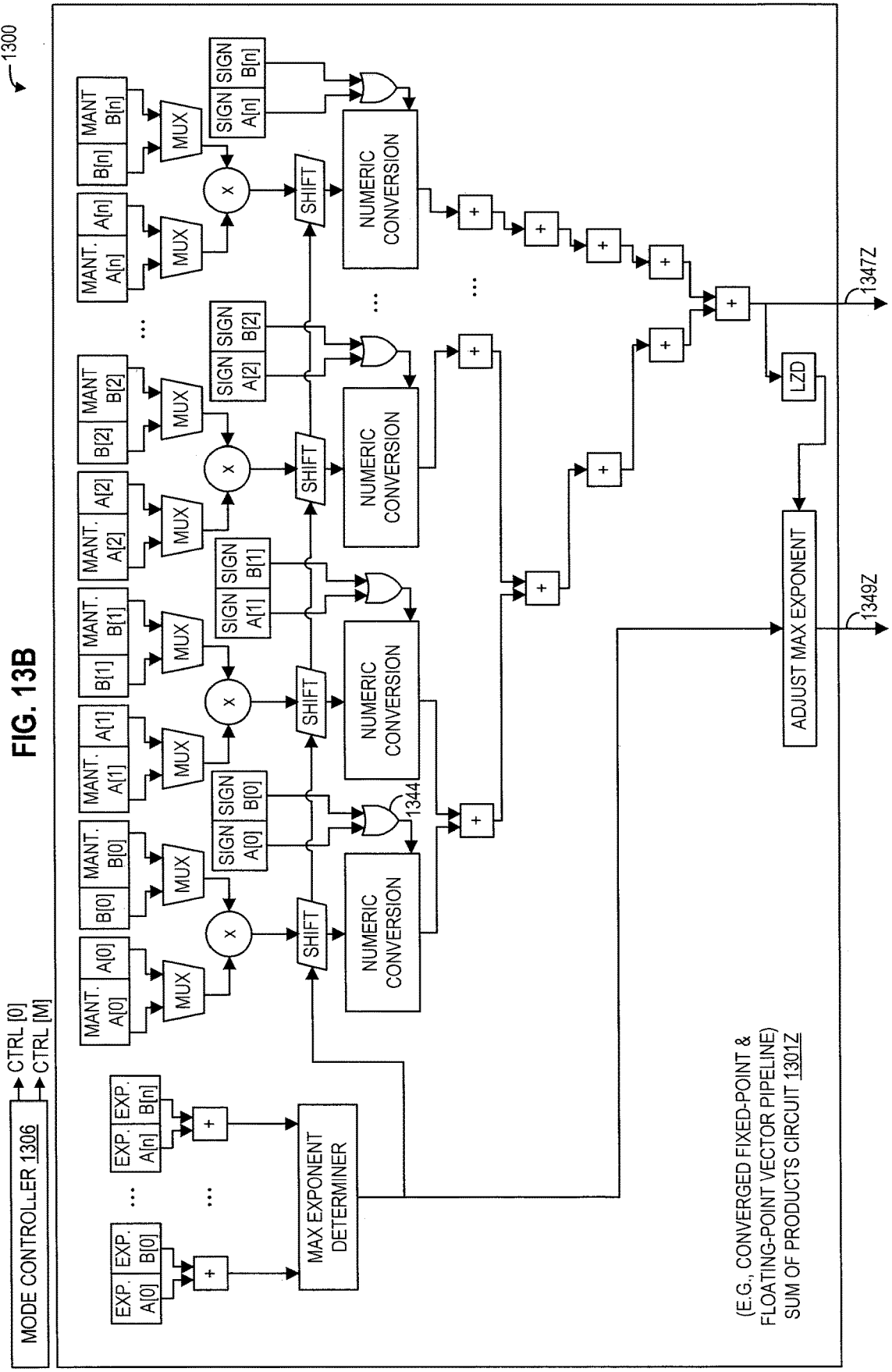
Figure 13C:
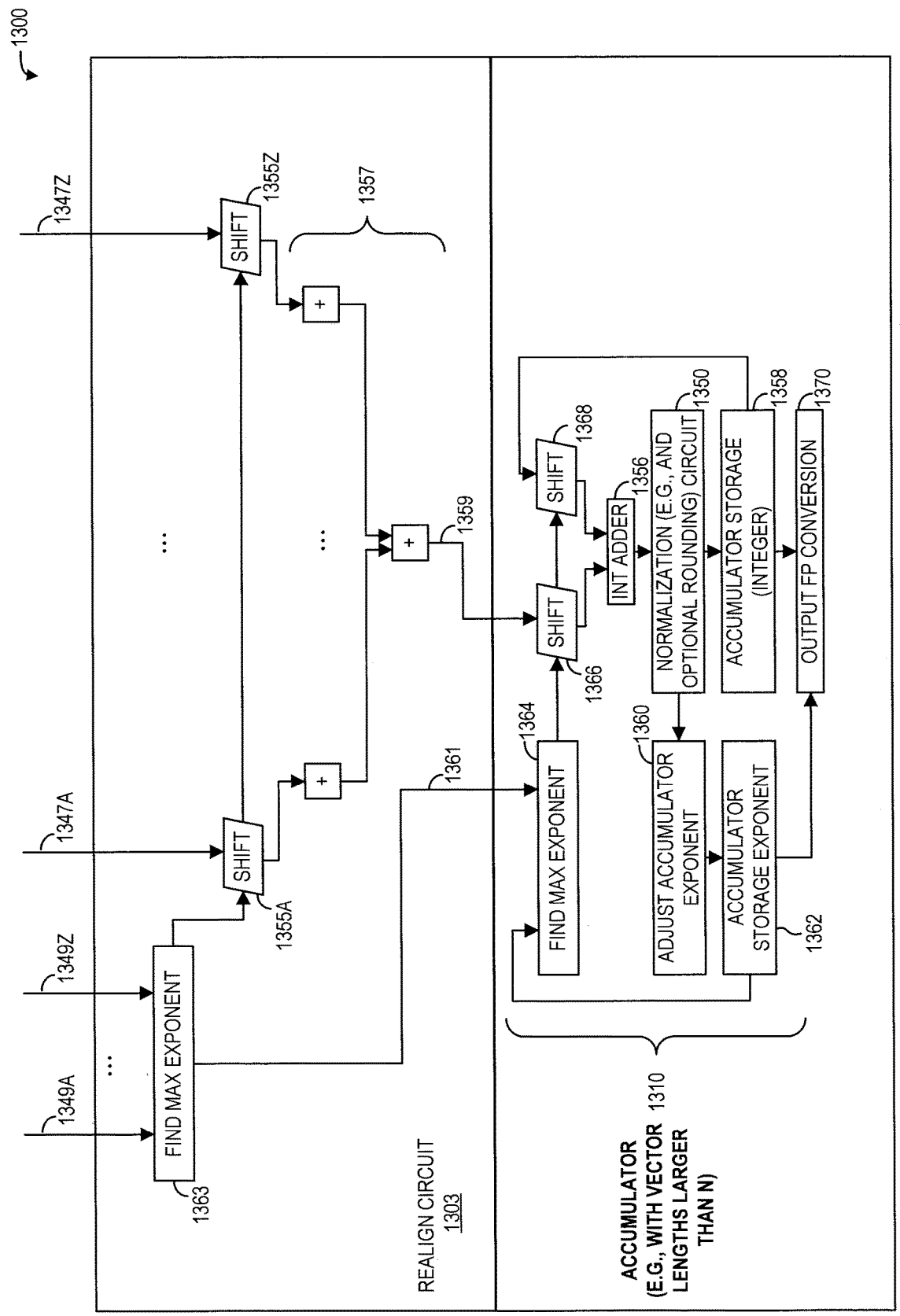

FIGS. 13A-13C illustrate a fixed-point and floating-point vector multiplication circuit 1300 subdivided into multiple sections 1301A-1301Z that each have their own maximum exponent according to embodiments of the disclosure. The Z in 1301Z may be any number or letter that indicates a desired number of instances of circuit sections. For example, two circuit sections may be referred to as 1301A and 1301B, and thus two maximum exponents are found, respectively. In certain embodiments, statistically the error is based on the total vector hardware (e.g., pipeline) size (e.g., N+1 in FIGS. 10-12), e.g., where the larger the size, the higher the probability of error. Certain embodiments herein reduce the error by breaking up the sum of products circuit (e.g., pipeline) into smaller chunks of size R+1, e.g., by employing (N+1)/(R+1) such of the sum of products circuits (e.g., pipelines) to create a total size of N+1. For example, a 32 element [0-31 element positions] vector operation may include four sum of products circuits, with each sum of products circuit processing a proper subset of the 32 element vector, e.g., element positions 0-7 input to a first circuit section (e.g., circuit 1301A), element positions 8-15 input to a second circuit section (e.g., circuit 1301B according to this naming convention), element positions 16-23 input to a third circuit section (e.g., circuit 1301C according to this naming convention), and element positions 24-31 input to a fourth circuit section (e.g., circuit 1301D according to this naming convention).

However, in certain embodiments, when merging between these sum of products circuits (e.g., pipelines), leading zero detect, readjusting the accumulator, and/or shifting of each of the final adder outputs (e.g., from output 1247 in FIG. 12 as an example) is to be redone. Certain embodiments herein readjust the exponent from each of the final adder outputs (e.g., from output 1247 in FIG. 12 as an example), e.g., with realign circuit 1303, by detecting leading zeros and then recalculating the maximum exponent across the sum of products circuits (e.g., "buckets"). Each of the adder outputs may then be added based on the new max exponent across the sum of products circuits 1301A-1301Z.

In certain embodiments, this approach provides a statistically lesser error prone result, e.g., and has a lower gate count and area than a floating-point only vector multiplication circuit.

In one embodiment, the exponent values that are input (e.g., the exponent values of floating-point numbers) are only allowed to only take certain values, for example, a new exponent can only be a multiple of 4. In one embodiment, the shift register utilized may not be a full barrel shifter but instead provide limited combinations of shifts. In certain embodiments, this simplifies the leading zero detection (LZD) circuit as well since zeros can be detected in groups of two or more rather than bit wise.

Circuit 1300 includes a mode controller 1306 (e.g., circuit) to switch (e.g., select) between a fixed-point mode and a floating-point mode. In one embodiment, mode controller 1306 is to switch between (e.g., any of) fixed-point mode, Flexpoint mode, and floating-point mode. Circuit 1300 includes a plurality (e.g., 2 or more) of sum of products circuits (e.g., pipelines) 1301A (in FIG. 3A)-1301Z (in FIG. 3B), realign circuit 1303 (in FIG. 3C), and a fixed-point accumulator 1310 (in FIG. 3C). In one embodiment, the accumulators in FIG. 10 are used instead of the accumulator 1310. In the depicted embodiment, the floating-point (and/or Flexpoint) inputs (e.g., input registers) and fixed-point inputs are shown as being separate inputs. In one embodiment, a same register is used for either fixed-point data or floating-point data (e.g., or Flexpoint data). For example, a first register to store fixed-point data or floating-point data (e.g., or Flexpoint data) for a first vector (e.g., vector A) and a second register to store fixed-point data or floating-point data (e.g., or Flexpoint data) for a second vector (e.g., vector B). In one embodiment, a separate register is used for fixed-point data and floating-point data (e.g., and Flexpoint data). For example, a first register to store fixed-point data for a first, fixed-point vector (e.g., fixed-point vector A), a second register to store fixed-point data for a second, fixed-point vector (e.g., fixed-point vector B), a third register to store floating-point data for a third, floating-point vector (e.g., floating-point vector A), and a fourth register to store floating-point data for a fourth, floating-point vector (e.g., floating-point vector B). In one embodiment. Flexpoint data is stored in its own register(s). In one embodiment, inputs 1312 include an input for each element of a fixed-point vector (e.g., including input 1320 for a first element [0] of a first vector A and/or input 1322 for a first element [0] of a second vector B) and an input for each element (e.g., a sign bit 1312(sign), exponent 1312(exp), and mantissa of each element) of a floating-point vector (e.g., including input 1326 for the sign bit for a first element [0] of a first vector A, input 1314 for the exponent bits for the first element [0] of the first vector A, and input 1308 for the mantissa bits for the first element [0] of the first vector A, and/or including input 1326 for the sign bit for a first element [0] of a second vector B, input 1314 for the exponent bits for the first element [0] of the second vector B, and input 1308 for the mantissa bits for the first element [0] of the second vector B). In certain embodiments, inputs 1312 include an input for each element (e.g., an exponent 1312(exp) and mantissa of each element) of a Flexpoint vector (e.g., including input 1314 for the exponent bits for the first element [0] of a first vector A and input 1308 for the mantissa bits for the first element [0] of the first vector A, and/or including input 1314 for the exponent bits for the first element [0] of a second vector B, and input 1308 for the mantissa bits for the first element [0] of the second vector B). In one embodiment, the vectors (e.g., A[N+1] and B[N+1]) to be operated on by fixed-point and floating-point vector multiplication circuit 1300 have a same number of elements equal to N+1. N may be any positive integer in certain embodiments.

A reference number for the other inputs (e.g., for elements 1 through N) are not drawn in this figure so as not obfuscate the data flow/lines. Further, the control inputs/lines (e.g., for the switches, shifters, numeric conversion circuits (e.g., 2's complement circuits)) are not drawn so as not obfuscate the data flow/lines. Control inputs/lines to components may extend from a mode controller.

In certain embodiments, each element position (e.g., 0 to N) of the vectors to be processed includes a respective multiplier, shift register, and numeric conversion circuit to process the mantissas in that element position, XOR logic gate, and/or an adder to process (e.g., add together) the exponents in that element position. Those set of components may be referred to as an element block (e.g., with N+1 element blocks total in (N+1)/(R+1) sum of products circuit sections in FIG. 13C). The following description refers to sum of products circuit section 1301A, but is also applicable for the other sum of products circuit section, for example, with all sum of products circuit sections 1301A-1301Z being identical (e.g., and controlled by single mode controller 1306.

First Mode

In one embodiment, mode controller (e.g., via a request to perform a sum of products operation) is in a first (e.g., floating-point) mode to perform an operation on floating-point input data.

As one example, in the first (e.g., floating-point) mode, each of these floating-point numbers is partitioned into its sign-bit, exponent-bits, and mantissa-bits. At this initial partitioning, the leading hidden bit which can be 1 or 0, depending on the exponent, is concatenated on to the mantissa. Subsequently a pair-wise multiplication is performed between corresponding mantissas of each vector, exponents are added together, and respective sign-bits are logically XORed. At the output of the multiplication stage, the mantissas can be truncated or expanded into a desirable internal bit length (e.g., word-length) to trade-off resource utilization with solution accuracy. In parallel, all the exponents are compared in a tree with $\log_2$ n of stages. The highest exponent becomes the reference and all the mantissas are aligned to this reference. After this alignment, the mantissas are converted into a fixed-point (e.g., 2's complement) number representation. In one embodiment of the next stage, the sum-reduction is performed on the mantissas, and at each level of this reduction-tree the bit-length (e.g., word-length) is increased by one bit to prevent overflow. After this summation, the fixed-point number is reconverted to sign and magnitude, aligned to drop the leading one, and the exponent corrected. From these values, a standards compliant floating-point number is generated and output in this example. In one embodiment, the standard is an IEEE floating-point arithmetic standard (e.g., 754-2008—the IEEE Computer Society's Standard for Floating-Point Arithmetic published on Aug. 29, 2008).

As another example, in the first mode, input sourcing multiplexers (e.g., multiplexers 1330 and 1332) are sent a control value to source a pair of mantissas from corresponding (e.g., having the same element position in the vectors) elements of the input vectors (e.g., sourcing mantissas of both elements with index 0 of floating-point vectors A and B as one pair, mantissas of both elements with index 1 of floating-point vectors A and B as a second pair, mantissas of both elements with index 2 of floating-point vectors A and B as a third pair, etc.). In this example, each pair of mantissas are multiplied together by a multiplier to produce a respective product (e.g., n+1 corresponding products in this Figure), for example, mantissa A[0] 1308 from the element having index 0 of vector A and mantissa B[0] 1324 from the element having index 0 of vector B are multiplied by (e.g., fixed-point) multiplier 1334 to produce a product. The products from each multiplier in the depicted embodiment are output to a shift register (e.g., shifter) to shift (e.g., move) each product based on its determined exponent (e.g., of the products) and a maximum exponent (e.g., of the products). In this example, a pair of exponents from corresponding (e.g., having the same element position in the vectors) elements of the input vectors (e.g., sourcing exponents of both elements with index 0 of floating-point vectors A and B as one pair, exponents of both elements with index 1 of floating-point vectors A and B as a second pair, exponents of both elements with index 2 of floating-point vectors A and B as a third pair, etc.) are added together by a respective (e.g., fixed-point) (e.g., integer) adder to produce a sum of the exponents (e.g., the exponent of the product of a pair of elements from vector A and vector B). In this example, the sum of the exponents (e.g., n+1 sums in this Figure) are each input into a maximum exponent determiner 1340 (e.g., comparator circuit). For example, the exponent A[0] 1314 from the element having index 0 of vector A and exponent B [0] 1316 from the element having index 0 of vector B are added together by (e.g., fixed-point) (e.g., integer) adder 1338 to produce the sum of exponent A[0] 1314 and exponent B[0] 1316. The maximum exponent determiner 1340 (e.g., circuit) is then to compare the sums of the exponents against each other to determine the maximum (e.g., largest value) of the sums of the exponents, e.g., the maximum exponent of the exponents for the corresponding products of mantissas. In one embodiment, the maximum of the sums of the exponents is the maximum exponent of the mantissa products. The maximum exponent in the depicted embodiment is then used to shift the other mantissa products accordingly, e.g., to align the other mantissa products to the maximum exponent. In one embodiment, a maximum exponent is 4 (e.g., the sum of two exponents each having a value of 2), and the other of the exponents is 3, so the mantissa product for the others of the exponents is shifted one place (e.g., to the left) to align the mantissa products to have a same exponent as the maximum exponent. In the depicted embodiment, the maximum exponent (e.g., a value indicative of the maximum exponent) is output along path 1341 to the set of shift registers (e.g., including shift register 1336) and a second maximum exponent determiner circuit 1364. In this example, each shifted mantissa product is output to a respective numeric conversion circuit (e.g., 2's complement circuit). For example, numeric conversion circuit 1342 (e.g., 2's complement circuit) receiving an unsigned (e.g. and shifted) mantissa product output from shift register 1336. Each respective numeric conversion circuit (e.g., 2's complement circuit) is to then convert the (e.g., shifted) mantissa product from an unsigned format (e.g., value) to a signed format (e.g., value). In one embodiment, this conversion is a 2's complement operation performed on the (e.g., shifted) mantissa product (for example, to convert from unsigned (e.g., binary) format to 2's complement format) based on the output from each respective XOR logic gate.

In one embodiment, a shift register passes a value through without shifting, e.g., when the maximum exponent (e.g., sum of two exponents) is the same as the exponent for the index position, e.g., where numeric conversion circuit 1342 and shift register 1336 are used for index position 0 of the input vectors.

In the depicted embodiment, each sign bit for a pair of sign bits from corresponding (e.g., having the same element position in the vectors) elements of the input vectors (e.g., sourcing sign bits of both elements with index 0 of floating-point vectors A and B as one pair, sign bits of both elements with index 1 of floating-point vectors A and B as a second pair, sign bits of both elements with index 2 of floating-point vectors A and B as a third pair, etc.) are logically, exclusively ORed (XORed) together by a respective (e.g., fixed-point) logic gate that implements an XOR to produce a value that indicate if the mantissa product is negative or positive, for example, the value being 0 for positive and 1 for negative. In the depicted embodiment, XOR logic gate 1344 receives a sign bit from input 1326 for the first element [0] of the first vector A and a sign bit from input 1328 for the first element [0] of the second vector B and outputs a first value (e.g., 1 indicating the product is negative) when only one of the inputs 1326, 1328 is a 1 to indicate false (e.g., negative) and a second value (e.g., 0 indicating the product is positive) otherwise.

In the depicted embodiment, a leading zero detection (LDZ) circuit (e.g., circuit 1351 for sum of products circuit 1301A) is included to detect any leading zeros of the outputs (e.g., output 1347A for sum of products circuit 1301A and output 1347Z for sum of products circuits 1301Z) and realign circuit 1303 is to adjust the maximum exponent (e.g., from path 1341 with adjusted maximum exponent circuit 1353 for sum of products circuits 1301A) to an adjusted maximum exponent (e.g., adjusted maximum exponent 1349A for sum of products circuits 1301A and adjusted maximum exponent 1349Z for sum of products circuits 1301Z) that reflects the number of leading zeros that are to be removed by a respective shift register 1355A-1355Z (e.g., 1355A for sum of products circuit 1301A and 1355Z for sum of products circuit 1301Z) to align the maximum exponent determined (e.g., by 1340 for sum of products circuit 1301A) for the maximum exponent of each of the maximum exponents sum from products circuits 1301A-1301Z. The shifted (e.g., aligned) single resultants from the outputs (e.g., output 1347A for sum of products circuit 1301A and output 1347Z for sum of products circuits 1301Z) are then added together by second set of adders 1357 to produce a single resultant at output 1359. In one embodiment, an adjusted maximum exponent (e.g., output 1361 from another maximum exponent circuit 1363 of realign circuit 1303) and/or single product (e.g., output 1359 for realign circuit 1303) is sent for each output (e.g., of a single adjusted maximum exponent from output 1361, and a single product from output 1359 corresponding to that single adjusted maximum exponent) of the set of sum of products circuits (e.g., output 1347A for sum of products circuit 1301A and output 1347Z for sum of products circuits 1301Z) to accumulator 1310, e.g., as discussed below.

Second Mode

In one embodiment, mode controller (e.g., via a request to perform a sum of products operation) is in a second (e.g., fixed-point) mode to perform an operation on fixed-point input data.

As one example, in the second (e.g., fixed-point) mode, the sum of products circuit is to multiply each pair of fixed-point (e.g., integer) values from a same element position (e.g., 0 to N) of the input vectors to be a product, and sum those products to produce a single, fixed-point resultant at output 1359.

As another example, in the second (e.g., fixed-point) mode, input sourcing multiplexers (e.g., multiplexers 1330 and 1332) are sent a control value to source a pair of values from corresponding (e.g., having the same element position in the vectors) elements of the input vectors (e.g., sourcing values of both elements with index 0 of fixed-point vectors A and B as one pair, values of both elements with index 1 of fixed-point vectors A and B as a second pair, values of both elements with index 2 of fixed-point vectors A and B as a third pair, etc.) for each of sum of products circuit 1301A-1301Z. In this example, each pair of values are multiplied together by a multiplier to produce a respective product (e.g., n+1 corresponding products in this Figure), for example, value A[0] 1320 from the element having index 0 of vector A and value B[0] 1322 from the element having index 0 of vector B are multiplied by (e.g., fixed-point) multiplier 1334 to produce a product. The products from each multiplier in the depicted embodiment are output to a respective shift register (e.g., shifter), but in the second mode the products pass through the shift register without being changed, e.g., the products are not shifted (e.g., moved). In this example, each unshifted products output from each shift register are input into a respective numeric conversion circuit (e.g., 2's complement circuit), but in the second mode the products pass through the numeric conversion circuit without being changed, e.g., the products are already in 2's complement representation so they are not further converted. The (e.g., signed) products for each pair of elements (e.g., at a same element position) for a single sum of products circuit are then all added together with the set of (e.g., fixed-point) (e.g., integer) adders (e.g., adders 1346 for sum of products circuit 1301A) into a single fixed-point resultant. These single resultants from each sum of products circuits 1301A-1301Z are then added together by set of (e.g., fixed-point) (e.g., integer) adders 1357 into a single fixed-point resultant (e.g., without any shifting by shift register 1355A or shift register 1355Z). In one embodiment, single fixed-point resultant (e.g., product) is sent from output 1359 to accumulator 1310, e.g., as discussed below.

Third Mode

In one embodiment, mode controller (e.g., via a request to perform a sum of products operation) is in a third (e.g., Flexpoint) mode to perform an operation on Flexpoint input data.

As one example, in the third (e.g., Flexpoint) mode, each of these Flexpoint numbers is partitioned into exponent-bits, and integer (2's complement) mantissa-bits, e.g., instead of binary mantissa-bits as in a floating-point format. Subsequently a pair-wise multiplication is performed between corresponding mantissas of each vector, and exponents are added together. At the output of the multiplication stage, the mantissas can be truncated or expanded into a desirable internal bit length (e.g., word-length) to trade-off resource utilization with solution accuracy. In parallel, all the exponents are compared in a tree with $\log_2 n$ of stages. The highest exponent becomes the reference and all the mantissas are aligned to this reference. After this alignment in one embodiment of the third mode, the mantissas are not converted into a fixed-point (e.g., 2's complement) number representation as they are already in that format. In one embodiment of the next stage, the sum-reduction is performed on the mantissas, and at each level of this reduction-tree the bit-length (e.g., word-length) is increased by one bit to prevent overflow. After this summation, on one embodiment, the resultant (e.g., mantissa and exponent) is shifted to the desired magnitude (e.g., in a FlexN+M format discussed above).

As another example, in the third mode, input sourcing multiplexers (e.g., multiplexers 1330 and 1332) are sent a control value to source a pair of Flexpoint (2's complement) mantissas from corresponding (e.g., having the same element position in the vectors) elements of the input vectors (e.g., sourcing mantissas of both elements with index 0 of Flexpoint vectors A and B as one pair, mantissas of both elements with index 1 of Flexpoint vectors A and B as a second pair, mantissas of both elements with index 2 of Flexpoint vectors A and B as a third pair, etc.). In this example, each pair of mantissas are multiplied together by a multiplier to produce a respective product (e.g., n+1 corresponding products in this Figure), for example, mantissa A[0] 1308 from the element having index 0 of vector A and mantissa B [0] 1324 from the element having index 0 of vector B are multiplied by (e.g., fixed-point) multiplier 1334 to produce a product. The products from each multiplier in the depicted embodiment are output to a shift register (e.g., shifter) to shift (e.g., move) each product based on its determined exponent (e.g., of the products) and a maximum exponent (e.g., of the products). In this example, a pair of exponents from corresponding (e.g., having the same element position in the vectors) elements of the input vectors (e.g., sourcing exponents of both elements with index 0 of Flexpoint vectors A and B as one pair, exponents of both elements with index 1 of Flexpoint vectors A and B as a second pair, exponents of both elements with index 2 of Flexpoint vectors A and B as a third pair, etc.) are added together by a respective (e.g., fixed-point) (e.g., integer) adder to produce a sum of the exponents (e.g., the exponent of the product of a pair of elements from vector A and vector B). In this example, the sum of the exponents (e.g., n+1 sums in this Figure) are each input into a maximum exponent determiner 1340 (e.g., comparator circuit). For example, the exponent A[0] 1314 from the element having index 0 of vector A and exponent B[0] 1316 from the element having index 0 of vector B are added together by (e.g., fixed-point) (e.g., integer) adder 1338 to produce the sum of exponent A[0] 1314 and exponent B[0] 1316. The maximum exponent determiner 1340 (e.g., circuit) is then to compare the sums of the exponents against each other to determine the maximum (e.g., largest value) of the sums of the exponents, e.g., the maximum exponent of the exponents for the corresponding products of mantissas. In one embodiment, the maximum of the sums of the exponents is the maximum exponent of the mantissa products. The maximum exponent in the depicted embodiment is then used to shift the other mantissa products accordingly, e.g., to align the other mantissa products to the maximum exponent. In one embodiment, a maximum exponent is 4 (e.g., the sum of two exponents each having a value of 2), and the other of the exponents is 3, so the mantissa product for the others of the exponents is shifted one place (e.g., to the left) to align the mantissa products to have a same exponent as the maximum exponent. In the depicted embodiment, the maximum exponent (e.g., a value indicative of the maximum exponent) is output along path 1341 to the set of shift registers (e.g., including shift register 1336). In this example, each shifted mantissa product is output into a respective numeric conversion circuit (e.g., 2's complement circuit), but in the third mode the products pass through the numeric conversion circuit without being changed, e.g., the products are already in 2's complement representation so they are not further converted.

In one embodiment, a shift register passes a value through without shifting, e.g., when the maximum exponent (e.g., sum of two exponents) is the same as the exponent for the index position, e.g., where numeric conversion circuit 1342 and shift register 1336 are used for index position 0 of the input vectors.

In the depicted embodiment, the shifted mantissa products for each pair of elements (e.g., at a same element position) are then all added together with the set of (e.g., fixed-point) (e.g., integer) adders (e.g., adders 1346 for sum of products circuit 1301A) into a single product (e.g., single product from output 1347A for sum of products circuit 1301A and single product from output 1347Z for sum of products circuit 1301Z) for each sum of products circuits 1301A-1301Z. In the depicted embodiment, a leading zero detection (LDZ) circuit (e.g., circuit 1351 for sum of products circuit 1301A) is included to detect any leading zeros of the outputs (e.g., output 1347A for sum of products circuit 1301A) and is to adjust the maximum exponent (e.g., from path 1341 for sum of products circuits 1301A) to an adjusted maximum exponent (e.g., adjusted maximum exponent 1349A for sum of products circuits 1301A and adjusted maximum exponent 1349Z for sum of products circuits 1301Z) that reflects the number of leading zeros that are to be removed by a respective shift registers 1355A-1355Z of realign circuit 1303 (e.g., 1355A for sum of products circuit 1301A and 1355Z for sum of products circuit 1301Z) to align the maximum exponent determined (e.g., by 1340 for sum of products circuit 1301A) for the maximum exponent of each of the maximum exponents sum from products circuits 1301A-1301Z. The shifted (e.g., aligned) single resultants from the outputs (e.g., output 1347A for sum of products circuit 1301A and output 1347Z for sum of products circuit 1301Z) are then added together by second set of adders 1357 to produce a single resultant at output 1359. In one embodiment, an adjusted maximum exponent (e.g., output 1361 from another maximum exponent circuit 1363 of realign circuit 1303) and/or single product (e.g., output 1359 for realign circuit 1303) is sent for each output (e.g., of a single adjusted maximum exponent from output 1361, and a single product from output 1359 corresponding to that single adjusted maximum exponent) of the set of sum of products circuits (e.g., output 1347A for sum of products circuit 1301A and output 1347Z for sum of products circuits 1301Z) to accumulator 1310, e.g., as discussed below.

Accumulators

Optionally, the circuit 1300 includes accumulator 1310 to accumulate resultants from the sum of products circuits 1301A-1301Z. In one embodiment, accumulator 1310 incudes a fixed-point (e.g., integer) adder 1356, e.g., and no floating-point adder(s).

In certain embodiments, the mode controller 1306 being in the second mode causes the resultants sent from output 1359 of the sum of products circuits 1301A-1301Z to be accumulated with accumulator circuit 1310 (e.g., added to previously accumulated resultants from (e.g., fixed-point) accumulator storage 1358 by fixed-point adder 1356). In one embodiment, the other circuitry (e.g., shift register 1366, shift register 1368, and fixed-point to floating-point conversion circuit 1370) allows passage through in this mode without modifying the data (e.g., resultants).

In certain embodiments, the mode controller 1306 being in the first mode causes the resultants sent from output 1359 of the sum of products circuits 1301A-1301Z to be (e.g., only) accumulated by using the maximum exponent from output 1361 determined for the current resultant. In one embodiment, the mode controller 1306 being in the first mode causes the current resultant (e.g., the sum of the products of the mantissa pairs) to be sent from output 1359 of the realign circuit 1303 for a sum of products from circuits 1301A-1301Z to first shift register 1366 and any accumulated resultant (e.g., from accumulator storage 1358) sent to the second shift register 1368 so that shift register 1366 and/or shift register 1368 respectively shift (e.g., align) the current resultant and/or the accumulated resultant based on the maximum exponent stored in exponent accumulator storage 1362 for the accumulation operation (e.g., for multiple floating-point resultants that have been accumulated over a time period from output 1359) from second maximum exponent determiner circuit 1364 and the current maximum exponent from path 1341 determined for the current resultant. After the resultants have been shifted (e.g., aligned), in one embodiment they are added together by (e.g., fixed-point) (e.g., integer) adder 1356 and that updated resultant (and its exponent) may then be sent to normalization circuit 1350, e.g., to move the most significant digit of the significand (e.g., the single product) of a non-zero number to be non-zero (e.g., and moves the maximum exponent value accordingly according to the move of the single product). In certain embodiments, the (e.g., unsigned) version of the accumulated sum of products of the mantissas is stored in accumulator storage 1358. The current exponent for the accumulated sum of products of the mantissas may then be compared by the adjust accumulator exponent circuit 1360 against the previous exponent for the accumulated sum of products of the mantissas in accumulator storage 1362, e.g., and that value updated if the current exponent is greater than the previous exponent. In certain embodiments, at the end of the accumulation, the accumulated sum of products of the mantissas from accumulator storage 1358 and the exponent for the accumulated sum of products of the mantissas from accumulator storage 1362 are sent to fixed-point to floating-point conversion circuit 1370 (e.g., including a 2's complement circuit) to convert the accumulated sum and its exponent into a floating-point format.

In certain embodiments, circuit 1300 receives a value (e.g., from a core offloading to an accelerator embodiment of circuit 1300) indicating the iterations to be performed by the sum of products circuits 1301A-1301Z, e.g., to decouple the width of a vector (e.g., having a number of elements greater than N+1) to be processed by the circuit 1300 from the hardware width (e.g., a vector having a maximum of N+1 elements) of the sum of products circuits 1301A-1301Z. In one embodiment, circuit 1300 is to notify to the requesting entity (e.g., core) of completion by performing a notification action (e.g., raising a flag so that the appropriate output data is read by the requesting entity).

Figure 14A:
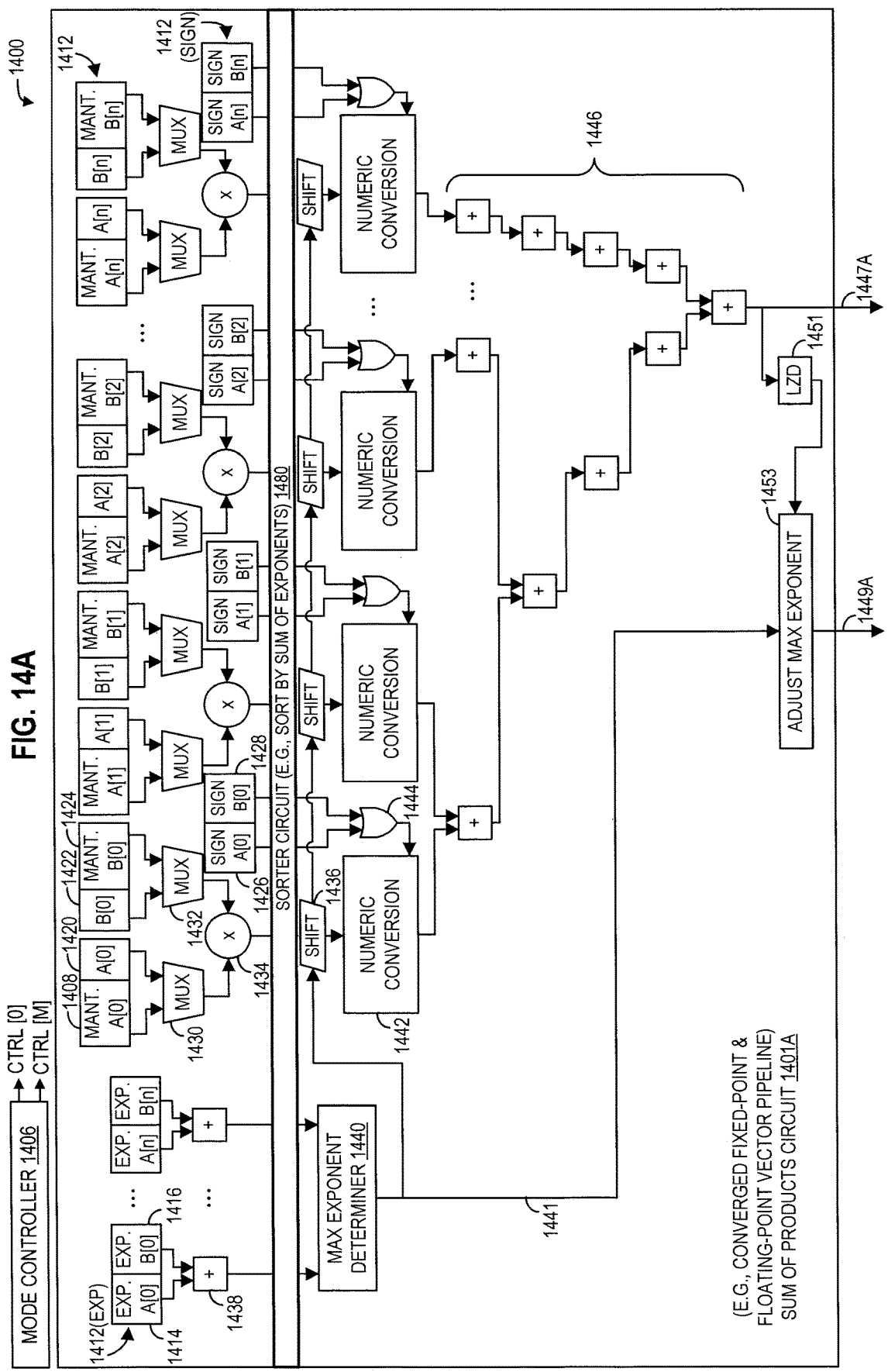
FIGS. 14A-14C illustrate a fixed-point and floating-point vector multiplication circuit subdivided into multiple sections that each have their own maximum exponent and are sorted by sum of exponents according to embodiments of the disclosure.
Figure 14B:
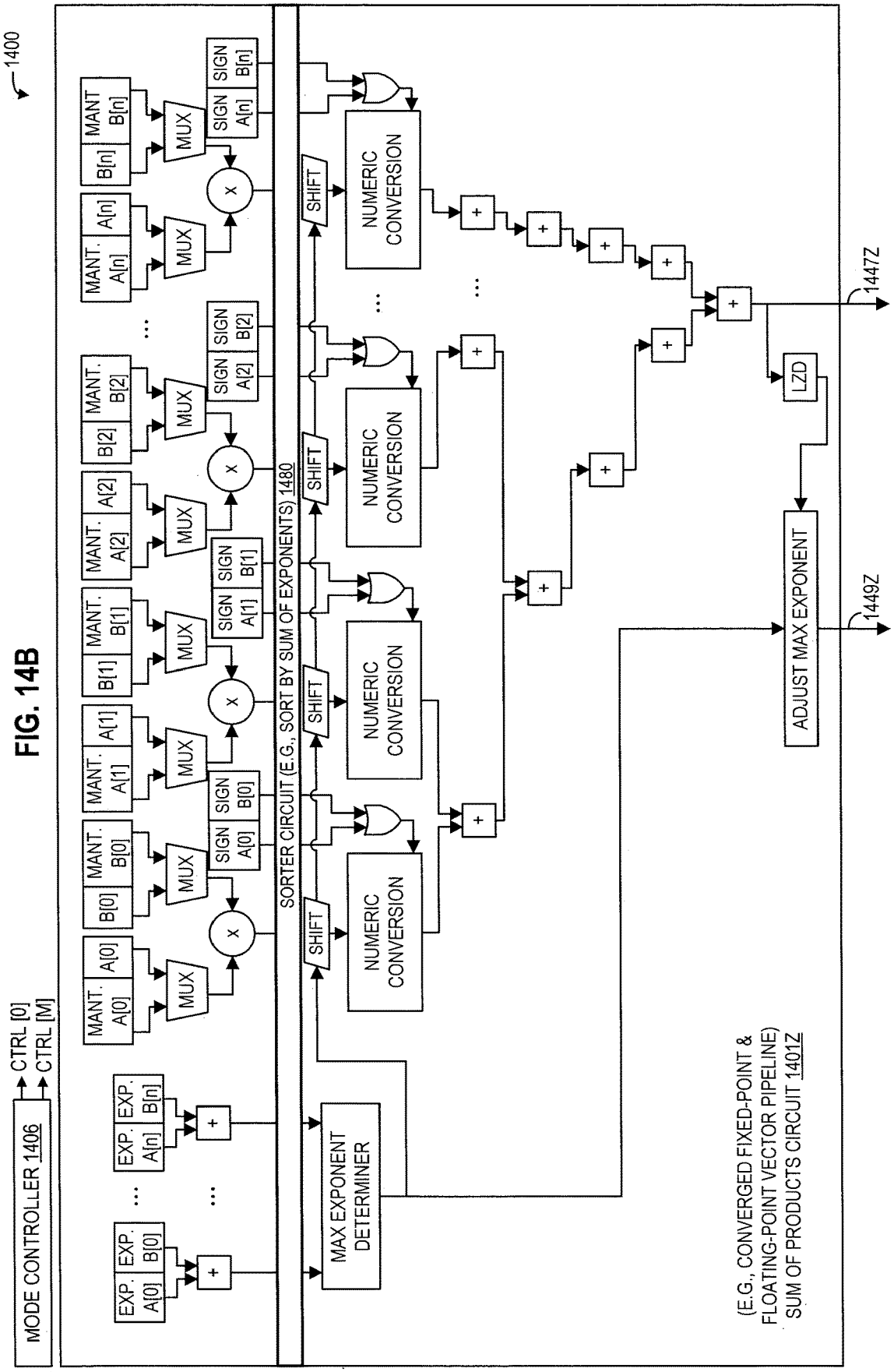
Figure 14C:
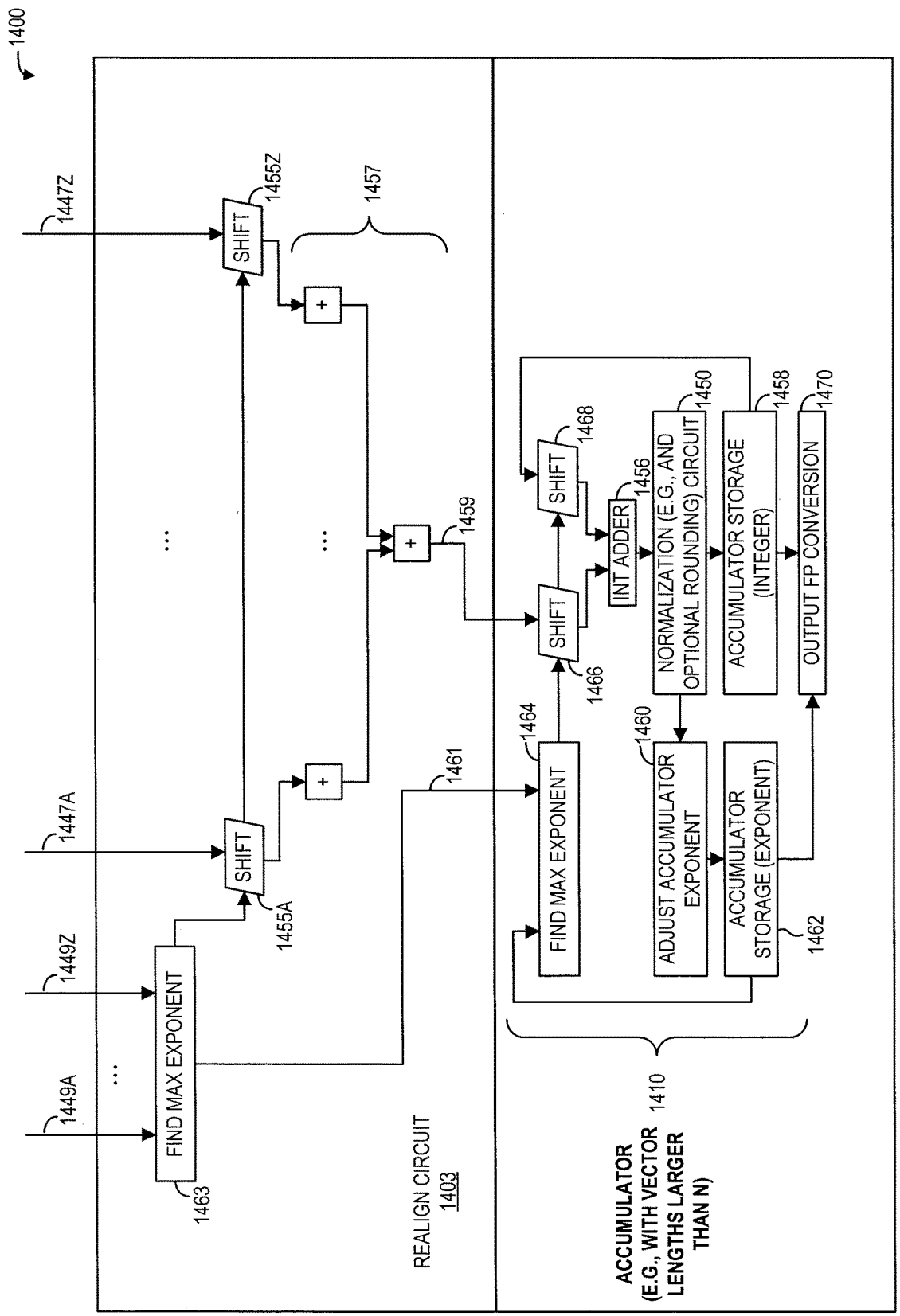

FIGS. 14A-14C illustrate a fixed-point and floating-point vector multiplication circuit 1400 subdivided into multiple sections 1401A-1401Z that each have their own maximum exponent and are sorted by sum of exponent according to embodiments of the disclosure.

The Z in 1401Z may be any number or letter that indicates a desired number of instances of circuit sections. For example, two circuit sections may be referred to as 1401A and 1401B, and thus two maximum exponents are found, respectively. Certain embodiments herein readjust the exponent from each of the final adder outputs (e.g., from output 1247 in FIG. 12 as an example), e.g., with realign circuit 1403, by detecting leading zeros and then recalculating the maximum exponent across the sum of products circuits (e.g., "buckets"). In one embodiment, each of the adder outputs may then be added based on the new max exponent across the sum of products circuits 1401A-1401Z. In certain embodiments, this approach provides a statistically lesser error prone result, e.g., and has a lower gate count and area than a floating-point only vector multiplication circuit.

In comparison to one embodiment in FIGS. 13A-13C, the embodiment depicted in FIGS. 14A-14C includes a sorter circuit 1480 (e.g., shared between each of the sum of products circuits 1401A-1401Z). In one embodiment, sorter circuit 1480 sorts the input elements (e.g., in ascending or descending order) by the sum of the exponents (e.g., the exponent of the product of a pair of elements from vector A and vector B). In one embodiment, the sorting does change the physical sorting in an input register. In one embodiment, the sorting does not change the physical sorting in an input register, but changes the (e.g., switch) connections in respective sum of products circuits 1401A-1401Z. In one embodiment, the sorting by the sum of the exponents causes the corresponding mantissas (or mantissa products from each multiplier) to be sorted in that same order, e.g., the associated values of the sorted exponents (for example, the corresponding mantissas products from each multiplier and the XOR logic gate output (e.g., the input sign bits)) are sorted into the sum of products circuits 1401A-1401Z. In certain embodiments, the magnitudes of each set of elements of the vector that is operated on by a respective sum of products circuits 1401A-1401Z will be closer than the magnitudes in a non-sorted embodiment and thus provides a statistically lesser error prone result. Although the sorter circuit is shown as between certain components, it should be understood that it may be placed in other locations (for example, between multiplexers (e.g., 1430) and multipliers (e.g., 1434). In one embodiment, sorter circuit 1480 is only used in a single mode (e.g., the first mode).

Circuit 1400 includes a mode controller 1406 (e.g., circuit) to switch (e.g., select) between a fixed-point mode and a floating-point mode. In one embodiment, mode controller 1406 is to switch between (e.g., any of) fixed-point mode, Flexpoint mode, and floating-point mode. Circuit 1400 includes a plurality (e.g., 2 or more) of sum of products circuits (e.g., pipelines) 1401A (in FIG. 4A)-1401Z (in FIG. 4B), realign circuit 1403 (in FIG. 4C), and a fixed-point accumulator 1410 (in FIG. 4C). In one embodiment, the accumulators in FIG. 10 are used instead of the accumulator 1410. In the depicted embodiment, the floating-point (and/or Flexpoint) inputs (e.g., input registers) and fixed-point inputs are shown as being separate inputs. In one embodiment, a same register is used for either fixed-point data or floating-point data (e.g., or Flexpoint data). For example, a first register to store fixed-point data or floating-point data (e.g., or Flexpoint data) for a first vector (e.g., vector A) and a second register to store fixed-point data or floating-point data (e.g., or Flexpoint data) for a second vector (e.g., vector B). In one embodiment, a separate register is used for fixed-point data and floating-point data (e.g., and Flexpoint data). For example, a first register to store fixed-point data for a first, fixed-point vector (e.g., fixed-point vector A), a second register to store fixed-point data for a second, fixed-point vector (e.g., fixed-point vector B), a third register to store floating-point data for a third, floating-point vector (e.g., floating-point vector A), and a fourth register to store floating-point data for a fourth, floating-point vector (e.g., floating-point vector B). In one embodiment. Flexpoint data is stored in its own register(s). In one embodiment, inputs 1412 include an input for each element of a fixed-point vector (e.g., including input 1420 for a first element [0] of a first vector A and/or input 1422 for a first element [0] of a second vector B) and an input for each element (e.g., a sign bit 1412(sign), exponent 1412(exp), and mantissa of each element) of a floating-point vector (e.g., including input 1426 for the sign bit for a first element [0] of a first vector A, input 1414 for the exponent bits for the first element [0] of the first vector A, and input 1408 for the mantissa bits for the first element [0] of the first vector A, and/or including input 1426 for the sign bit for a first element [0] of a second vector B, input 1414 for the exponent bits for the first element [0] of the second vector B, and input 1408 for the mantissa bits for the first element [0] of the second vector B). In certain embodiments, inputs 1412 include an input for each element (e.g., an exponent 1412(exp) and mantissa of each element) of a Flexpoint vector (e.g., including input 1414 for the exponent bits for the first element [0] of a first vector A and input 1408 for the mantissa bits for the first element [0] of the first vector A, and/or including input 1414 for the exponent bits for the first element [0] of a second vector B, and input 1408 for the mantissa bits for the first element [0] of the second vector B). In one embodiment, the vectors (e.g., A[N+1] and B[N+1]) to be operated on by fixed-point and floating-point vector multiplication circuit 1400 have a same number of elements equal to N+1. N may be any positive integer in certain embodiments.

A reference number for the other inputs (e.g., for elements 1 through N) are not drawn in this figure so as not obfuscate the data flow/lines. Further, the control inputs/lines (e.g., for the switches, shifters, numeric conversion circuits (e.g., 2's complement circuits)) are not drawn so as not obfuscate the data flow/lines. Control inputs/lines to components may extend from a mode controller.

In certain embodiments, each element position (e.g., 0 to N) of the vectors to be processed includes a respective multiplier, shift register, and numeric conversion circuit to process the mantissas in that element position, XOR logic gate, and/or an adder to process (e.g., add together) the exponents in that element position. Those set of components may be referred to as an element block (e.g., with N+1 element blocks total in (N+1)/(R+1) sum of products circuit sections in FIG. 14). The following description refers to sum of products circuit section 1401A but is also applicable for the other sum of products circuit section, for example, with all sum of products circuit sections 1401A-1401Z being identical (e.g. and controlled by single mode controller 1406. Note that the elements having certain indexes below (e.g., index 0) may refer to the index of the element it its sorted format (e.g., sorted by sorter circuit 1480) and not the index of the element as it was input into respective sum of products circuits 1401A-1401Z.

First Mode

In one embodiment, mode controller (e.g., via a request to perform a sum of products operation) is in a first (e.g., floating-point) mode to perform an operation on floating-point input data.

As one example, in the first (e.g., floating-point) mode, each of these floating-point numbers is partitioned into its sign-bit, exponent-bits, and mantissa-bits. At this initial partitioning, the leading hidden bit which can be 1 or 0, depending on the exponent, is concatenated on to the mantissa. Subsequently a pair-wise multiplication is performed between corresponding mantissas of each vector, exponents are added together, and respective sign-bits are logically XORed. At the output of the multiplication stage, the mantissas can be truncated or expanded into a desirable internal bit length (e.g., word-length) to trade-off resource utilization with solution accuracy. In parallel, all the exponents are compared in a tree with $\log_2 n$ of stages. The highest exponent becomes the reference and all the mantissas are aligned to this reference. After this alignment, the mantissas are converted into a fixed-point (e.g., 2's complement) number representation. In one embodiment of the next stage, the sum-reduction is performed on the mantissas, and at each level of this reduction-tree the bit-length (e.g., word-length) is increased by one bit to prevent overflow. After this summation, the fixed-point number is reconverted to sign and magnitude, aligned to drop the leading one, and the exponent corrected. From these values, a standards compliant floating-point number is generated and output in this example. In one embodiment, the standard is an IEEE floating-point arithmetic standard (e.g., 754-2008—the IEEE Computer Society's Standard for Floating-Point Arithmetic published on Aug. 29, 2008).

In one embodiment, the sorting circuit 1480 is to sort the input data (e.g., mantissas and their corresponding exponents), e.g., to sort into proper subsets based on the value of the sum of a pair of exponents.

As another example, in the first mode, input sourcing multiplexers (e.g., multiplexers 1430 and 1432) are sent a control value (e.g., from sorting circuit 1480) to source a pair of mantissas from corresponding (e.g., having the same element position in the vectors) elements of the input vectors (e.g., sourcing mantissas of both elements with index 0 of floating-point vectors A and B as one pair, mantissas of both elements with index 1 of floating-point vectors A and B as a second pair, mantissas of both elements with index 2 of floating-point vectors A and B as a third pair, etc.). In this example, each pair of mantissas are multiplied together by a multiplier to produce a respective product (e.g., n+1 corresponding products in this Figure), for example, mantissa A[0] 1408 from the element having index 0 of vector A and mantissa B[0] 1424 from the element having index 0 of vector B are multiplied by (e.g., fixed-point) multiplier 1434 to produce a product. The products from each multiplier in the depicted embodiment are output to a shift register (e.g., shifter) to shift (e.g., move) each product based on its determined exponent (e.g., of the products) and a maximum exponent (e.g., of the products). In this example, a pair of exponents from corresponding (e.g., having the same element position in the vectors) elements of the input vectors (e.g., sourcing exponents of both elements with index 0 of floating-point vectors A and B as one pair, exponents of both elements with index 1 of floating-point vectors A and B as a second pair, exponents of both elements with index 2 of floating-point vectors A and B as a third pair, etc.) are added together by a respective (e.g., fixed-point) (e.g., integer) adder to produce a sum of the exponents (e.g., the exponent of the product of a pair of elements from vector A and vector B). In this example, the sum of the exponents (e.g., n+1 sums in this Figure) are each input into a maximum exponent determiner 1440 (e.g., comparator circuit). For example, the exponent A[0] 1414 from the element having index 0 of vector A and exponent B[0] 1416 from the element having index 0 of vector B are added together by (e.g., fixed-point) (e.g., integer) adder 1438 to produce the sum of exponent A[0] 1414 and exponent B[0] 1416. The maximum exponent determiner 1440 (e.g., circuit) is then to compare the sums of the exponents against each other to determine the maximum (e.g., largest value) of the sums of the exponents, e.g., the maximum exponent of the exponents for the corresponding products of mantissas. In one embodiment, the maximum of the sums of the exponents is the maximum exponent of the mantissa products. The maximum exponent in the depicted embodiment is then used to shift the other mantissa products accordingly, e.g., to align the other mantissa products to the maximum exponent. In one embodiment, a maximum exponent is 4 (e.g., the sum of two exponents each having a value of 2), and the other of the exponents is 3, so the mantissa product for the others of the exponents is shifted one place (e.g., to the left) to align the mantissa products to have a same exponent as the maximum exponent. In the depicted embodiment, the maximum exponent (e.g., a value indicative of the maximum exponent) is output along path 1441 to the set of shift registers (e.g., including shift register 1436) and a second maximum exponent determiner circuit 1464. In this example, each shifted mantissa product is output to a respective numeric conversion circuit (e.g., 2's complement circuit). For example, numeric conversion circuit 1442 (e.g., 2's complement circuit) receiving an unsigned (e.g. and shifted) mantissa product output from shift register 1436. Each respective numeric conversion circuit (e.g., 2's complement circuit) is to then convert the (e.g., shifted) mantissa product from an unsigned format (e.g., value) to a signed format (e.g., value). In one embodiment, this conversion is a 2's complement operation performed on the (e.g., shifted) mantissa product (for example, to convert from unsigned (e.g., binary) format to 2's complement format) based on the output from each respective XOR logic gate.

In one embodiment, a shift register passes a value through without shifting, e.g., when the maximum exponent (e.g., sum of two exponents) is the same as the exponent for the index position, e.g., where numeric conversion circuit 1442 and shift register 1436 are used for index position 0 of the input vectors.

In the depicted embodiment, each sign bit for a pair of sign bits from corresponding (e.g., having the same element position in the vectors) elements of the input vectors (e.g., sourcing sign bits of both elements with index 0 of floating-point vectors A and B as one pair, sign bits of both elements with index 1 of floating-point vectors A and B as a second pair, sign bits of both elements with index 2 of floating-point vectors A and B as a third pair, etc.) are logically, exclusively ORed (XORed) together by a respective (e.g., fixed-point) logic gate that implements an XOR to produce a value that indicate if the mantissa product is negative or positive, for example, the value being 0 for positive and 1 for negative. In the depicted embodiment, XOR logic gate 1444 receives a sign bit from input 1426 for the first element [0] of the first vector A and a sign bit from input 1428 for the first element [0] of the second vector B and outputs a first value (e.g., 1 indicating the product is negative) when only one of the inputs 1426, 1428 is a 1 to indicate false (e.g., negative) and a second value (e.g., 0 indicating the product is positive) otherwise.

In the depicted embodiment, a leading zero detection (LDZ) circuit (e.g., circuit 1451 for sum of products circuit 1401A) is included to detect any leading zeros of the outputs (e.g., output 1447A for sum of products circuit 1401A and output 1447Z for sum of products circuits 1401Z) and realign circuit 1403 is to adjust the maximum exponent (e.g., from path 1441 for sum of products circuits 1401A) to an adjusted maximum exponent (e.g., adjusted maximum exponent 1449A for sum of products circuits 1401A and adjusted maximum exponent 1449Z for sum of products circuits 1401Z) that reflects the number of leading zeros that are to be removed by a respective shift register 1455A-1455Z (e.g., 1455A for sum of products circuit 1401A and 1455Z for sum of products circuit 1401Z) to align the maximum exponent determined (e.g., by 1440 for sum of products circuit 1401A) for the maximum exponent of each of the maximum exponents sum from products circuits 1401A-1401Z. The shifted (e.g., aligned) single resultants from the outputs (e.g., output 1447A for sum of products circuit 1401A and output 1447Z for sum of products circuits 1401Z) are then added together by second set of adders 1457 to produce a single resultant at output 1459. In one embodiment, an adjusted maximum exponent (e.g., output 1461 from another maximum exponent circuit 1463 of realign circuit 1403) and/or single product (e.g., output 1459 for realign circuit 1403) is sent for each output (e.g., of a single adjusted maximum exponent from output 1461, and a single product from output 1459 corresponding to that single adjusted maximum exponent) of the set of sum of products circuits (e.g., output 1447A for sum of products circuit 1401A and output 1447Z for sum of products circuits 1401Z) to accumulator 1410, e.g., as discussed below.

Second Mode

In one embodiment, mode controller (e.g., via a request to perform a sum of products operation) is in a second (e.g., fixed-point) mode to perform an operation on fixed-point input data.

As one example, in the second (e.g., fixed-point) mode, the sum of products circuit is to multiply each pair of fixed-point (e.g., integer) values from a same element position (e.g., 0 to N) of the input vectors to be a product, and sum those products to produce a single, fixed-point resultant at output 1459.

As another example, in the second (e.g., fixed-point) mode, input sourcing multiplexers (e.g., multiplexers 1430 and 1432) are sent a control value to source a pair of values from corresponding (e.g., having the same element position in the vectors) elements of the input vectors (e.g., sourcing values of both elements with index 0 of fixed-point vectors A and B as one pair, values of both elements with index 1 of fixed-point vectors A and B as a second pair, values of both elements with index 2 of fixed-point vectors A and B as a third pair, etc.) for each of sum of products circuit 1401A-1401Z. In this example, each pair of values are multiplied together by a multiplier to produce a respective product (e.g., n+1 corresponding products in this Figure), for example, value A[0] 1420 from the element having index 0 of vector A and value B [0] 1422 from the element having index 0 of vector B are multiplied by (e.g., fixed-point) multiplier 1434 to produce a product. The products from each multiplier in the depicted embodiment are output to a respective shift register (e.g., shifter), but in the second mode the products pass through the shift register without being changed, e.g., the products are not shifted (e.g., moved). In this example, each unshifted products output from each shift register are input into a respective numeric conversion circuit (e.g., 2's complement circuit), but in the second mode the products pass through the numeric conversion circuit without being changed, e.g., the products are already in 2's complement representation so they are not further converted. The (e.g., signed) products for each pair of elements (e.g., at a same element position) for a single sum of products circuit are then all added together with the set of (e.g., fixed-point) (e.g., integer) adders (e.g., adders 1446 for sum of products circuit 1401A) into a single fixed-point resultant (e.g., without any shifting by shift register 1355A or shift register 1355Z). These single resultants from each sum of products circuits 1401A-1401Z are then added together by set of (e.g., fixed-point) (e.g., integer) adders 1457 into a single fixed-point resultant. In one embodiment, single fixed-point resultant (e.g., product) is sent from output 1459 to accumulator 1410, e.g., as discussed below.

Third Mode

In one embodiment, mode controller (e.g., via a request to perform a sum of products operation) is in a third (e.g., Flexpoint) mode to perform an operation on Flexpoint input data.

As one example, in the third (e.g., Flexpoint) mode, each of these Flexpoint numbers is partitioned into exponent-bits, and integer (2's complement) mantissa-bits, e.g., instead of binary mantissa-bits as in a floating-point format. Subsequently a pair-wise multiplication is performed between corresponding mantissas of each vector, and exponents are added together. At the output of the multiplication stage, the mantissas can be truncated or expanded into a desirable internal bit length (e.g., word-length) to trade-off resource utilization with solution accuracy. In parallel, all the exponents are compared in a tree with $\log_2$ n of stages. The highest exponent becomes the reference and all the mantissas are aligned to this reference. After this alignment in one embodiment of the third mode, the mantissas are not converted into a fixed-point (e.g., 2's complement) number representation as they are already in that format. In one embodiment of the next stage, the sum-reduction is performed on the mantissas, and at each level of this reduction-tree the bit-length (e.g., word-length) is increased by one bit to prevent overflow. After this summation, on one embodiment, the resultant (e.g., mantissa and exponent) is shifted to the desired magnitude (e.g., in a FlexN+M format discussed above).

As another example, in the third mode, input sourcing multiplexers (e.g., multiplexers 1430 and 1432) are sent a control value to source a pair of Flexpoint (2's complement) mantissas from corresponding (e.g., having the same element position in the vectors) elements of the input vectors (e.g., sourcing mantissas of both elements with index 0 of Flexpoint vectors A and B as one pair, mantissas of both elements with index 1 of Flexpoint vectors A and B as a second pair, mantissas of both elements with index 2 of Flexpoint vectors A and B as a third pair, etc.). In this example, each pair of mantissas are multiplied together by a multiplier to produce a respective product (e.g., n+1 corresponding products in this Figure), for example, mantissa A[0] 1408 from the element having index 0 of vector A and mantissa B[0] 1424 from the element having index 0 of vector B are multiplied by (e.g., fixed-point) multiplier 1434 to produce a product. The products from each multiplier in the depicted embodiment are output to a shift register (e.g., shifter) to shift (e.g., move) each product based on its determined exponent (e.g., of the products) and a maximum exponent (e.g., of the products). In this example, a pair of exponents from corresponding (e.g., having the same element position in the vectors) elements of the input vectors (e.g., sourcing exponents of both elements with index 0 of Flexpoint vectors A and B as one pair, exponents of both elements with index 1 of Flexpoint vectors A and B as a second pair, exponents of both elements with index 2 of Flexpoint vectors A and B as a third pair, etc.) are added together by a respective (e.g., fixed-point) (e.g., integer) adder to produce a sum of the exponents (e.g., the exponent of the product of a pair of elements from vector A and vector B). In this example, the sum of the exponents (e.g., n+1 sums in this Figure) are each input into a maximum exponent determiner 1440 (e.g., comparator circuit). For example, the exponent A[0] 1414 from the element having index 0 of vector A and exponent B [0] 1416 from the element having index 0 of vector B are added together by (e.g., fixed-point) (e.g., integer) adder 1438 to produce the sum of exponent A[0] 1414 and exponent B[0] 1416. The maximum exponent determiner 1440 (e.g., circuit) is then to compare the sums of the exponents against each other to determine the maximum (e.g., largest value) of the sums of the exponents, e.g., the maximum exponent of the exponents for the corresponding products of mantissas. In one embodiment, the maximum of the sums of the exponents is the maximum exponent of the mantissa products. The maximum exponent in the depicted embodiment is then used to shift the other mantissa products accordingly, e.g., to align the other mantissa products to the maximum exponent. In one embodiment, a maximum exponent is 4 (e.g., the sum of two exponents each having a value of 2), and the other of the exponents is 3, so the mantissa product for the others of the exponents is shifted one place (e.g., to the left) to align the mantissa products to have a same exponent as the maximum exponent. In the depicted embodiment, the maximum exponent (e.g., a value indicative of the maximum exponent) is output along path 1441 to the set of shift registers (e.g., including shift register 1436) and normalization circuit 1450. In this example, each shifted mantissa product is output into a respective numeric conversion circuit (e.g., 2's complement circuit), but in the third mode the products pass through the numeric conversion circuit without being changed, e.g., the products are already in 2's complement representation so they are not further converted.

In one embodiment, a shift register passes a value through without shifting, e.g., when the maximum exponent (e.g., sum of two exponents) is the same as the exponent for the index position, e.g., where numeric conversion circuit 1442 and shift register 1436 are used for index position 0 of the input vectors.

In the depicted embodiment, the shifted mantissa products for each pair of elements (e.g., at a same element position) are then all added together with the set of (e.g., fixed-point) (e.g., integer) adders (e.g., adders 1446 for sum of products circuit 1401A) into a single product (e.g., single product from output 1447A for sum of products circuit 1401A and single product from output 1447Z for sum of products circuit 1401Z) for each sum of products circuits 1401A-1401Z. In the depicted embodiment, a leading zero detection (LDZ) circuit (e.g., circuit 1451 for sum of products circuit 1401A) is included to detect any leading zeros of the outputs (e.g., output 1447A for sum of products circuit 1401A) and is to adjust the maximum exponent (e.g., from path 1441 for sum of products circuits 1401A) to an adjusted maximum exponent (e.g., adjusted maximum exponent 1449A for sum of products circuits 1401A and adjusted maximum exponent 1449Z for sum of products circuits 1401Z) that reflects the number of leading zeros that are to be removed by a respective shift registers 1455A-1455Z of realign circuit 1403 (e.g., 1455A for sum of products circuit 1401A and 1455Z for sum of products circuit 1401Z) to align the maximum exponent determined (e.g., by 1440 for sum of products circuit 1401A) for the maximum exponent of each of the maximum exponents sum from products circuits 1401A-1401Z. The shifted (e.g., aligned) single resultants from the outputs (e.g., output 1447A for sum of products circuit 1401A and output 1447Z for sum of products circuit 1401Z) are then added together by second set of adders 1457 to produce a single resultant at output 1459. In one embodiment, an adjusted maximum exponent (e.g., output 1461 from another maximum exponent circuit 1463 of realign circuit 1403) and/or single product (e.g., output 1459 for realign circuit 1403) is sent for each output (e.g., of a single adjusted maximum exponent from output 1461, and a single product from output 1459 corresponding to that single adjusted maximum exponent) of the set of sum of products circuits (e.g., output 1447A for sum of products circuits 1401A and output 1447Z for sum of products circuits 1401Z) to accumulator 1410, e.g., as discussed below.

Accumulators

Optionally, the circuit 1400 includes accumulator 1410 to accumulate resultants from the sum of products circuits 1401A-1401Z. In one embodiment, accumulator 1410 incudes a fixed-point (e.g., integer) adder 1456, e.g., and no floating-point adder(s).

In certain embodiments, the mode controller 1406 being in the second mode causes the resultants sent from output 1459 of the sum of products circuits 1401A-1401Z to be accumulated with accumulator circuit 1410 (e.g., added to previously accumulated resultants from (e.g., fixed-point) accumulator storage 1458 by fixed-point adder 1456). In one embodiment, the other circuitry (e.g., shift register 1466, shift register 1468, and fixed-point to floating-point conversion circuit 1470) allows passage through in this mode without modifying the data (e.g., resultants).

In certain embodiments, the mode controller 1406 being in the first mode causes the resultants sent from output 1459 of the sum of products circuits 1401A-1401Z to be (e.g., only) accumulated by using the maximum exponent from output 1461 determined for the current resultant. In one embodiment, the mode controller 1406 being in the first mode causes the current resultant (e.g., the sum of the products of the mantissa pairs) to be sent from output 1459 of the realign circuit 1403 for a sum of products from circuits 1401A-1401Z to first shift register 1466 and any accumulated resultant (e.g., from accumulator storage 1458) sent to the second shift register 1468 so that shift register 1466 and/or shift register 1468 respectively shift (e.g., align) the current resultant and/or the accumulated resultant based on the maximum exponent stored in exponent accumulator storage 1462 for the accumulation operation (e.g., for multiple floating-point resultants that have been accumulated over a time period from output 1459) from second maximum exponent determiner circuit 1464 and the current maximum exponent from path 1441 determined for the current resultant. After the resultants have been shifted (e.g., aligned), in one embodiment they are added together by (e.g., fixed-point) (e.g., integer) adder 1456 and that updated resultant (and its exponent) may then be sent to normalization circuit 1450, e.g., to move the most significant digit of the significand (e.g., the single product) of a non-zero number to be non-zero (e.g., and moves the maximum exponent value accordingly according to the move of the single product). In certain embodiments, the (e.g., unsigned) version of the accumulated sum of products of the mantissas is stored in accumulator storage 1458. The current exponent for the accumulated sum of products of the mantissas may then be compared by the adjust accumulator exponent circuit 1460 against the previous exponent for the accumulated sum of products of the mantissas in accumulator storage 1462, e.g., and that value updated if the current exponent is greater than the previous exponent. In certain embodiments, at the end of the accumulation, the accumulated sum of products of the mantissas from accumulator storage 1458 and the exponent for the accumulated sum of products of the mantissas from accumulator storage 1462 are sent to fixed-point to floating-point conversion circuit 1470 (e.g., including a 2's complement circuit) to convert the accumulated sum and its exponent into a floating-point format.

In certain embodiments, circuit 1400 receives a value (e.g., from a core offloading to an accelerator embodiment of circuit 1400) indicating the iterations to be performed by the sum of products circuits 1401A-1401Z, e.g., to decouple the width of a vector (e.g., having a number of elements greater than N+1) to be processed by the circuit 1400 from the hardware width (e.g., a vector having a maximum of N+1 elements) of the sum of products circuits 1401A-1401Z. In one embodiment, circuit 1400 is to notify to the requesting entity (e.g., core) of completion by performing a notification action (e.g., raising a flag so that the appropriate output data is read by the requesting entity).

Figure 15:
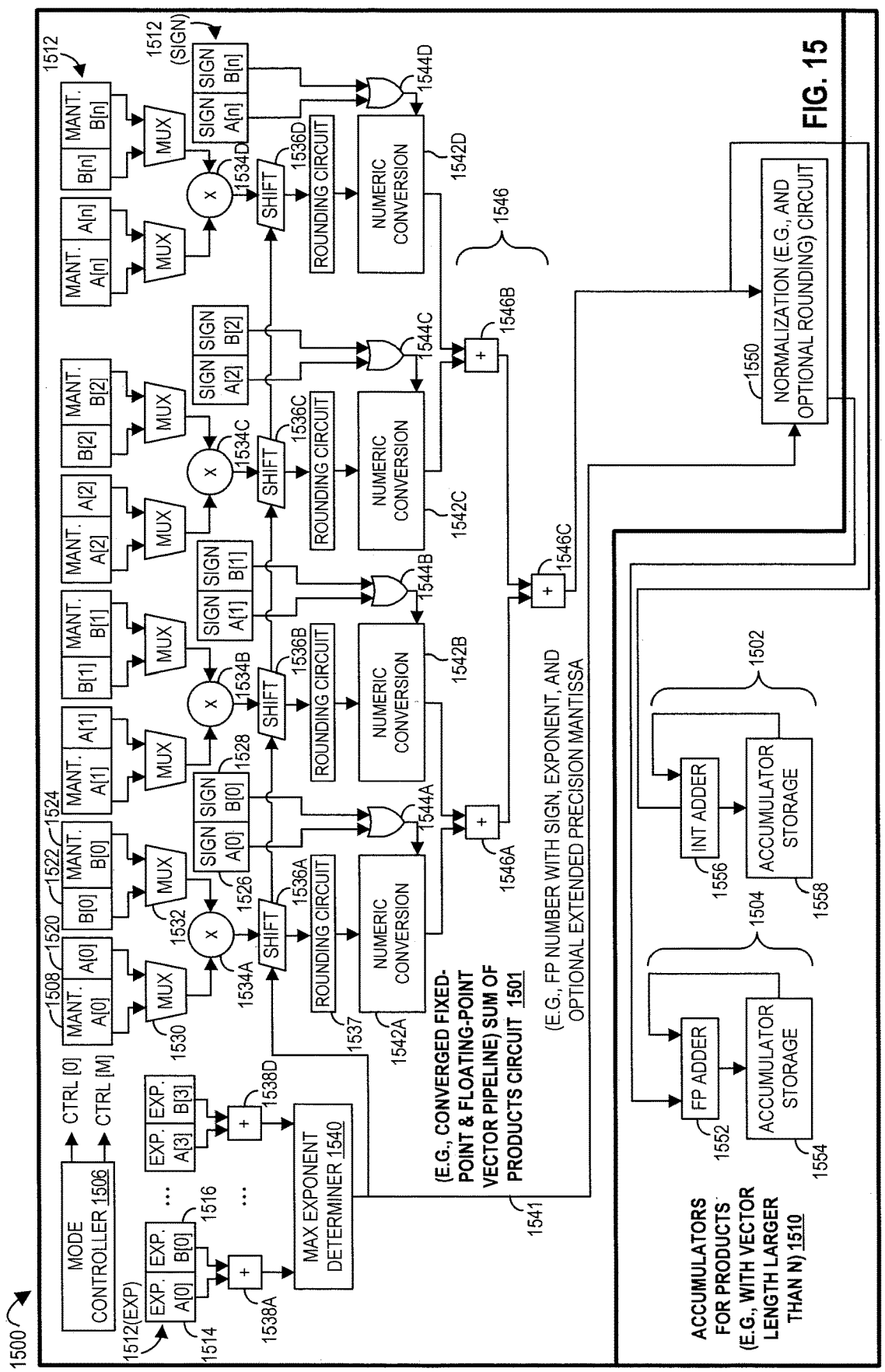
FIG. 15 illustrates a fixed-point and floating-point vector multiplication circuit including rounding circuits with a fixed-point accumulator circuit and a floating-point accumulator circuit according to embodiments of the disclosure.

FIG. 15 illustrates a fixed-point and floating-point vector multiplication circuit 1500 including rounding circuits (e.g., rounding circuit 1537) with a fixed-point accumulator circuit 1002 and a floating-point accumulator circuit 1004 according to embodiments of the disclosure.

In comparison to one embodiment in FIG. 10, the embodiment depicted in FIG. 15 includes rounding circuits. In one embodiment, each rounding circuit (e.g., rounding circuit 1537) is to round (for example, round-up, round-down, round-towards-zero, or round-to-nearest, e.g., to the nearest integer) the output from the shift register (e.g., shift register 1036).

Circuit 1500 includes a mode controller 1506 (e.g., circuit) to switch (e.g., select) between a fixed-point mode and a floating-point mode. In one embodiment, mode controller 1506 is to switch between (e.g., any of) fixed-point mode, Flexpoint mode, and floating-point mode. Circuit 1500 includes a sum of products circuit (e.g., pipeline) 1501 and accumulators 1510 (e.g., fixed-point accumulator circuit 1502 and floating-point accumulator circuit 1504). In the depicted embodiment, the floating-point (and/or Flexpoint) inputs (e.g., input registers) and fixed-point inputs are shown as being separate inputs. In one embodiment, a same register is used for either fixed-point data or floating-point data (e.g., or Flexpoint data). For example, a first register to store fixed-point data or floating-point data (e.g., or Flexpoint data) for a first vector (e.g., vector A) and a second register to store fixed-point data or floating-point data (e.g., or Flexpoint data) for a second vector (e.g., vector B). In one embodiment, a separate register is used for fixed-point data and floating-point data (e.g., and Flexpoint data). For example, a first register to store fixed-point data for a first, fixed-point vector (e.g., fixed-point vector A), a second register to store fixed-point data for a second, fixed-point vector (e.g., fixed-point vector B), a third register to store floating-point data for a third, floating-point vector (e.g., floating-point vector A), and a fourth register to store floating-point data for a fourth, floating-point vector (e.g., floating-point vector B). In one embodiment. Flexpoint data is stored in its own register(s). In one embodiment, inputs 1512 include an input for each element of a fixed-point vector (e.g., including input 1520 for a first element [0] of a first vector A and/or input 1522 for a first element [0] of a second vector B) and an input for each element (e.g., a sign bit 1512(sign), exponent 1512(exp), and mantissa of each element) of a floating-point vector (e.g., including input 1526 for the sign bit for a first element [0] of a first vector A, input 1514 for the exponent bits for the first element [0] of the first vector A, and input 1508 for the mantissa bits for the first element [0] of the first vector A, and/or including input 1526 for the sign bit for a first element [0] of a second vector B, input 1514 for the exponent bits for the first element [0] of the second vector B, and input 1508 for the mantissa bits for the first element [0] of the second vector B). In certain embodiments, inputs 1512 include an input for each element (e.g., an exponent 1512(exp) and mantissa of each element) of a Flexpoint vector (e.g., including input 1514 for the exponent bits for the first element [0] of a first vector A and input 1508 for the mantissa bits for the first element [0] of the first vector A, and/or including input 1514 for the exponent bits for the first element [0] of a second vector B, and input 1508 for the mantissa bits for the first element [0] of the second vector B). In one embodiment, the vectors (e.g., A[N+1] and B[N+1]) to be operated on by fixed-point and floating-point vector multiplication circuit 1500 have a same number of elements equal to N+1. N may be any positive integer in certain embodiments.

A reference number for the other inputs (e.g., for elements 1 through N) are not drawn in this figure so as not obfuscate the data flow/lines. Further, the control inputs/lines (e.g., for the switches, shifters, rounding circuits, numeric conversion circuits (e.g., 2's complement circuits)) are not drawn so as not obfuscate the data flow/lines. Control inputs/lines to components may extend from a mode controller.

In certain embodiments, each element position (e.g., 0 to N) of the vectors to be processed includes a respective multiplier, shift register, rounding circuit, and numeric conversion circuit to process the mantissas in that element position, XOR logic gate, and/or an adder to process (e.g., add together) the exponents in that element position. Those set of components may be referred to as an element block (e.g., with N+1 element blocks in FIG. 15).

First Mode

In one embodiment, mode controller (e.g., via a request to perform a sum of products operation) is in a first (e.g., floating-point) mode to perform an operation on floating-point input data.

As one example, in the first (e.g., floating-point) mode, each of these floating-point numbers is partitioned into its sign-bit, exponent-bits, and mantissa-bits. At this initial partitioning, the leading hidden bit which can be 1 or 0, depending on the exponent, is concatenated on to the mantissa. Subsequently a pair-wise multiplication is performed between corresponding mantissas of each vector, exponents are added together, and respective sign-bits are logically XORed. At the output of the multiplication stage, the mantissas can be truncated or expanded into a desirable internal bit length (e.g., word-length) to trade-off resource utilization with solution accuracy. In parallel, all the exponents are compared in a tree with $\log_2$ n of stages. The highest exponent becomes the reference and all the mantissas are aligned to this reference. After this alignment, the mantissas are converted into a fixed-point (e.g., 2's complement) number representation. In one embodiment of the next stage, the sum-reduction is performed on the mantissas, and at each level of this reduction-tree the bit-length (e.g., word-length) is increased by one bit to prevent overflow. After this summation, the fixed-point number is reconverted to sign and magnitude, aligned to drop the leading one, and the exponent corrected. From these values, a standards compliant floating-point number is generated and output in this example. In one embodiment, the standard is an IEEE floating-point arithmetic standard (e.g., 754-2008—the IEEE Computer Society's Standard for Floating-Point Arithmetic published on Aug. 29, 2008).

As another example, in the first mode, input sourcing multiplexers (e.g., multiplexers 1530 and 1532) are sent a control value to source a pair of mantissas from corresponding (e.g., having the same element position in the vectors) elements of the input vectors (e.g., sourcing mantissas of both elements with (sorted) index 0 of floating-point vectors A and B as one pair, mantissas of both elements with (sorted) index 1 of floating-point vectors A and B as a second pair, mantissas of both elements with (sorted) index 2 of floating-point vectors A and B as a third pair, etc.). In this example, each pair of mantissas are multiplied together by a multiplier to produce a respective product (e.g., n+1 corresponding products in this Figure), for example, mantissa A[0] 1508 from the element having (sorted) index 0 of vector A and mantissa B[0] 1524 from the element having (sorted) index 0 of vector B are multiplied by (e.g., fixed-point) multiplier 1534A to produce a product. The products from each multiplier in the depicted embodiment are output to a shift register (e.g., shifter) to shift (e.g., move) each product based on its determined exponent (e.g., of the products) and a maximum exponent (e.g., of the products). In this example, a pair of exponents from corresponding (e.g., having the same element position in the vectors) elements of the input vectors (e.g., sourcing exponents of both elements with (sorted) index 0 of floating-point vectors A and B as one pair, exponents of both elements with (sorted) index 1 of floating-point vectors A and B as a second pair, exponents of both elements with (sorted) index 2 of floating-point vectors A and B as a third pair, etc.) are added together by a respective (e.g., fixed-point) (e.g., integer) adder to produce a sum of the exponents (e.g., the exponent of the product of a pair of elements from vector A and vector B). In this example, the sum of the exponents (e.g., n+1 sums in this Figure) are each input into a maximum exponent determiner 1540 (e.g., comparator circuit). For example, the exponent A[0] 1514 from the element having (sorted) index 0 of vector A and exponent B[0] 1516 from the element having (sorted) index 0 of vector B are added together by (e.g., fixed-point) (e.g., integer) adder 1538 to produce the sum of exponent A[0] 1514 and exponent B[0] 1516. The maximum exponent determiner 1540 (e.g., circuit) is then to compare the sums of the exponents against each other to determine the maximum (e.g., largest value) of the sums of the exponents, e.g., the maximum exponent of the exponents for the corresponding products of mantissas. In one embodiment, the maximum of the sums of the exponents is the maximum exponent of the mantissa products. The maximum exponent in the depicted embodiment is then used to shift the other mantissa products accordingly, e.g., to align the other mantissa products to the maximum exponent. In one embodiment, a maximum exponent is 4 (e.g., the sum of two exponents each having a value of 2), and the other of the exponents is 3, so the mantissa product for the others of the exponents is shifted one place (e.g., to the left) to align the mantissa products to have a same exponent as the maximum exponent. In the depicted embodiment, the maximum exponent (e.g., a value indicative of the maximum exponent) is output along path 1541 to the set of shift registers (e.g., including shift registers 1536A-D) and normalization circuit 1550. In this example, each shifted mantissa product is output to a respective rounding circuit, and the rounded output is sent to an numeric conversion circuit (e.g., 2's complement circuit). For example, numeric conversion circuit 1542 (e.g., 2's complement circuit) receiving an unsigned and rounded (e.g. and shifted) mantissa product output from rounding circuit 1537. Each respective numeric conversion circuit (e.g., 2's complement circuit) is to then convert the (e.g., shifted) rounded mantissa product from an unsigned format (e.g., value) to a signed format (e.g., value). In one embodiment, this conversion is a 2's complement operation performed on the (e.g., shifted) rounded mantissa product (for example, to convert from unsigned (e.g., binary) format to 2's complement format) based on the output from each respective XOR logic gate.

In one embodiment, a shift register passes a value through without shifting, e.g., when the maximum exponent (e.g., sum of two exponents) is the same as the exponent for the (sorted) index position, e.g., where numeric conversion circuit 1542, rounding circuit 1537, and shift register 1536 are used for (sorted) index position 0 of the input vectors.

In the depicted embodiment, each sign bit for a pair of sign bits from corresponding (e.g., having the same element position in the vectors) elements of the input vectors (e.g., sourcing sign bits of both elements with (sorted) index 0 of floating-point vectors A and B as one pair, sign bits of both elements with (sorted) index 1 of floating-point vectors A and B as a second pair, sign bits of both elements with (sorted) index 2 of floating-point vectors A and B as a third pair, etc.) are logically, exclusively ORed (XORed) together by a respective (e.g., fixed-point) logic gate that implements an XOR to produce a value that indicate if the mantissa product is negative or positive, for example, the value being 0 for positive and 1 for negative. In the depicted embodiment, XOR logic gate 1544A receives a sign bit from input 1526 for the first element [0] of the first vector A and a sign bit from input 1528 for the first element [0] of the second vector B and outputs a first value (e.g., 1 indicating the product is negative) when only one of the inputs 1526, 1528 is a 1 to indicate false (e.g., negative) and a second value (e.g., 0 indicating the product is positive) otherwise.

The converted (e.g., signed) values for each pair of elements (e.g., at a same element position) are then all added together with the set of (e.g., fixed-point) (e.g., integer) adders 1546 into a single product. Normalization circuit 1550 is then used in this first mode to convert the single product into a floating-point representation based on the maximum exponent. In one embodiment, circuit 1550 is to further perform a rounding or other operation to convert the (e.g., integer) format of the single product into floating-point format to create the resultant of the sum of products circuit 1501. In one embodiment, normalization circuit 1550 moves the most significant digit of the significand (e.g., the single product) of a non-zero number to be non-zero (e.g., and moves the maximum exponent value accordingly according to the move of the single product).

Second Mode

In one embodiment, mode controller (e.g., via a request to perform a sum of products operation) is in a second (e.g., fixed-point) mode to perform an operation on fixed-point input data.

As one example, in the second (e.g., fixed-point) mode, the sum of products circuit is to multiply each pair of fixed-point (e.g., integer) values from a same element position (e.g., 0 to N) of the input vectors to be a product, and sum those products to produce a single, fixed-point resultant.

As another example, in the second (e.g., fixed-point) mode, input sourcing multiplexers (e.g., multiplexers 1530 and 1532) are sent a control value to source a pair of values from corresponding (e.g., having the same element position in the vectors) elements of the input vectors (e.g., sourcing values of both elements with (sorted) index 0 of fixed-point vectors A and B as one pair, values of both elements with (sorted) index 1 of fixed-point vectors A and B as a second pair, values of both elements with (sorted) index 2 of fixed-point vectors A and B as a third pair, etc.). In this example, each pair of values are multiplied together by a multiplier to produce a respective product (e.g., n+1 corresponding products in this Figure), for example, value A[0] 1520 from the element having (sorted) index 0 of vector A and value B[0] 1522 from the element having (sorted) index 0 of vector B are multiplied by (e.g., fixed-point) multiplier 1534 to produce a product. The products from each multiplier in the depicted embodiment are output to a respective shift register (e.g., shifter), but in the second mode the products pass through the shift register without being changed, e.g., the products are not shifted (e.g., moved). In this example, each unshifted products output from each shift register are input into rounding circuit, and the output from the rounding circuit is input into a respective numeric conversion circuit (e.g., 2's complement circuit), but in the second mode the products pass through the rounding circuit and/or the numeric conversion circuit without being changed, e.g., the products are already in 2's complement representation so they are not further converted and/or rounded. The (e.g., signed) products for each pair of elements (e.g., at a same element position) are then all added together with the set of (e.g., fixed-point) (e.g., integer) adders 1546 into a single fixed-point resultant. In one embodiment, the single fixed-point resultant passes through normalization circuit 1550 without any modification to the single fixed-point resultant.

Third Mode

In one embodiment, mode controller (e.g., via a request to perform a sum of products operation) is in a third (e.g., Flexpoint) mode to perform an operation on Flexpoint input data.

As one example, in the third (e.g., Flexpoint) mode, each of these Flexpoint numbers is partitioned into exponent-bits, and integer (2's complement) mantissa-bits, e.g., instead of binary mantissa-bits as in a floating-point format. Subsequently a pair-wise multiplication is performed between corresponding mantissas of each vector, and exponents are added together. At the output of the multiplication stage, the mantissas can be truncated or expanded into a desirable internal bit length (e.g., word-length) to trade-off resource utilization with solution accuracy. In parallel, all the exponents are compared in a tree with $\log_2 n$ of stages. The highest exponent becomes the reference and all the mantissas are aligned to this reference. After this alignment in one embodiment of the third mode, the mantissas are not converted into a fixed-point (e.g., 2's complement) number representation as they are already in that format. In one embodiment of the next stage, the sum-reduction is performed on the mantissas, and at each level of this reduction-tree the bit-length (e.g., word-length) is increased by one bit to prevent overflow. After this summation, on one embodiment, the resultant (e.g., mantissa and exponent) is shifted to the desired magnitude (e.g., in a FlexN+M format discussed above).

As another example, in the third mode, input sourcing multiplexers (e.g., multiplexers 1530 and 1532) are sent a control value to source a pair of Flexpoint (2's complement) mantissas from corresponding (e.g., having the same element position in the vectors) elements of the input vectors (e.g., sourcing mantissas of both elements with (sorted) index 0 of Flexpoint vectors A and B as one pair, mantissas of both elements with (sorted) index 1 of Flexpoint vectors A and B as a second pair, mantissas of both elements with (sorted) index 2 of Flexpoint vectors A and B as a third pair, etc.). In this example, each pair of mantissas are multiplied together by a multiplier to produce a respective product (e.g., n+1 corresponding products in this Figure), for example, mantissa A[0] 1508 from the element having (sorted) index 0 of vector A and mantissa B[0] 1524 from the element having (sorted) index 0 of vector B are multiplied by (e.g., fixed-point) multiplier 1534 to produce a product. The products from each multiplier in the depicted embodiment are output to a shift register (e.g., shifter) to shift (e.g., move) each product based on its determined exponent (e.g., of the products) and a maximum exponent (e.g., of the products). In this example, a pair of exponents from corresponding (e.g., having the same element position in the vectors) elements of the input vectors (e.g., sourcing exponents of both elements with (sorted) index 0 of Flexpoint vectors A and B as one pair, exponents of both elements with (sorted) index 1 of Flexpoint vectors A and B as a second pair, exponents of both elements with (sorted) index 2 of Flexpoint vectors A and B as a third pair, etc.) are added together by a respective (e.g., fixed-point) (e.g., integer) adder to produce a sum of the exponents (e.g., the exponent of the product of a pair of elements from vector A and vector B). In this example, the sum of the exponents (e.g., n+1 sums in this Figure) are each input into a maximum exponent determiner 1540 (e.g., comparator circuit). For example, the exponent A[0] 1514 from the element having (sorted) index 0 of vector A and exponent B [0] 1516 from the element having (sorted) index 0 of vector B are added together by (e.g., fixed-point) (e.g., integer) adder 1538A to produce the sum of exponent A[0] 1514 and exponent B [0] 1516. The maximum exponent determiner 1540 (e.g., circuit) is then to compare the sums of the exponents against each other to determine the maximum (e.g., largest value) of the sums of the exponents, e.g., the maximum exponent of the exponents for the corresponding products of mantissas. In one embodiment, the maximum of the sums of the exponents is the maximum exponent of the mantissa products. The maximum exponent in the depicted embodiment is then used to shift the other mantissa products accordingly, e.g., to align the other mantissa products to the maximum exponent. In one embodiment, a maximum exponent is 4 (e.g., the sum of two exponents each having a value of 2), and the other of the exponents is 3, so the mantissa product for the others of the exponents is shifted one place (e.g., to the left) to align the mantissa products to have a same exponent as the maximum exponent. In the depicted embodiment, the maximum exponent (e.g., a value indicative of the maximum exponent) is output along path 1541 to the set of shift registers (e.g., including shift register 1536) and normalization circuit 1550. In this example, each shifted mantissa product is output into a respective rounding circuit, and the rounded mantissa product is input into a respective numeric conversion circuit (e.g., 2's complement circuit), but in the third mode the products pass through the numeric conversion circuit without being changed, e.g., the products are already in 2's complement representation so they are not further converted.

In one embodiment, a shift register passes a value through without shifting, e.g., when the maximum exponent (e.g., sum of two exponents) is the same as the exponent for the (sorted) index position, e.g., where numeric conversion circuit 1542, rounding circuit 1537, and shift register 1536 are used for (sorted) index position 0 of the input vectors.

In the depicted embodiment, the shifted mantissa products for each pair of elements (e.g., at a same element position) are then all added together with the set of (e.g., fixed-point) (e.g., integer) adders 1546 into a single product. Normalization circuit 1550 may then be used in this third mode to convert the single product into a Flexpoint representation based on the maximum exponent. In one embodiment, instead of a full normalization operation in this mode, circuit 1550 is to perform a rounding to reduce the bit width of the sum from adders 1546 to the desired bit width of the Flexpoint format to create the resultant of the sum of products circuit 1501 (e.g., where the exponent has no impact on this reduction and the sign is already accounted because the fixed-point representation is 2's complement). In one embodiment, circuit 1550 moves the most significant digit of the significand (e.g., the single product) of a non-zero number to be non-zero (e.g., and moves the maximum exponent value accordingly according to the move of the single product).

Accumulators

Optionally, the circuit 1500 includes accumulators 1510 to accumulate resultants from the sum of products circuit 1501. In one embodiment, a separate fixed-point accumulator circuit 1502 and floating-point accumulator circuit 1504 are used in accumulators 1510. In certain embodiments, the mode controller 1506 being in the first mode causes the resultants from the sum of products circuit 1501 to be (e.g., only) accumulated with floating-point accumulator circuit 1504 and/or the mode controller 1506 being in the second mode causes the resultants from the sum of products circuit 1501 to be (e.g., only) accumulated with fixed-point accumulator circuit 1502. Depicted fixed-point accumulator circuit 1502 includes a (e.g., fixed-point) (e.g., integer) adder 1556 and fixed-point accumulator storage 1558. Depicted floating-point accumulator circuit 1504 includes a floating-point adder 1552 and floating-point accumulator storage 1554. In one embodiment, floating-point adder 1552 is an instance of floating-point adder circuit 500 from FIG. 5.

In certain embodiments, circuit 1500 receives a value (e.g., from a core offloading to an accelerator embodiment of circuit 1500) indicating the iterations to be performed by the sum of products circuit 1501, e.g., to decouple the width of a vector (e.g., having a number of elements greater than N+1) to be processed by the circuit 1500 from the hardware width (e.g., a vector having a maximum of N+1 elements) of the sum of products circuit 1501. In one embodiment, circuit 1500 is to notify to the requesting entity (e.g., core) of completion by performing a notification action (e.g., raising a flag so that the appropriate accumulator storage 1554 or accumulator storage 1558 is read by the requesting entity). In one embodiment, the floating-point accumulator (e.g., adder) or fixed-point accumulator (e.g., adder) is used to accumulate Flexpoint resultants from circuit 1501, for example, not using the sign field in floating-point accumulator (e.g., adder).

Figure 16:
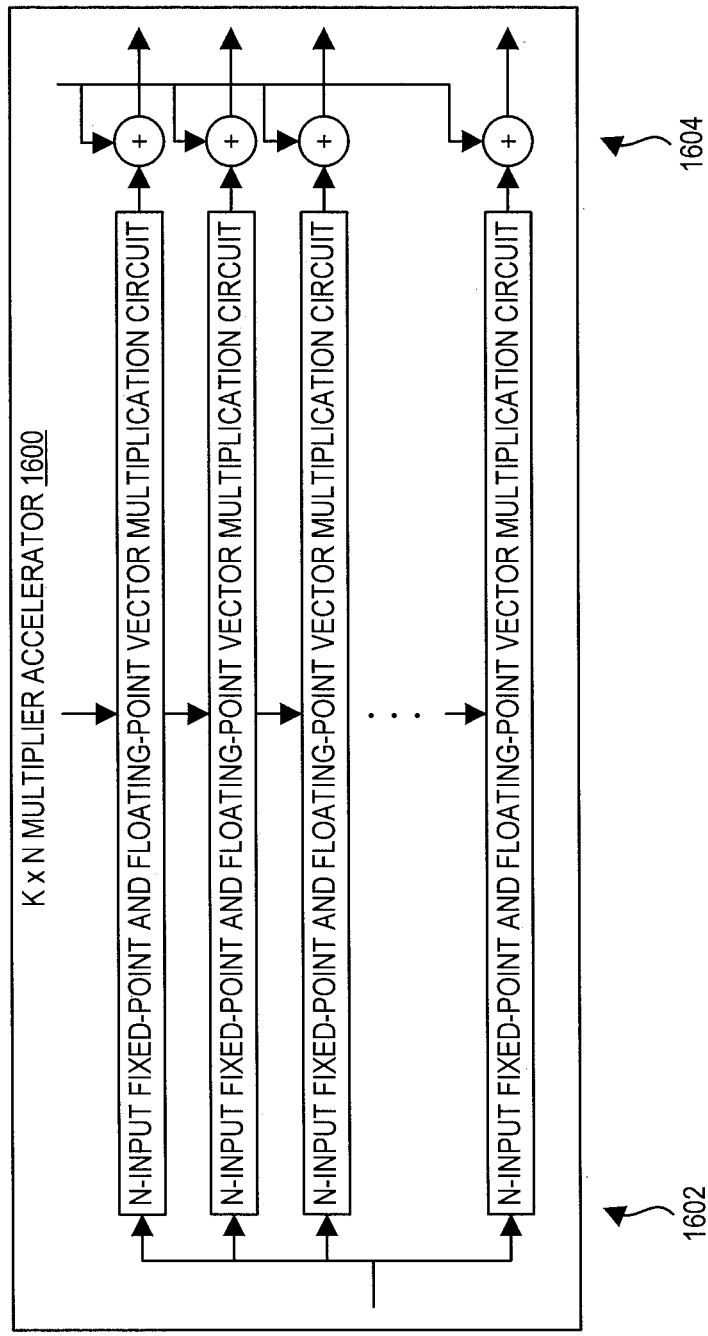
FIG. 16 illustrates a fixed-point and floating-point matrix multiplication circuit according to embodiments of the disclosure.

FIG. 16 illustrates a fixed-point and floating-point matrix multiplication circuit 1600 according to embodiments of the disclosure. Circuit 1600 includes a plurality (e.g., 32, indexed as 0-31) of fixed-point and floating-point vector multiplication circuits 1602 and may include a set of (e.g., fixed-point) adders 1604 to allow a summation of the accumulated outputs of the fixed-point and floating-point vector multiplication circuits. In one embodiment, each of fixed-point and floating-point vector multiplication circuits is an instance of fixed-point and floating-point vector multiplication circuit 1000 of FIG. 10, fixed-point and floating-point vector multiplication circuit 1100 of FIG. 11, fixed-point and floating-point vector multiplication circuit 1200 of FIG. 12, fixed-point and floating-point vector multiplication circuit 1300 of FIGS. 13A-13C, fixed-point and floating-point vector multiplication circuit 1400 of FIGS. 14A-14C, or fixed-point and floating-point vector multiplication circuit 1500 of FIG. 15. In one embodiment, a matrix is multiplied using circuit 1600, for example, by broadcasting a column of matrix data and unicasting a row of matrix data.

FIG. 17 illustrates a flow diagram 1700 according to embodiments of the disclosure. Depicted flow 1700 includes switching a circuit comprising a set of multipliers coupled to a set of shift registers coupled to a set of numeric conversion circuits coupled to a set of adders, and a maximum exponent determiner coupled to the set of shift registers and a normalization circuit between a first mode and a second mode with at least one switch at 1702; in the first mode, each multiplier of the set of multipliers multiplying mantissas from a same element position of a first floating-point vector and a second floating-point vector to produce a corresponding product, shifting the corresponding products with the set of shift registers based on a maximum exponent of exponents for the corresponding products determined by the maximum exponent determiner to produce shifted products, performing an numeric conversion operation on the shifted products with the set of numeric conversion circuits based on sign bits from the same element position of the first floating-point vector and the second floating-point vector to produce signed representations of the shifted products, adding the signed representations of the shifted products with the set of adders to produce a single product, and normalizing the single product with the normalization circuit based on the maximum exponent into a single floating-point resultant at 1704; and in the second mode, each multiplier of the set of multipliers multiplying values from a same element position of a first fixed-point vector and a second fixed-point vector to produce a corresponding product, and adding each corresponding product with the set of adders to produce a single fixed-point resultant at 1706.

Certain embodiments herein allow use for deep learning operations where any small errors imparted by a fixed hardware width do not affect the deep learning operation. Certain embodiments herein decouples the input vector width for an operation with the hardware width, e.g., by including include an accumulator(s) such that the entire vector (e.g., greater than 32 elements) being iterated through a combined fixed-point and floating-point vector multiplication circuit is not limited to having a maximum width of the fixed-point and floating-point vector multiplication circuit. In certain embodiments, a final accumulation by an accumulator for an entire vector checks the exponent for each iteration against a maximum exponent for each previous iteration of that operation. Certain embodiments herein utilize a non-floating-point adder (e.g., an integer adder) in an accumulator circuit to add numbers in non-floating-point format for each iteration, and then performs one conversion of that sum of numbers to floating-point format, e.g., instead of adding multiple floating-point numbers together for each iteration.

In one embodiment, an apparatus (e.g., an accelerator) includes a circuit comprising a set of multipliers coupled to a set of shift registers coupled to a set of numeric conversion circuits coupled to a set of adders, and a maximum exponent determiner coupled to the set of shift registers and a normalization circuit to produce a resultant; and at least one switch to change the circuit between a first mode and a second mode, wherein: in the first mode, each multiplier of the set of multipliers is to multiply mantissas from a same element position of a first floating-point vector and a second floating-point vector to produce a corresponding product, shift the corresponding products with the set of shift registers based on a maximum exponent of exponents for the corresponding products determined by the maximum exponent determiner to produce shifted products, perform an numeric conversion operation on the shifted products with the set of numeric conversion circuits based on sign bits from the same element position of the first floating-point vector and the second floating-point vector to produce signed representations of the shifted products, add the signed representations of the shifted products with the set of adders to produce a single product, and normalize the single product with the normalization circuit based on the maximum exponent into a single floating-point resultant, and in the second mode, each multiplier of the set of multipliers is to multiply values from a same element position of a first fixed-point vector and a second fixed-point vector to produce a corresponding product, and add each corresponding product with the set of adders to produce a single fixed-point resultant. The apparatus may include an accumulator circuit that comprises: a floating-point adder circuit that adds the single floating-point resultant to a previously generated, single floating-point resultant when the circuit is in the first mode; and a fixed-point adder circuit that adds the single fixed-point resultant to a previously generated, single fixed-point resultant when the circuit is in the second mode. The normalization circuit may include a rounding circuit to round the single product. The apparatus may include an accumulator circuit that comprises a fixed-point adder circuit to add the single product from the set of adders to a previously generated, single product from the set of adders to produce an accumulated product, and normalize the accumulated product with the normalization circuit based on the maximum exponent into the single floating-point resultant when the circuit is in the first mode. The apparatus may include a second instance of the circuit, and the circuit is a first instance of the circuit, wherein the first instance of the circuit operates on a first proper subset of the first floating-point vector having a first maximum exponent and the second instance of the circuit operates on a second proper subset of the second floating-point vector having a second maximum exponent when the circuit is in the first mode. The first maximum exponent and the second maximum exponent may both be multiples of a whole number greater than three. The apparatus may include a sorter circuit to sort corresponding products from each multiplier of the set of multipliers before shifting each corresponding product with the set of shift registers. The apparatus may include a set of rounding circuits between the set of shift registers and the set of numeric conversion circuits to round the shifted products.

In another embodiment, a method includes switching a circuit comprising a set of multipliers coupled to a set of shift registers coupled to a set of numeric conversion circuits coupled to a set of adders, and a maximum exponent determiner coupled to the set of shift registers and a normalization circuit between a first mode and a second mode with at least one switch; in the first mode, each multiplier of the set of multipliers multiplying mantissas from a same element position of a first floating-point vector and a second floating-point vector to produce a corresponding product, shifting the corresponding products with the set of shift registers based on a maximum exponent of exponents for the corresponding products determined by the maximum exponent determiner to produce shifted products, performing an numeric conversion operation on the shifted products with the set of numeric conversion circuits based on sign bits from the same element position of the first floating-point vector and the second floating-point vector to produce signed representations of the shifted products, adding the signed representations of the shifted products with the set of adders to produce a single product, and normalizing the single product with the normalization circuit based on the maximum exponent into a single floating-point resultant; and in the second mode, each multiplier of the set of multipliers multiplying values from a same element position of a first fixed-point vector and a second fixed-point vector to produce a corresponding product, and adding each corresponding product with the set of adders to produce a single fixed-point resultant. The method may include adding the single floating-point resultant to a previously generated, single floating-point resultant with a floating-point adder circuit when the circuit is in the first mode; and adding the single fixed-point resultant to a previously generated, single fixed-point resultant with a fixed-point adder circuit when the circuit is in the second mode. The method may include rounding the single product with a rounding circuit. The method may include adding the single product from the set of adders to a previously generated, single product from the set of adders with a fixed-point adder circuit to produce an accumulated product, and normalizing the accumulated product with the normalization circuit based on the maximum exponent into the single floating-point resultant when the circuit is in the first mode. The method may include, when the circuit is in the first mode, operating on a first proper subset of the first floating-point vector having a first maximum exponent with the circuit, and operating on a second proper subset of the second floating-point vector having a second maximum exponent with a second instance of the circuit. The method may include wherein the first maximum exponent and the second maximum exponent are both multiples of a whole number greater than three. The method may include sorting corresponding products from each multiplier of the set of multipliers with a sorter circuit before shifting each corresponding product with the set of shift registers. The method may include rounding the shifted products with a set of rounding circuits between the set of shift registers and the set of numeric conversion circuits.

In yet another embodiment, a non-transitory machine readable medium that stores code that when executed by a machine causes the machine to perform a method including switching a circuit comprising a set of multipliers coupled to a set of shift registers coupled to a set of numeric conversion circuits coupled to a set of adders, and a maximum exponent determiner coupled to the set of shift registers and a normalization circuit between a first mode and a second mode with at least one switch; in the first mode, each multiplier of the set of multipliers multiplying mantissas from a same element position of a first floating-point vector and a second floating-point vector to produce a corresponding product, shifting the corresponding products with the set of shift registers based on a maximum exponent of exponents for the corresponding products determined by the maximum exponent determiner to produce shifted products, performing an numeric conversion operation on the shifted products with the set of numeric conversion circuits based on sign bits from the same element position of the first floating-point vector and the second floating-point vector to produce signed representations of the shifted products, adding the signed representations of the shifted products with the set of adders to produce a single product, and normalizing the single product with the normalization circuit based on the maximum exponent into a single floating-point resultant; and in the second mode, each multiplier of the set of multipliers multiplying values from a same element position of a first fixed-point vector and a second fixed-point vector to produce a corresponding product, and adding each corresponding product with the set of adders to produce a single fixed-point resultant. The method may include adding the single floating-point resultant to a previously generated, single floating-point resultant with a floating-point adder circuit when the circuit is in the first mode; and adding the single fixed-point resultant to a previously generated, single fixed-point resultant with a fixed-point adder circuit when the circuit is in the second mode. The method may include rounding the single product with a rounding circuit. The method may include adding the single product from the set of adders to a previously generated, single product from the set of adders with a fixed-point adder circuit to produce an accumulated product, and normalizing the accumulated product with the normalization circuit based on the maximum exponent into the single floating-point resultant when the circuit is in the first mode. The method may include, when the circuit is in the first mode, operating on a first proper subset of the first floating-point vector having a first maximum exponent with the circuit, and operating on a second proper subset of the second floating-point vector having a second maximum exponent with a second instance of the circuit. The method may include wherein the first maximum exponent and the second maximum exponent are both multiples of a whole number greater than three. The method may include sorting corresponding products from each multiplier of the set of multipliers with a sorter circuit before shifting each corresponding product with the set of shift registers. The method may include rounding the shifted products with a set of rounding circuits between the set of shift registers and the set of numeric conversion circuits.

In another embodiment, an apparatus (e.g., an accelerator) includes a circuit comprising a set of multipliers coupled to a set of shift registers coupled to a set of numeric conversion circuits coupled to a set of adders, and a maximum exponent determiner coupled to the set of shift registers and a normalization circuit to produce a resultant; and means to change the circuit between a first mode and a second mode, wherein: in the first mode, each multiplier of the set of multipliers is to multiply mantissas from a same element position of a first floating-point vector and a second floating-point vector to produce a corresponding product, shift the corresponding products with the set of shift registers based on a maximum exponent of exponents for the corresponding products determined by the maximum exponent determiner to produce shifted products, perform an numeric conversion operation on the shifted products with the set of numeric conversion circuits based on sign bits from the same element position of the first floating-point vector and the second floating-point vector to produce signed representations of the shifted products, add the signed representations of the shifted products with the set of adders to produce a single product, and normalize the single product with the normalization circuit based on the maximum exponent into a single floating-point resultant, and in the second mode, each multiplier of the set of multipliers is to multiply values from a same element position of a first fixed-point vector and a second fixed-point vector to produce a corresponding product, and add each corresponding product with the set of adders to produce a single fixed-point resultant.

In yet another embodiment, an apparatus comprises a data storage device that stores code that when executed by a hardware processor causes the hardware processor to perform any method disclosed herein. An apparatus may be as described in the detailed description. A method may be as described in the detailed description.

An instruction set may include one or more instruction formats. A given instruction format may define various fields (e.g., number of bits, location of bits) to specify, among other things, the operation to be performed (e.g., opcode) and the operand(s) on which that operation is to be performed and/or other data field(s) (e.g., mask). Some instruction formats are further broken down though the definition of instruction templates (or subformats). For example, the instruction templates of a given instruction format may be defined to have different subsets of the instruction format's fields (the included fields are typically in the same order, but at least some have different bit positions because there are less fields included) and/or defined to have a given field interpreted differently. Thus, each instruction of an ISA is expressed using a given instruction format (and, if defined, in a given one of the instruction templates of that instruction format) and includes fields for specifying the operation and the operands. For example, an exemplary ADD instruction has a specific opcode and an instruction format that includes an opcode field to specify that opcode and operand fields to select operands (source1/destination and source2); and an occurrence of this ADD instruction in an instruction stream will have specific contents in the operand fields that select specific operands. A set of SIMD extensions referred to as the Advanced Vector Extensions (AVX) (AVX1 and AVX2) and using the Vector Extensions (VEX) coding scheme has been released and/or published (e.g., see Intel® 64 and IA-32 Architectures Software Developer's Manual, May 2018; and see Intel® Architecture Instruction Set Extensions Programming Reference, May 2018).

Exemplary Instruction Formats

Embodiments of the instruction(s) described herein may be embodied in different formats. Additionally, exemplary systems, architectures, and pipelines are detailed below. Embodiments of the instruction(s) may be executed on such systems, architectures, and pipelines, but are not limited to those detailed.

Generic Vector Friendly Instruction Format

A vector friendly instruction format is an instruction format that is suited for vector instructions (e.g., there are certain fields specific to vector operations). While embodiments are described in which both vector and scalar operations are supported through the vector friendly instruction format, alternative embodiments use only vector operations the vector friendly instruction format.

Figure 18A:
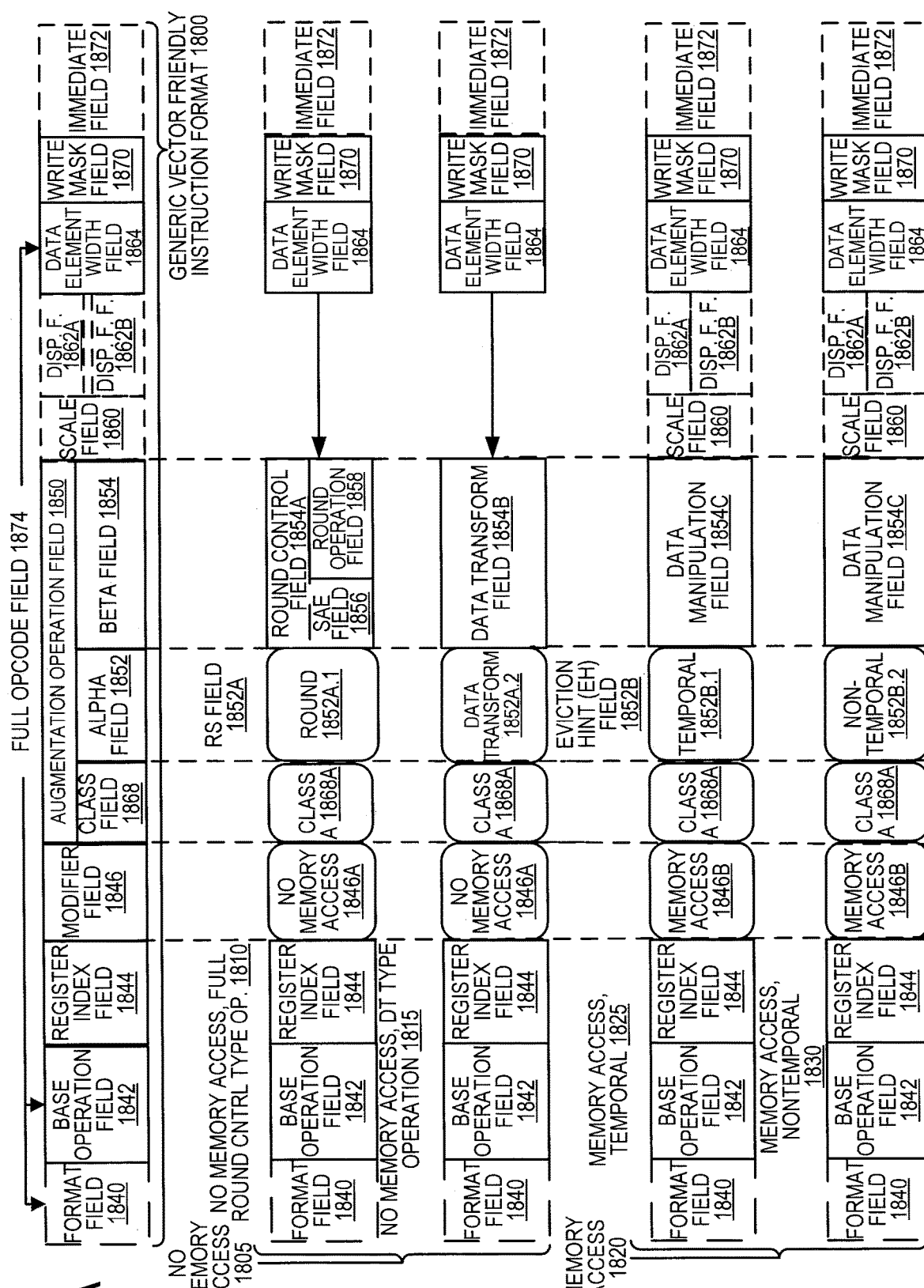
FIG. 18A is a block diagram illustrating a generic vector friendly instruction format and class A instruction templates thereof according to embodiments of the disclosure.
Figure 18B:
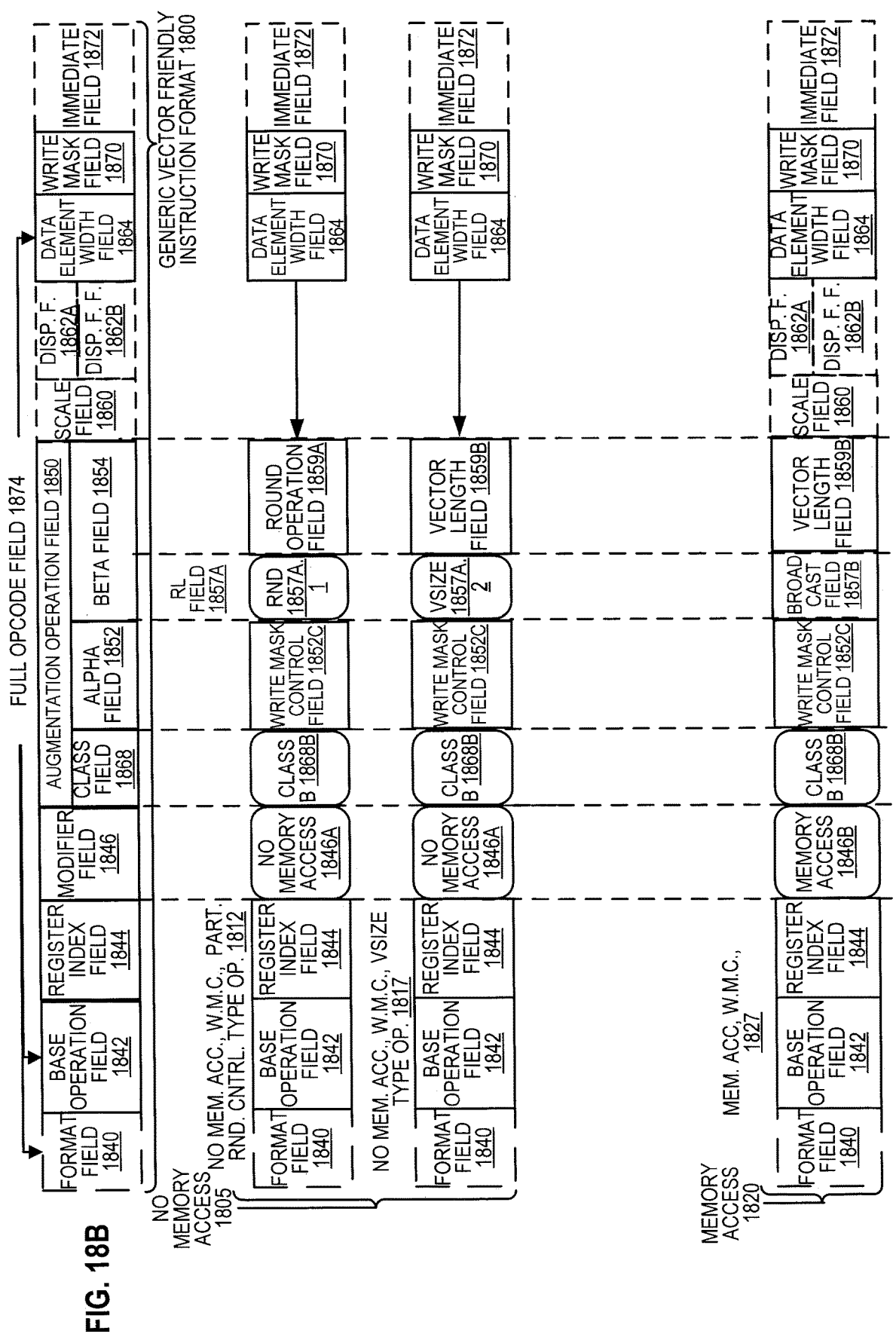
FIG. 18B is a block diagram illustrating the generic vector friendly instruction format and class B instruction templates thereof according to embodiments of the disclosure.

FIGS. 18A-18B are block diagrams illustrating a generic vector friendly instruction format and instruction templates thereof according to embodiments of the disclosure. FIG. 18A is a block diagram illustrating a generic vector friendly instruction format and class A instruction templates thereof according to embodiments of the disclosure; while FIG. 18B is a block diagram illustrating the generic vector friendly instruction format and class B instruction templates thereof according to embodiments of the disclosure. Specifically, a generic vector friendly instruction format 1800 for which are defined class A and class B instruction templates, both of which include no memory access 1805 instruction templates and memory access 1820 instruction templates. The term generic in the context of the vector friendly instruction format refers to the instruction format not being tied to any specific instruction set.

While embodiments of the disclosure will be described in which the vector friendly instruction format supports the following: a 64 byte vector operand length (or size) with 32 bit (4 byte) or 64 bit (8 byte) data element widths (or sizes) (and thus, a 64 byte vector consists of either 16 doubleword-size elements or alternatively, 8 quadword-size elements); a 64 byte vector operand length (or size) with 16 bit (2 byte) or 8 bit (1 byte) data element widths (or sizes); a 32 byte vector operand length (or size) with 32 bit (4 byte), 64 bit (8 byte), 16 bit (2 byte), or 8 bit (1 byte) data element widths (or sizes); and a 16 byte vector operand length (or size) with 32 bit (4 byte), 64 bit (8 byte), 16 bit (2 byte), or 8 bit (1 byte) data element widths (or sizes); alternative embodiments may support more, less and/or different vector operand sizes (e.g., 256 byte vector operands) with more, less, or different data element widths (e.g., 128 bit (16 byte) data element widths).

The class A instruction templates in FIG. 18A include: 1) within the no memory access 1805 instruction templates there is shown a no memory access, full round control type operation 1810 instruction template and a no memory access, data transform type operation 1815 instruction template; and 2) within the memory access 1820 instruction templates there is shown a memory access, temporal 1825 instruction template and a memory access, non-temporal 1830 instruction template. The class B instruction templates in FIG. 18B include: 1) within the no memory access 1805 instruction templates there is shown a no memory access, write mask control, partial round control type operation 1812 instruction template and a no memory access, write mask control, vsize type operation 1817 instruction template; and 2) within the memory access 1820 instruction templates there is shown a memory access, write mask control 1827 instruction template.

The generic vector friendly instruction format 1800 includes the following fields listed below in the order illustrated in FIGS. 18A-18B.

Format field 1840—a specific value (an instruction format identifier value) in this field uniquely identifies the vector friendly instruction format, and thus occurrences of instructions in the vector friendly instruction format in instruction streams. As such, this field is optional in the sense that it is not needed for an instruction set that has only the generic vector friendly instruction format.

Base operation field 1842—its content distinguishes different base operations.

Register index field 1844—its content, directly or through address generation, specifies the locations of the source and destination operands, be they in registers or in memory. These include a sufficient number of bits to select N registers from a PxQ (e.g. 32x512, 16x128, 32x1024, 64x1024) register file. While in one embodiment N may be up to three sources and one destination register, alternative embodiments may support more or less sources and destination registers (e.g., may support up to two sources where one of these sources also acts as the destination, may support up to three sources where one of these sources also acts as the destination, may support up to two sources and one destination).

Modifier field 1846—its content distinguishes occurrences of instructions in the generic vector instruction format that specify memory access from those that do not; that is, between no memory access 1805 instruction templates and memory access 1820 instruction templates. Memory access operations read and/or write to the memory hierarchy (in some cases specifying the source and/or destination addresses using values in registers), while non-memory access operations do not (e.g., the source and destinations are registers). While in one embodiment this field also selects between three different ways to perform memory address calculations, alternative embodiments may support more, less, or different ways to perform memory address calculations.

Augmentation operation field 1850—its content distinguishes which one of a variety of different operations to be performed in addition to the base operation. This field is context specific. In one embodiment of the disclosure, this field is divided into a class field 1868, an alpha field 1852, and a beta field 1854. The augmentation operation field 1850 allows common groups of operations to be performed in a single instruction rather than 2, 3, or 4 instructions.

Scale field 1860—its content allows for the scaling of the index field's content for memory address generation (e.g., for address generation that uses $2^{scale}*\text{index}+\text{base}$).

Displacement Field 1862A—its content is used as part of memory address generation (e.g., for address generation that uses $2^{scale}*\text{index}+\text{base}+\text{displacement}$).

Displacement Factor Field 1862B (note that the juxtaposition of displacement field 1862A directly over displacement factor field 1862B indicates one or the other is used)—its content is used as part of address generation; it specifies a displacement factor that is to be scaled by the size of a memory access (N)—where N is the number of bytes in the memory access (e.g., for address generation that uses $2^{scale}*\text{index}+\text{base}+\text{scaled displacement}$). Redundant low-order bits are ignored and hence, the displacement factor field's content is multiplied by the memory operands total size (N) in order to generate the final displacement to be used in calculating an effective address. The value of N is determined by the processor hardware at runtime based on the full opcode field 1874 (described later herein) and the data manipulation field 1854C. The displacement field 1862A and the displacement factor field 1862B are optional in the sense that they are not used for the no memory access 1805 instruction templates and/or different embodiments may implement only one or none of the two.

Data element width field 1864—its content distinguishes which one of a number of data element widths is to be used (in some embodiments for all instructions; in other embodiments for only some of the instructions). This field is optional in the sense that it is not needed if only one data element width is supported and/or data element widths are supported using some aspect of the opcodes.

Write mask field 1870—its content controls, on a per data element position basis, whether that data element position in the destination vector operand reflects the result of the base operation and augmentation operation. Class A instruction templates support merging-writemasking, while class B instruction templates support both merging- and zeroing-writemasking. When merging, vector masks allow any set of elements in the destination to be protected from updates during the execution of any operation (specified by the base operation and the augmentation operation); in other one embodiment, preserving the old value of each element of the destination where the corresponding mask bit has a 0. In contrast, when zeroing vector masks allow any set of elements in the destination to be zeroed during the execution of any operation (specified by the base operation and the augmentation operation); in one embodiment, an element of the destination is set to 0 when the corresponding mask bit has a 0 value. A subset of this functionality is the ability to control the vector length of the operation being performed (that is, the span of elements being modified, from the first to the last one); however, it is not necessary that the elements that are modified be consecutive. Thus, the write mask field 1870 allows for partial vector operations, including loads, stores, arithmetic, logical, etc. While embodiments of the disclosure are described in which the write mask field's 1870 content selects one of a number of write mask registers that contains the write mask to be used (and thus the write mask field's 1870 content indirectly identifies that masking to be performed), alternative embodiments instead or additional allow the mask write field's 1870 content to directly specify the masking to be performed.

Immediate field 1872—its content allows for the specification of an immediate. This field is optional in the sense that is it not present in an implementation of the generic vector friendly format that does not support immediate and it is not present in instructions that do not use an immediate.

Class field 1868—its content distinguishes between different classes of instructions. With reference to FIGS. 18A-B, the contents of this field select between class A and class B instructions. In FIGS. 18A-B, rounded corner squares are used to indicate a specific value is present in a field (e.g., class A 1868A and class B 1868B for the class field 1868 respectively in FIGS. 18A-B).

Instruction Templates of Class A

In the case of the non-memory access 1805 instruction templates of class A, the alpha field 1852 is interpreted as an RS field 1852A, whose content distinguishes which one of the different augmentation operation types are to be performed (e.g., round 1852A.1 and data transform 1852A.2 are respectively specified for the no memory access, round type operation 1810 and the no memory access, data transform type operation 1815 instruction templates), while the beta field 1854 distinguishes which of the operations of the specified type is to be performed. In the no memory access 1805 instruction templates, the scale field 1860, the displacement field 1862A, and the displacement scale filed 1862B are not present. No-Memory Access Instruction Templates—Full Round Control Type Operation In the no memory access full round control type operation 1810 instruction template, the beta field 1854 is interpreted as a round control field 1854A, whose content(s) provide static rounding. While in the described embodiments of the disclosure the round control field 1854A includes a suppress all floating point exceptions (SAE) field 1856 and a round operation control field 1858, alternative embodiments may support may encode both these concepts into the same field or only have one or the other of these concepts/fields (e.g., may have only the round operation control field 1858).

SAE field 1856—its content distinguishes whether or not to disable the exception event reporting; when the SAE field's 1856 content indicates suppression is enabled, a given instruction does not report any kind of floating-point exception flag and does not raise any floating point exception handler.

Round operation control field 1858—its content distinguishes which one of a group of rounding operations to perform (e.g., Round-up, Round-down, Round-towards-zero or round-to-nearest). Thus, the round operation control field 1858 allows for the changing of the rounding mode on a per instruction basis. In one embodiment of the disclosure where a processor includes a control register for specifying rounding modes, the round operation control field's 1850 content overrides that register value.

No Memory Access Instruction Templates—Data Transform Type Operation

In the no memory access data transform type operation 1815 instruction template, the beta field 1854 is interpreted as a data transform field 1854B, whose content distinguishes which one of a number of data transforms is to be performed (e.g., no data transform, swizzle, broadcast).

In the case of a memory access 1820 instruction template of class A, the alpha field 1852 is interpreted as an eviction hint field 1852B, whose content distinguishes which one of the eviction hints is to be used (in FIG. 18A, temporal 1852B.1 and non-temporal 1852B.2 are respectively specified for the memory access, temporal 1825 instruction template and the memory access, non-temporal 1830 instruction template), while the beta field 1854 is interpreted as a data manipulation field 1854C, whose content distinguishes which one of a number of data manipulation operations (also known as primitives) is to be performed (e.g., no manipulation; broadcast; up conversion of a source; and down conversion of a destination). The memory access 1820 instruction templates include the scale field 1860, and optionally the displacement field 1862A or the displacement scale field 1862B.

Vector memory instructions perform vector loads from and vector stores to memory, with conversion support. As with regular vector instructions, vector memory instructions transfer data from/to memory in a data element-wise fashion, with the elements that are actually transferred is dictated by the contents of the vector mask that is selected as the write mask.

Memory Access Instruction Templates—Temporal

Temporal data is data likely to be reused soon enough to benefit from caching. This is, however, a hint, and different processors may implement it in different ways, including ignoring the hint entirely.

Memory Access Instruction Templates—Non-Temporal

Non-temporal data is data unlikely to be reused soon enough to benefit from caching in the 1st-level cache and should be given priority for eviction. This is, however, a hint, and different processors may implement it in different ways, including ignoring the hint entirely.

Instruction Templates of Class B

In the case of the instruction templates of class B, the alpha field 1852 is interpreted as a write mask control (Z) field 1852C, whose content distinguishes whether the write masking controlled by the write mask field 1870 should be a merging or a zeroing.

In the case of the non-memory access 1805 instruction templates of class B, part of the beta field 1854 is interpreted as an RL field 1857A, whose content distinguishes which one of the different augmentation operation types are to be performed (e.g., round 1857A.1 and vector length (VSIZE) 1857A.2 are respectively specified for the no memory access, write mask control, partial round control type operation 1812 instruction template and the no memory access, write mask control, VSIZE type operation 1817 instruction template), while the rest of the beta field 1854 distinguishes which of the operations of the specified type is to be performed. In the no memory access 1805 instruction templates, the scale field 1860, the displacement field 1862A, and the displacement scale filed 1862B are not present.

In the no memory access, write mask control, partial round control type operation 1810 instruction template, the rest of the beta field 1854 is interpreted as a round operation field 1859A and exception event reporting is disabled (a given instruction does not report any kind of floating-point exception flag and does not raise any floating point exception handler).

Round operation control field 1859A—just as round operation control field 1858, its content distinguishes which one of a group of rounding operations to perform (e.g., Round-up, Round-down, Round-towards-zero or round-to-nearest). Thus, the round operation control field 1859A allows for the changing of the rounding mode on a per instruction basis. In one embodiment of the disclosure where a processor includes a control register for specifying rounding modes, the round operation control field's 1850 content overrides that register value.

In the no memory access, write mask control, VSIZE type operation 1817 instruction template, the rest of the beta field 1854 is interpreted as a vector length field 1859B, whose content distinguishes which one of a number of data vector lengths is to be performed on (e.g., 128, 256, or 512 byte).

In the case of a memory access 1820 instruction template of class B, part of the beta field 1854 is interpreted as a broadcast field 1857B, whose content distinguishes whether or not the broadcast type data manipulation operation is to be performed, while the rest of the beta field 1854 is interpreted the vector length field 1859B. The memory access 1820 instruction templates include the scale field 1860, and optionally the displacement field 1862A or the displacement scale field 1862B.

With regard to the generic vector friendly instruction format 1800, a full opcode field 1874 is shown including the format field 1840, the base operation field 1842, and the data element width field 1864. While one embodiment is shown where the full opcode field 1874 includes all of these fields, the full opcode field 1874 includes less than all of these fields in embodiments that do not support all of them. The full opcode field 1874 provides the operation code (opcode).

The augmentation operation field 1850, the data element width field 1864, and the write mask field 1870 allow these features to be specified on a per instruction basis in the generic vector friendly instruction format.

The combination of write mask field and data element width field create typed instructions in that they allow the mask to be applied based on different data element widths.

The various instruction templates found within class A and class B are beneficial in different situations. In some embodiments of the disclosure, different processors or different cores within a processor may support only class A, only class B, or both classes. For instance, a high performance general purpose out-of-order core intended for general-purpose computing may support only class B, a core intended primarily for graphics and/or scientific (throughput) computing may support only class A, and a core intended for both may support both (of course, a core that has some mix of templates and instructions from both classes but not all templates and instructions from both classes is within the purview of the disclosure). Also, a single processor may include multiple cores, all of which support the same class or in which different cores support different class. For instance, in a processor with separate graphics and general purpose cores, one of the graphics cores intended primarily for graphics and/or scientific computing may support only class A, while one or more of the general purpose cores may be high performance general purpose cores with out of order execution and register renaming intended for general-purpose computing that support only class B. Another processor that does not have a separate graphics core, may include one more general purpose in-order or out-of-order cores that support both class A and class B. Of course, features from one class may also be implement in the other class in different embodiments of the disclosure. Programs written in a high level language would be put (e.g., just in time compiled or statically compiled) into an variety of different executable forms, including: 1) a form having only instructions of the class(es) supported by the target processor for execution; or 2) a form having alternative routines written using different combinations of the instructions of all classes and having control flow code that selects the routines to execute based on the instructions supported by the processor which is currently executing the code.

Exemplary Specific Vector Friendly Instruction Format

FIG. 19 is a block diagram illustrating an exemplary specific vector friendly instruction format according to embodiments of the disclosure. FIG. 19 shows a specific vector friendly instruction format 1900 that is specific in the sense that it specifies the location, size, interpretation, and order of the fields, as well as values for some of those fields. The specific vector friendly instruction format 1900 may be used to extend the x86 instruction set, and thus some of the fields are similar or the same as those used in the existing x86 instruction set and extension thereof (e.g., AVX). This format remains consistent with the prefix encoding field, real opcode byte field, MOD R/M field, SIB field, displacement field, and immediate fields of the existing x86 instruction set with extensions. The fields from FIG. 18 into which the fields from FIG. 19 map are illustrated.

It should be understood that, although embodiments of the disclosure are described with reference to the specific vector friendly instruction format 1900 in the context of the generic vector friendly instruction format 1800 for illustrative purposes, the disclosure is not limited to the specific vector friendly instruction format 1900 except where claimed. For example, the generic vector friendly instruction format 1800 contemplates a variety of possible sizes for the various fields, while the specific vector friendly instruction format 1900 is shown as having fields of specific sizes. By way of specific example, while the data element width field 1864 is illustrated as a one bit field in the specific vector friendly instruction format 1900, the disclosure is not so limited (that is, the generic vector friendly instruction format 1800 contemplates other sizes of the data element width field 1864).

The generic vector friendly instruction format 1800 includes the following fields listed below in the order illustrated in FIG. 19A.

EVEX Prefix (Bytes 0-3) 1902—is encoded in a four-byte form.

Format Field 1840 (EVEX Byte 0, bits [7:0]) —the first byte (EVEX Byte 0) is the format field 1840 and it contains 0x62 (the unique value used for distinguishing the vector friendly instruction format in one embodiment of the disclosure).

The second-fourth bytes (EVEX Bytes 1-3) include a number of bit fields providing specific capability.

REX field 1905 (EVEX Byte 1, bits [7-5]) —consists of a EVEX.R bit field (EVEX Byte 1, bit [7]—R), EVEX.X bit field (EVEX byte 1, bit [6]-X), and 1857BEX byte 1, bit[5]-B). The EVEX.R, EVEX.X, and EVEX.B bit fields provide the same functionality as the corresponding VEX bit fields, and are encoded using 1s complement form, i.e. ZMM0 is encoded as 1111B, ZMM15 is encoded as 0000B. Other fields of the instructions encode the lower three bits of the register indexes as is known in the art (rrr, xxx, and bbb), so that Rrrr, Xxxx, and Bbbb may be formed by adding EVEX.R, EVEX.X, and EVEX.B.

REX' field 1810—this is the first part of the REX' field 1810 and is the EVEX.R' bit field (EVEX Byte 1, bit [4]-R') that is used to encode either the upper 16 or lower 16 of the extended 32 register set. In one embodiment of the disclosure, this bit, along with others as indicated below, is stored in bit inverted format to distinguish (in the well-known x86 32-bit mode) from the BOUND instruction, whose real opcode byte is 62, but does not accept in the MOD R/M field (described below) the value of 11 in the MOD field; alternative embodiments of the disclosure do not store this and the other indicated bits below in the inverted format. A value of 1 is used to encode the lower 16 registers. In other words, R'Rrrr is formed by combining EVEX.R', EVEX.R, and the other RRR from other fields.

Opcode map field 1915 (EVEX byte 1, bits [3:0]-mmmm) —its content encodes an implied leading opcode byte (0F, 0F 38, or 0F 3).

Data element width field 1864 (EVEX byte 2, bit [7]-W) —is represented by the notation EVEX.W. EVEX.W is used to define the granularity (size) of the datatype (either 32-bit data elements or 64-bit data elements).

EVEX.vvvv 1920 (EVEX Byte 2, bits [6:3]-vvvv) —the role of EVEX.vvvv may include the following: 1) EVEX.vvvv encodes the first source register operand, specified in inverted (is complement) form and is valid for instructions with 2 or more source operands; 2) EVEX.vvvv encodes the destination register operand, specified in is complement form for certain vector shifts; or 3) EVEX.vvvv does not encode any operand, the field is reserved and should contain 1111b. Thus, EVEX.vvvv field 1920 encodes the 4 low-order bits of the first source register specifier stored in inverted (1s complement) form. Depending on the instruction, an extra different EVEX bit field is used to extend the specifier size to 32 registers.

EVEX.U 1868 Class field (EVEX byte 2, bit [2]-U) —If EVEX.U=0, it indicates class A or EVEX.U0; if EVEX.U=1, it indicates class B or EVEX.U1.

Prefix encoding field 1925 (EVEX byte 2, bits [1:0]-pp) —provides additional bits for the base operation field. In addition to providing support for the legacy SSE instructions in the EVEX prefix format, this also has the benefit of compacting the SIMD prefix (rather than requiring a byte to express the SIMD prefix, the EVEX prefix requires only 2 bits). In one embodiment, to support legacy SSE instructions that use a SIMD prefix (66H, F2H, F3H) in both the legacy format and in the EVEX prefix format, these legacy SIMD prefixes are encoded into the SIMD prefix encoding field; and at runtime are expanded into the legacy SIMD prefix prior to being provided to the decoder's PLA (so the PLA can execute both the legacy and EVEX format of these legacy instructions without modification). Although newer instructions could use the EVEX prefix encoding field's content directly as an opcode extension, certain embodiments expand in a similar fashion for consistency but allow for different meanings to be specified by these legacy SIMD prefixes. An alternative embodiment may redesign the PLA to support the 2 bit SIMD prefix encodings, and thus not require the expansion.

Alpha field 1852 (EVEX byte 3, bit [7]-EH; also known as EVEX.EH, EVEX.rs, EVEX.RL, EVEX.write mask control, and EVEX.N; also illustrated with a) —as previously described, this field is context specific.

Beta field 1854 (EVEX byte 3, bits [6:4]-SSS, also known as EVEX.$s_{2-0}$, EVEX.$r_{2-0}$, EVEX.rr1, EVEX.LL0, EVEX.LLB; also illustrated with βββ) —as previously described, this field is context specific.

REX' field 1810—this is the remainder of the REX' field and is the EVEX.V' bit field (EVEX Byte 3, bit [3]-V') that may be used to encode either the upper 16 or lower 16 of the extended 32 register set. This bit is stored in bit inverted format. A value of 1 is used to encode the lower 16 registers. In other words, V'VVVV is formed by combining EVEX.V', EVEX.vvvv.

Write mask field 1870 (EVEX byte 3, bits [2:0]-kkk) —its content specifies the index of a register in the write mask registers as previously described. In one embodiment of the disclosure, the specific value EVEX.kkk=000 has a special behavior implying no write mask is used for the particular instruction (this may be implemented in a variety of ways including the use of a write mask hardwired to all ones or hardware that bypasses the masking hardware).

Real Opcode Field 1930 (Byte 4) is also known as the opcode byte. Part of the opcode is specified in this field.

MOD R/M Field 1940 (Byte 5) includes MOD field 1942, Reg field 1944, and R/M field 1946. As previously described, the MOD field's 1942 content distinguishes between memory access and non-memory access operations. The role of Reg field 1944 can be summarized to two situations: encoding either the destination register operand or a source register operand, or be treated as an opcode extension and not used to encode any instruction operand. The role of R/M field 1946 may include the following: encoding the instruction operand that references a memory address, or encoding either the destination register operand or a source register operand.

Scale, Index, Base (SIB) Byte (Byte 6) —As previously described, the scale field's 1850 content is used for memory address generation. SIB.xxx 1954 and SIB.bbb 1956—the contents of these fields have been previously referred to with regard to the register indexes Xxxx and Bbbb.

Displacement field 1862A (Bytes 7-10) —when MOD field 1942 contains 10, bytes 7-10 are the displacement field 1862A, and it works the same as the legacy 32-bit displacement (disp32) and works at byte granularity.

Displacement factor field 1862B (Byte 7) —when MOD field 1942 contains 01, byte 7 is the displacement factor field 1862B. The location of this field is that same as that of the legacy x86 instruction set 8-bit displacement (disp8), which works at byte granularity. Since disp8 is sign extended, it can only address between −128 and 127 bytes offsets; in terms of 64 byte cache lines, disp8 uses 8 bits that can be set to only four really useful values −128, −64, 0, and 64; since a greater range is often needed, disp32 is used; however, disp32 requires 4 bytes. In contrast to disp8 and disp32, the displacement factor field 1862B is a reinterpretation of disp8; when using displacement factor field 1862B, the actual displacement is determined by the content of the displacement factor field multiplied by the size of the memory operand access (N). This type of displacement is referred to as disp8*N. This reduces the average instruction length (a single byte of used for the displacement but with a much greater range). Such compressed displacement is based on the assumption that the effective displacement is multiple of the granularity of the memory access, and hence, the redundant low-order bits of the address offset do not need to be encoded. In other words, the displacement factor field 1862B substitutes the legacy x86 instruction set 8-bit displacement. Thus, the displacement factor field 1862B is encoded the same way as an x86 instruction set 8-bit displacement (so no changes in the ModRM/SIB encoding rules) with the only exception that disp8 is overloaded to disp8*N. In other words, there are no changes in the encoding rules or encoding lengths but only in the interpretation of the displacement value by hardware (which needs to scale the displacement by the size of the memory operand to obtain a byte-wise address offset). Immediate field 1872 operates as previously described.

Full Opcode Field

FIG. 19B is a block diagram illustrating the fields of the specific vector friendly instruction format 1900 that make up the full opcode field 1874 according to one embodiment of the disclosure. Specifically, the full opcode field 1874 includes the format field 1840, the base operation field 1842, and the data element width (W) field 1864. The base operation field 1842 includes the prefix encoding field 1925, the opcode map field 1915, and the real opcode field 1930.

Register Index Field

FIG. 19C is a block diagram illustrating the fields of the specific vector friendly instruction format 1900 that make up the register index field 1844 according to one embodiment of the disclosure. Specifically, the register index field 1844 includes the REX field 1905, the REX' field 1910, the MODR/M.reg field 1944, the MODR/M.r/m field 1946, the VVVV field 1920, xxx field 1954, and the bbb field 1956.

Augmentation Operation Field

Figure 19D:
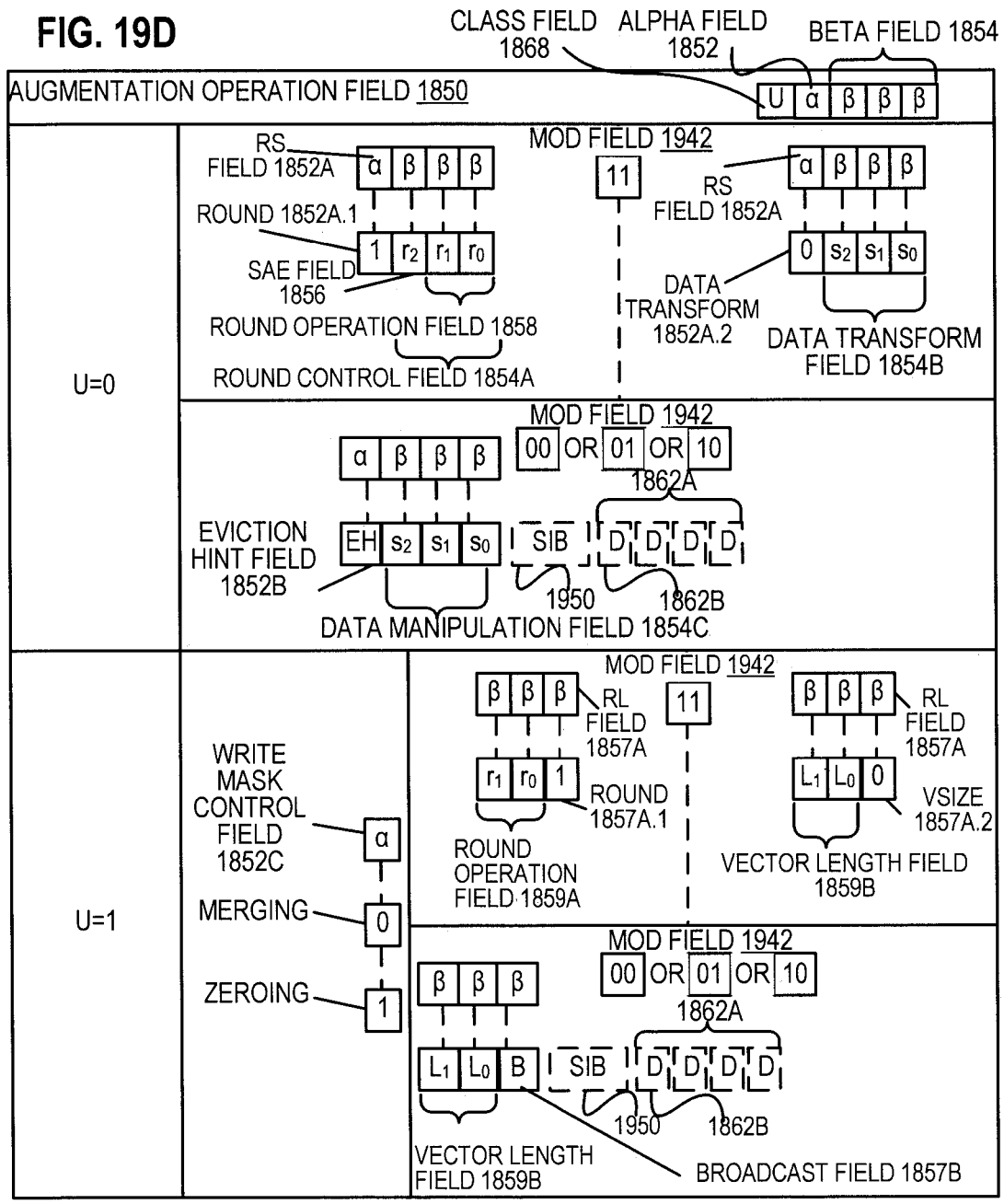
FIG. 19D is a block diagram illustrating the fields of the specific vector friendly instruction format in FIG. 19A that make up the augmentation operation field 1850 according to one embodiment of the disclosure.

FIG. 19D is a block diagram illustrating the fields of the specific vector friendly instruction format 1900 that make up the augmentation operation field 1850 according to one embodiment of the disclosure. When the class (U) field 1868 contains 0, it signifies EVEX.U0 (class A 1868A); when it contains 1, it signifies EVEX.U1 (class B 1868B). When U=0 and the MOD field 1942 contains 11 (signifying a no memory access operation), the alpha field 1852 (EVEX byte 3, bit [7]-EH) is interpreted as the rs field 1852A. When the rs field 1852A contains a 1 (round 1852A.1), the beta field 1854 (EVEX byte 3, bits [6:4]-SSS) is interpreted as the round control field 1854A. The round control field 1854A includes a one bit SAE field 1856 and a two bit round operation field 1858. When the rs field 1852A contains a 0 (data transform 1852A.2), the beta field 1854 (EVEX byte 3, bits [6:4]-SSS) is interpreted as a three bit data transform field 1854B. When U=0 and the MOD field 1942 contains 00, 01, or 10 (signifying a memory access operation), the alpha field 1852 (EVEX byte 3, bit [7]-EH) is interpreted as the eviction hint (EH) field 1852B and the beta field 1854 (EVEX byte 3, bits [6:4]-SSS) is interpreted as a three bit data manipulation field 1854C.

When U=1, the alpha field 1852 (EVEX byte 3, bit [7]-EH) is interpreted as the write mask control (Z) field 1852C. When U=1 and the MOD field 1942 contains 11 (signifying a no memory access operation), part of the beta field 1854 (EVEX byte 3, bit [4]-$S_0$) is interpreted as the RL field 1857A; when it contains a 1 (round 1857A.1) the rest of the beta field 1854 (EVEX byte 3, bit [6-5]-$S_{2-1}$) is interpreted as the round operation field 1859A, while when the RL field 1857A contains a 0 (VSIZE 1857.A2) the rest of the beta field 1854 (EVEX byte 3, bit [6-5]-$S_{2-1}$) is interpreted as the vector length field 1859B (EVEX byte 3, bit [6-5]-$L_{1-0}$). When U=1 and the MOD field 1942 contains 00, 01, or 10 (signifying a memory access operation), the beta field 1854 (EVEX byte 3, bits [6:4]-SSS) is interpreted as the vector length field 1859B (EVEX byte 3, bit [6-5]-$L_{1-0}$) and the broadcast field 1857B (EVEX byte 3, bit [4]-B).

Exemplary Register Architecture

Figure 20:
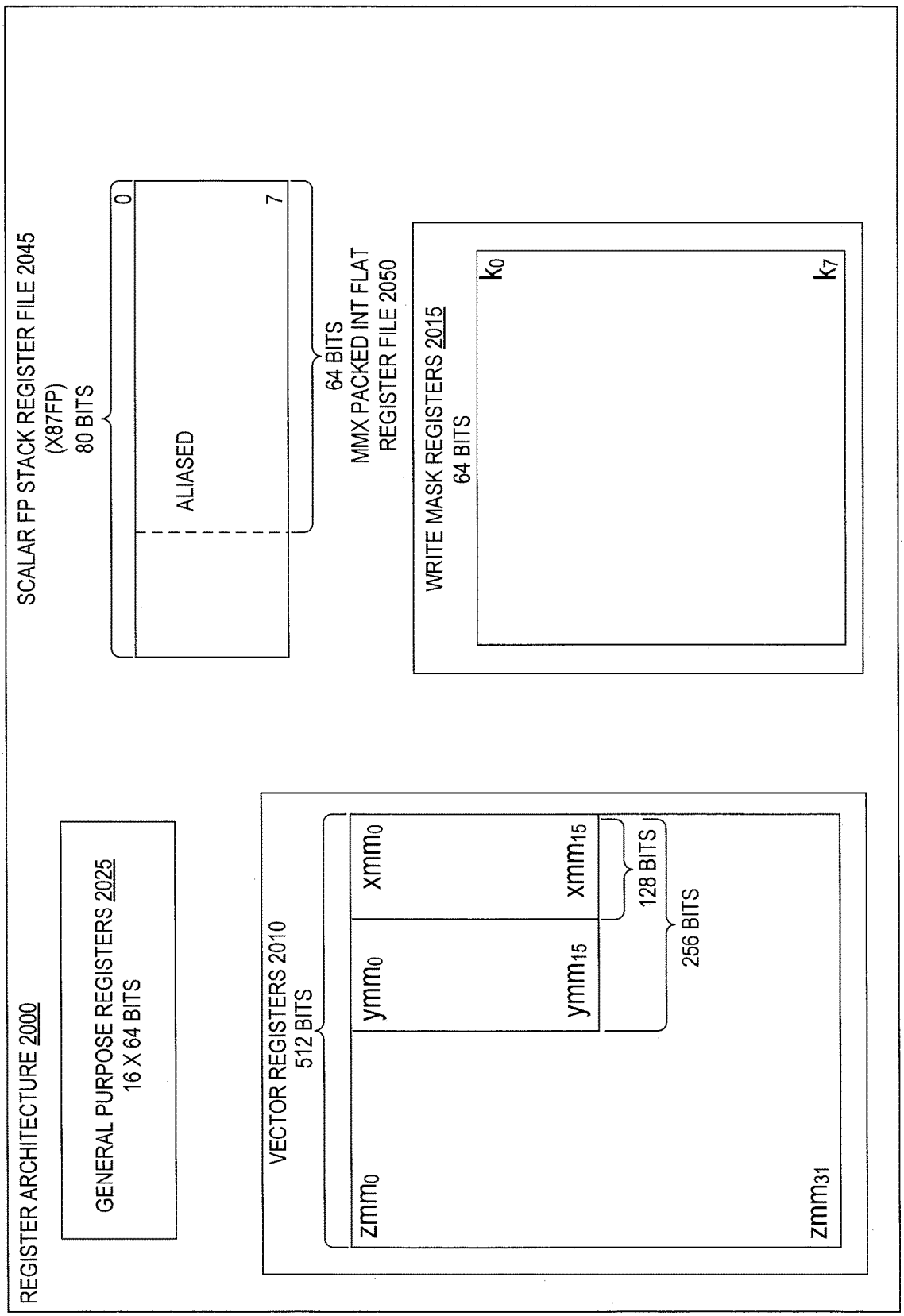
FIG. 20 is a block diagram of a register architecture according to one embodiment of the disclosure

FIG. 20 is a block diagram of a register architecture 2000 according to one embodiment of the disclosure. In the embodiment illustrated, there are 32 vector registers 2010 that are 512 bits wide; these registers are referenced as zmm0 through zmm31. The lower order 256 bits of the lower 16 zmm registers are overlaid on registers ymm0-16. The lower order 128 bits of the lower 16 zmm registers (the lower order 128 bits of the ymm registers) are overlaid on registers xmm0-15. The specific vector friendly instruction format 1900 operates on these overlaid register file as illustrated in the below tables.

| Adjustable Vector Length | Class | Operations | Registers |
|---|---|---|---|
| Instruction Templates that do not include the vector length field 1859B | A (FIG. 18A; U = 0) | 1810, 1815, 1825, 1830 | zmm registers (the vector length is 64 byte) |
| | B (FIG. 18B; U = 1) | 1812 | zmm registers (the vector length is 64 byte) |
| Instruction templates that do include the vector length field 1859B | B (FIG. 18B; U = 1) | 1817, 1827 | zmm, ymm, or xmm registers (the vector length is 64 byte, 32 byte, or 16 byte) depending on the vector length field 1859B |

In other words, the vector length field 1859B selects between a maximum length and one or more other shorter lengths, where each such shorter length is half the length of the preceding length; and instructions templates without the vector length field 1859B operate on the maximum vector length. Further, in one embodiment, the class B instruction templates of the specific vector friendly instruction format 1900 operate on packed or scalar single/double-precision floating point data and packed or scalar integer data. Scalar operations are operations performed on the lowest order data element position in an zmm/ymm/xmm register; the higher order data element positions are either left the same as they were prior to the instruction or zeroed depending on the embodiment.

Write mask registers 2015—in the embodiment illustrated, there are 8 write mask registers (k0 through k7), each 64 bits in size. In an alternate embodiment, the write mask registers 2015 are 16 bits in size. As previously described, in one embodiment of the disclosure, the vector mask register k0 cannot be used as a write mask; when the encoding that would normally indicate k0 is used for a write mask, it selects a hardwired write mask of 0xFFFF, effectively disabling write masking for that instruction.

General-purpose registers 2025—in the embodiment illustrated, there are sixteen 64-bit general-purpose registers that are used along with the existing x86 addressing modes to address memory operands. These registers are referenced by the names RAX, RBX, RCX, RDX, RBP, RSI, RDI, RSP, and R8 through R15.

Scalar floating point stack register file (x87 stack) 2045, on which is aliased the MMX packed integer flat register file 2050—in the embodiment illustrated, the x87 stack is an eight-element stack used to perform scalar floating-point operations on 32/64/80-bit floating point data using the x87 instruction set extension; while the MMX registers are used to perform operations on 64-bit packed integer data, as well as to hold operands for some operations performed between the MMX and XMM registers.

Alternative embodiments of the disclosure may use wider or narrower registers. Additionally, alternative embodiments of the disclosure may use more, less, or different register files and registers.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures

In-Order and Out-of-Order Core Block Diagram

FIG. 21A is a block diagram illustrating both an exemplary in-order pipeline and an exemplary register renaming, out-of-order issue/execution pipeline according to embodiments of the disclosure. FIG. 21B is a block diagram illustrating both an exemplary embodiment of an in-order architecture core and an exemplary register renaming, out-of-order issue/execution architecture core to be included in a processor according to embodiments of the disclosure. The solid lined boxes in FIGS. 21A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 21A, a processor pipeline 2100 includes a fetch stage 2102, a length decode stage 2104, a decode stage 2106, an allocation stage 2108, a renaming stage 2110, a scheduling (also known as a dispatch or issue) stage 2112, a register read/memory read stage 2114, an execute stage 2116, a write back/memory write stage 2118, an exception handling stage 2122, and a commit stage 2124.

FIG. 21B shows processor core 2190 including a front end unit 2130 coupled to an execution engine unit 2150, and both are coupled to a memory unit 2170. The core 2190 may be a reduced instruction set computing (RISC) core, a complex instruction set computing (CISC) core, a very long instruction word (VLIW) core, or a hybrid or alternative core type. As yet another option, the core 2190 may be a special-purpose core, such as, for example, a network or communication core, compression engine, coprocessor core, general purpose computing graphics processing unit (GPGPU) core, graphics core, or the like.

The front end unit 2130 includes a branch prediction unit 2132 coupled to an instruction cache unit 2134, which is coupled to an instruction translation lookaside buffer (TLB) 2136, which is coupled to an instruction fetch unit 2138, which is coupled to a decode unit 2140. The decode unit 2140 (or decoder or decoder unit) may decode instructions (e.g., macro-instructions), and generate as an output one or more micro-operations, micro-code entry points, microinstructions, other instructions, or other control signals, which are decoded from, or which otherwise reflect, or are derived from, the original instructions. The decode unit 2140 may be implemented using various different mechanisms. Examples of suitable mechanisms include, but are not limited to, look-up tables, hardware implementations, programmable logic arrays (PLAs), microcode read only memories (ROMs), etc. In one embodiment, the core 2190 includes a microcode ROM or other medium that stores microcode for certain macro-instructions (e.g., in decode unit 2140 or otherwise within the front end unit 2130). The decode unit 2140 is coupled to a rename/allocator unit 2152 in the execution engine unit 2150.

The execution engine unit 2150 includes the rename/allocator unit 2152 coupled to a retirement unit 2154 and a set of one or more scheduler unit(s) 2156. The scheduler unit(s) 2156 represents any number of different schedulers, including reservations stations, central instruction window, etc. The scheduler unit(s) 2156 is coupled to the physical register file(s) unit(s) 2158. Each of the physical register file(s) units 2158 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 2158 comprises a vector registers unit, a write mask registers unit, and a scalar registers unit. These register units may provide architectural vector registers, vector mask registers, and general purpose registers. The physical register file(s) unit(s) 2158 is overlapped by the retirement unit 2154 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 2154 and the physical register file(s) unit(s) 2158 are coupled to the execution cluster(s) 2160. The execution cluster(s) 2160 includes a set of one or more execution units 2162 and a set of one or more memory access units 2164. The execution units 2162 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 2156, physical register file(s) unit(s) 2158, and execution cluster(s) 2160 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 2164). It should also be understood that where separate pipelines are used, one or more of these pipelines may be out-of-order issue/execution and the rest in-order.

The set of memory access units 2164 is coupled to the memory unit 2170, which includes a data TLB unit 2172 coupled to a data cache unit 2174 coupled to a level 2 (L2) cache unit 2176. In one exemplary embodiment, the memory access units 2164 may include a load unit, a store address unit, and a store data unit, each of which is coupled to the data TLB unit 2172 in the memory unit 2170. The instruction cache unit 2134 is further coupled to a level 2 (L2) cache unit 2176 in the memory unit 2170. The L2 cache unit 2176 is coupled to one or more other levels of cache and eventually to a main memory.

By way of example, the exemplary register renaming, out-of-order issue/execution core architecture may implement the pipeline 2100 as follows: 1) the instruction fetch 2138 performs the fetch and length decoding stages 2102 and 2104; 2) the decode unit 2140 performs the decode stage 2106; 3) the rename/allocator unit 2152 performs the allocation stage 2108 and renaming stage 2110; 4) the scheduler unit(s) 2156 performs the schedule stage 2112; 5) the physical register file(s) unit(s) 2158 and the memory unit 2170 perform the register read/memory read stage 2114; the execution cluster 2160 perform the execute stage 2116; 6) the memory unit 2170 and the physical register file(s) unit(s) 2158 perform the write back/memory write stage 2118; 7) various units may be involved in the exception handling stage 2122; and 8) the retirement unit 2154 and the physical register file(s) unit(s) 2158 perform the commit stage 2124.

The core 2190 may support one or more instructions sets (e.g., the x86 instruction set (with some extensions that have been added with newer versions); the MIPS instruction set of MIPS Technologies of Sunnyvale, CA; the ARM instruction set (with optional additional extensions such as NEON) of ARM Holdings of Sunnyvale, CA), including the instruction(s) described herein. In one embodiment, the core 2190 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyper-Threading technology).

While register renaming is described in the context of out-of-order execution, it should be understood that register renaming may be used in an in-order architecture. While the illustrated embodiment of the processor also includes separate instruction and data cache units 2134/2174 and a shared L2 cache unit 2176, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary In-Order Core Architecture

Figure 22B:
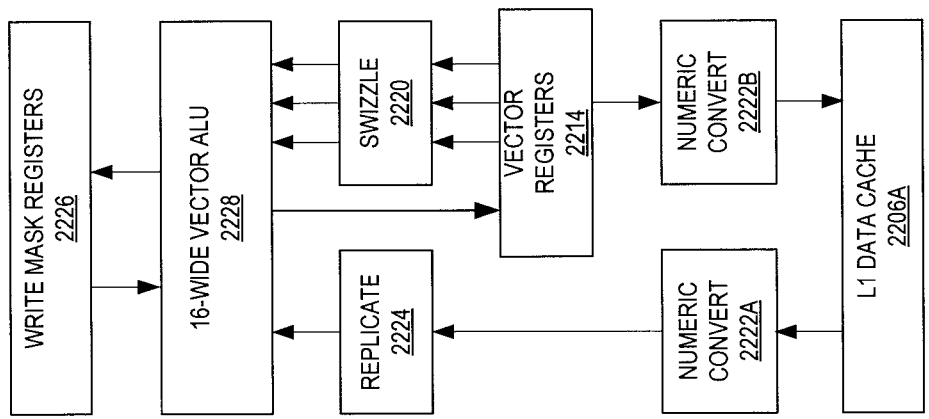
FIG. 22B is an expanded view of part of the processor core in FIG. 22A according to embodiments of the disclosure.
Figure 22A:
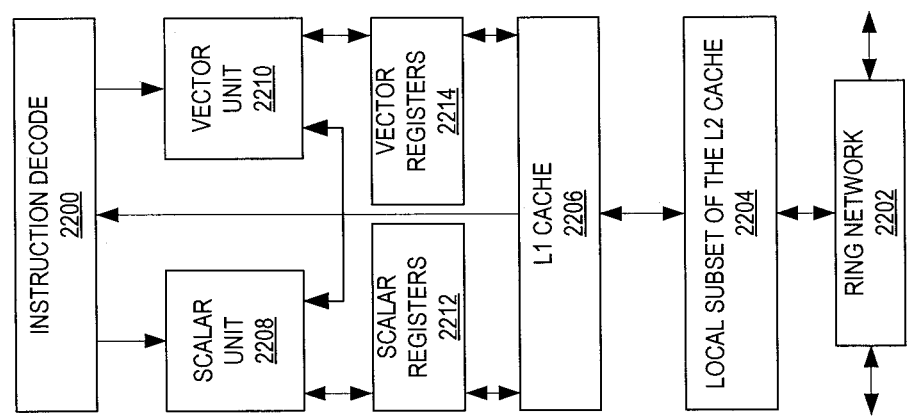
FIG. 22A is a block diagram of a single processor core, along with its connection to the on-die interconnect network and with its local subset of the Level 2 (L2) cache, according to embodiments of the disclosure.

FIGS. 22A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 22A is a block diagram of a single processor core, along with its connection to the on-die interconnect network 2202 and with its local subset of the Level 2 (L2) cache 2204, according to embodiments of the disclosure. In one embodiment, an instruction decode unit 2200 supports the x86 instruction set with a packed data instruction set extension. An L1 cache 2206 allows low-latency accesses to cache memory into the scalar and vector units. While in one embodiment (to simplify the design), a scalar unit 2208 and a vector unit 2210 use separate register sets (respectively, scalar registers 2212 and vector registers 2214) and data transferred between them is written to memory and then read back in from a level 1 (L1) cache 2206, alternative embodiments of the disclosure may use a different approach (e.g., use a single register set or include a communication path that allow data to be transferred between the two register files without being written and read back).

The local subset of the L2 cache 2204 is part of a global L2 cache that is divided into separate local subsets, one per processor core. Each processor core has a direct access path to its own local subset of the L2 cache 2204. Data read by a processor core is stored in its L2 cache subset 2204 and can be accessed quickly, in parallel with other processor cores accessing their own local L2 cache subsets. Data written by a processor core is stored in its own L2 cache subset 2204 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 22B is an expanded view of part of the processor core in FIG. 22A according to embodiments of the disclosure. FIG. 22B includes an L1 data cache 2206A part of the L1 cache 2204, as well as more detail regarding the vector unit 2210 and the vector registers 2214. Specifically, the vector unit 2210 is a 16-wide vector processing unit (VPU) (see the 16-wide ALU 2228), which executes one or more of integer, single-precision float, and double-precision float instructions. The VPU supports swizzling the register inputs with swizzle unit 2220, numeric conversion with numeric convert units 2222A-B, and replication with replication unit 2224 on the memory input. Write mask registers 2226 allow predicating resulting vector writes.

Figure 23:
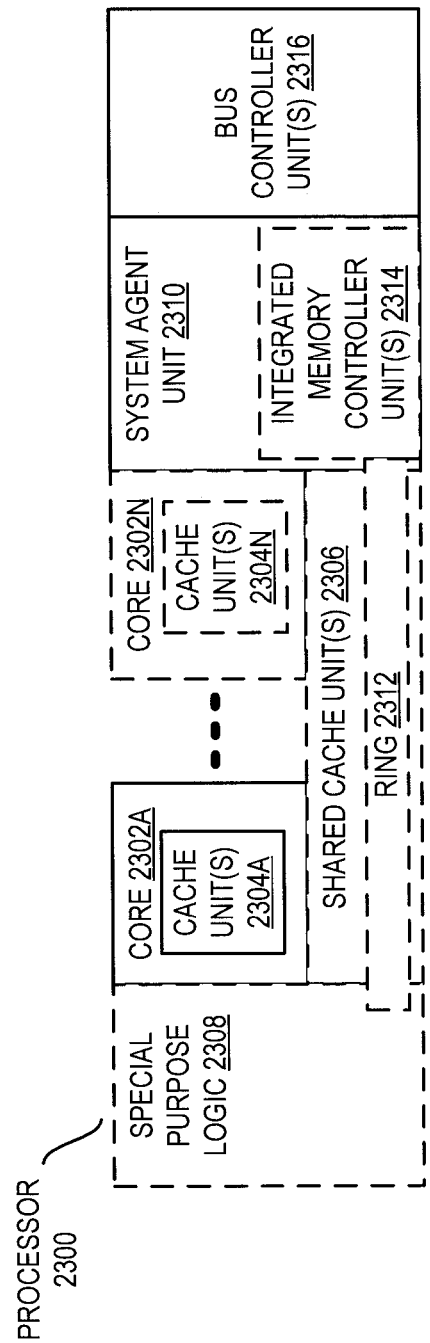
FIG. 23 is a block diagram of a processor that may have more than one core, may have an integrated memory controller, and may have integrated graphics according to embodiments of the disclosure.

FIG. 23 is a block diagram of a processor 2300 that may have more than one core, may have an integrated memory controller, and may have integrated graphics according to embodiments of the disclosure. The solid lined boxes in FIG. 23 illustrate a processor 2300 with a single core 2302A, a system agent 2310, a set of one or more bus controller units 2316, while the optional addition of the dashed lined boxes illustrates an alternative processor 2300 with multiple cores 2302A-N, a set of one or more integrated memory controller unit(s) 2314 in the system agent unit 2310, and special purpose logic 2308.

Thus, different implementations of the processor 2300 may include: 1) a CPU with the special purpose logic 2308 being integrated graphics and/or scientific (throughput) logic (which may include one or more cores), and the cores 2302A-N being one or more general purpose cores (e.g., general purpose in-order cores, general purpose out-of-order cores, a combination of the two); 2) a coprocessor with the cores 2302A-N being a large number of special purpose cores intended primarily for graphics and/or scientific (throughput); and 3) a coprocessor with the cores 2302A-N being a large number of general purpose in-order cores. Thus, the processor 2300 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 2300 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 2306, and external memory (not shown) coupled to the set of integrated memory controller units 2314. The set of shared cache units 2306 may include one or more mid-level caches, such as level 2 (L2), level 3 (L3), level 4 (L4), or other levels of cache, a last level cache (LLC), and/or combinations thereof. While in one embodiment a ring based interconnect unit 2312 interconnects the integrated graphics logic 2308, the set of shared cache units 2306, and the system agent unit 2310/integrated memory controller unit(s) 2314, alternative embodiments may use any number of well-known techniques for interconnecting such units. In one embodiment, coherency is maintained between one or more cache units 2306 and cores 2302-A-N.

In some embodiments, one or more of the cores 2302A-N are capable of multi-threading. The system agent 2310 includes those components coordinating and operating cores 2302A-N. The system agent unit 2310 may include for example a power control unit (PCU) and a display unit. The PCU may be or include logic and components needed for regulating the power state of the cores 2302A-N and the integrated graphics logic 2308. The display unit is for driving one or more externally connected displays.

The cores 2302A-N may be homogenous or heterogeneous in terms of architecture instruction set; that is, two or more of the cores 2302A-N may be capable of execution the same instruction set, while others may be capable of executing only a subset of that instruction set or a different instruction set.

Exemplary Computer Architectures

FIGS. 24-27 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 24:
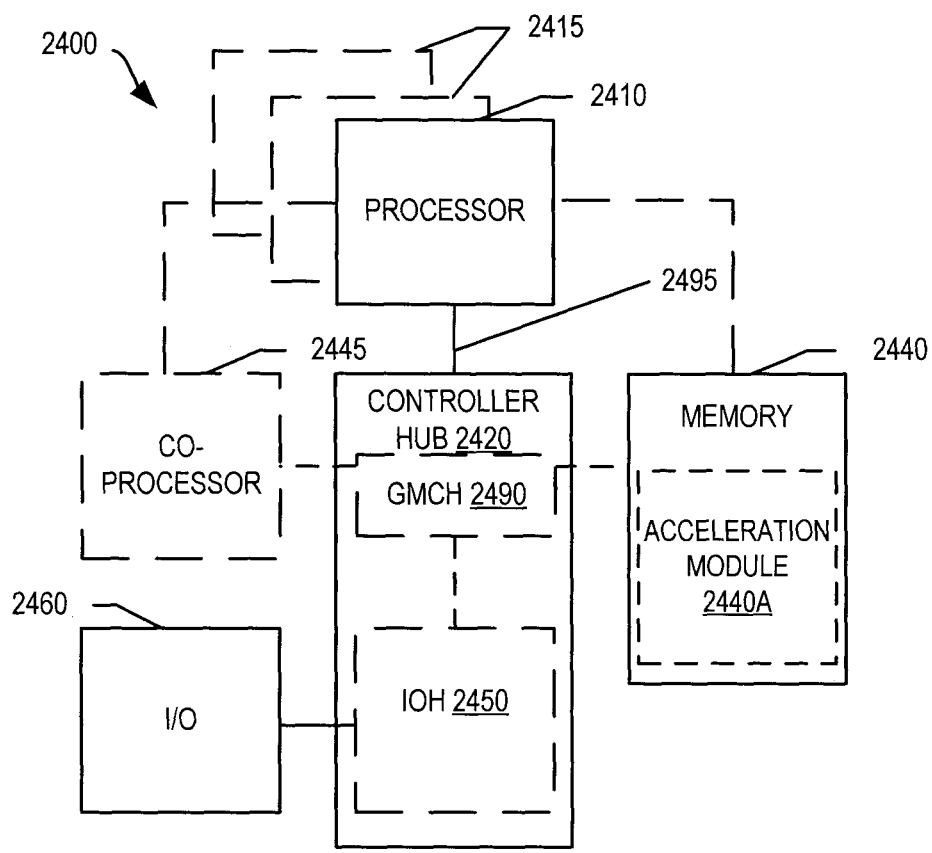
FIG. 24 is a block diagram of a system in accordance with one embodiment of the present disclosure.

Referring now to FIG. 24, shown is a block diagram of a system 2400 in accordance with one embodiment of the present disclosure. The system 2400 may include one or more processors 2410, 2415, which are coupled to a controller hub 2420. In one embodiment the controller hub 2420 includes a graphics memory controller hub (GMCH) 2490 and an Input/Output Hub (IOH) 2450 (which may be on separate chips); the GMCH 2490 includes memory and graphics controllers to which are coupled memory 2440 and a coprocessor 2445; the IOH 2450 is couples input/output (I/O) devices 2460 to the GMCH 2490. Alternatively, one or both of the memory and graphics controllers are integrated within the processor (as described herein), the memory 2440 and the coprocessor 2445 are coupled directly to the processor 2410, and the controller hub 2420 in a single chip with the IOH 2450. Memory 2440 may include an acceleration module 2440A, for example, to store code that when executed causes a processor to perform any method of this disclosure.

The optional nature of additional processors 2415 is denoted in FIG. 24 with broken lines. Each processor 2410, 2415 may include one or more of the processing cores described herein and may be some version of the processor 2300.

The memory 2440 may be, for example, dynamic random access memory (DRAM), phase change memory (PCM), or a combination of the two. For at least one embodiment, the controller hub 2420 communicates with the processor(s) 2410, 2415 via a multi-drop bus, such as a frontside bus (FSB), point-to-point interface such as Quickpath Interconnect (QPI), or similar connection 2495.

In one embodiment, the coprocessor 2445 is a special-purpose processor, such as, for example, a high-throughput MIC processor, a network or communication processor, compression engine, graphics processor, GPGPU, embedded processor, or the like. In one embodiment, controller hub 2420 may include an integrated graphics accelerator.

There can be a variety of differences between the physical resources 2410, 2415 in terms of a spectrum of metrics of merit including architectural, microarchitectural, thermal, power consumption characteristics, and the like.

In one embodiment, the processor 2410 executes instructions that control data processing operations of a general type. Embedded within the instructions may be coprocessor instructions. The processor 2410 recognizes these coprocessor instructions as being of a type that should be executed by the attached coprocessor 2445. Accordingly, the processor 2410 issues these coprocessor instructions (or control signals representing coprocessor instructions) on a coprocessor bus or other interconnect, to coprocessor 2445. Coprocessor (s) 2445 accept and execute the received coprocessor instructions.

Figure 25:
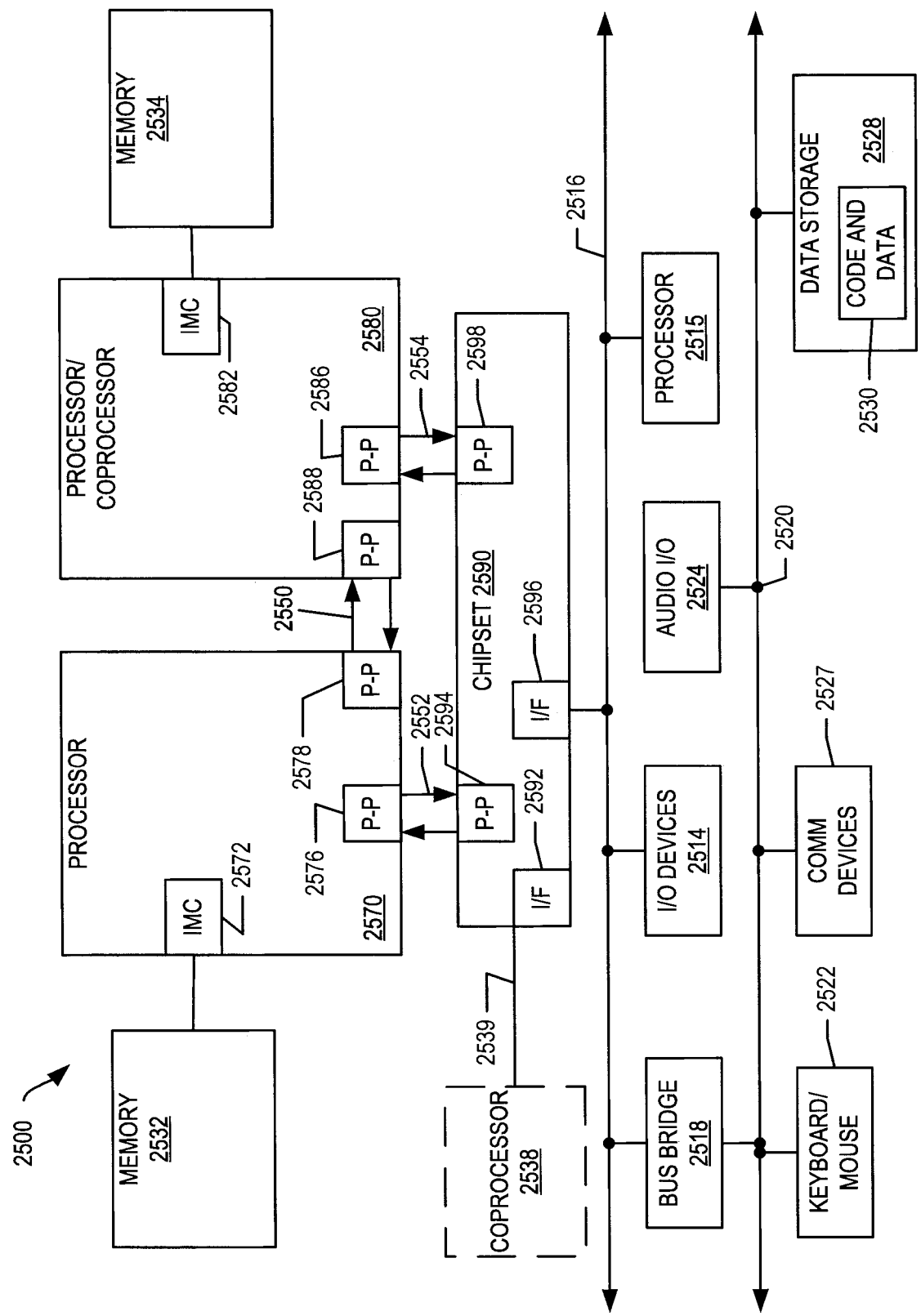
FIG. 25 is a block diagram of a more specific exemplary system in accordance with an embodiment of the present disclosure.

Referring now to FIG. 25, shown is a block diagram of a first more specific exemplary system 2500 in accordance with an embodiment of the present disclosure. As shown in FIG. 25, multiprocessor system 2500 is a point-to-point interconnect system, and includes a first processor 2570 and a second processor 2580 coupled via a point-to-point interconnect 2550. Each of processors 2570 and 2580 may be some version of the processor 2300. In one embodiment of the disclosure, processors 2570 and 2580 are respectively processors 2410 and 2415, while coprocessor 2538 is coprocessor 2445. In another embodiment, processors 2570 and 2580 are respectively processor 2410 coprocessor 2445.

Processors 2570 and 2580 are shown including integrated memory controller (IMC) units 2572 and 2582, respectively. Processor 2570 also includes as part of its bus controller units point-to-point (P-P) interfaces 2576 and 2578; similarly, second processor 2580 includes P-P interfaces 2586 and 2588. Processors 2570, 2580 may exchange information via a point-to-point (P-P) interface 2550 using P-P interface circuits 2578, 2588. As shown in FIG. 25, IMCs 2572 and 2582 couple the processors to respective memories, namely a memory 2532 and a memory 2534, which may be portions of main memory locally attached to the respective processors.

Processors 2570, 2580 may each exchange information with a chipset 2590 via individual P-P interfaces 2552, 2554 using point to point interface circuits 2576, 2594, 2586, 2598. Chipset 2590 may optionally exchange information with the coprocessor 2538 via a high-performance interface 2539. In one embodiment, the coprocessor 2538 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 2590 may be coupled to a first bus 2516 via an interface 2596. In one embodiment, first bus 2516 may be a Peripheral Component Interconnect (PCI) bus, or a bus such as a PCI Express bus or another third generation I/O interconnect bus, although the scope of the present disclosure is not so limited.

As shown in FIG. 25, various I/O devices 2514 may be coupled to first bus 2516, along with a bus bridge 2518 which couples first bus 2516 to a second bus 2520. In one embodiment, one or more additional processor(s) 2515, such as coprocessors, high-throughput MIC processors, GPGPU's, accelerators (such as, e.g., graphics accelerators or digital signal processing (DSP) units), field programmable gate arrays, or any other processor, are coupled to first bus 2516. In one embodiment, second bus 2520 may be a low pin count (LPC) bus. Various devices may be coupled to a second bus 2520 including, for example, a keyboard and/or mouse 2522, communication devices 2527 and a storage unit 2528 such as a disk drive or other mass storage device which may include instructions/code and data 2530, in one embodiment. Further, an audio I/O 2524 may be coupled to the second bus 2520. Note that other architectures are possible. For example, instead of the point-to-point architecture of FIG. 25, a system may implement a multi-drop bus or other such architecture.

Figure 26:
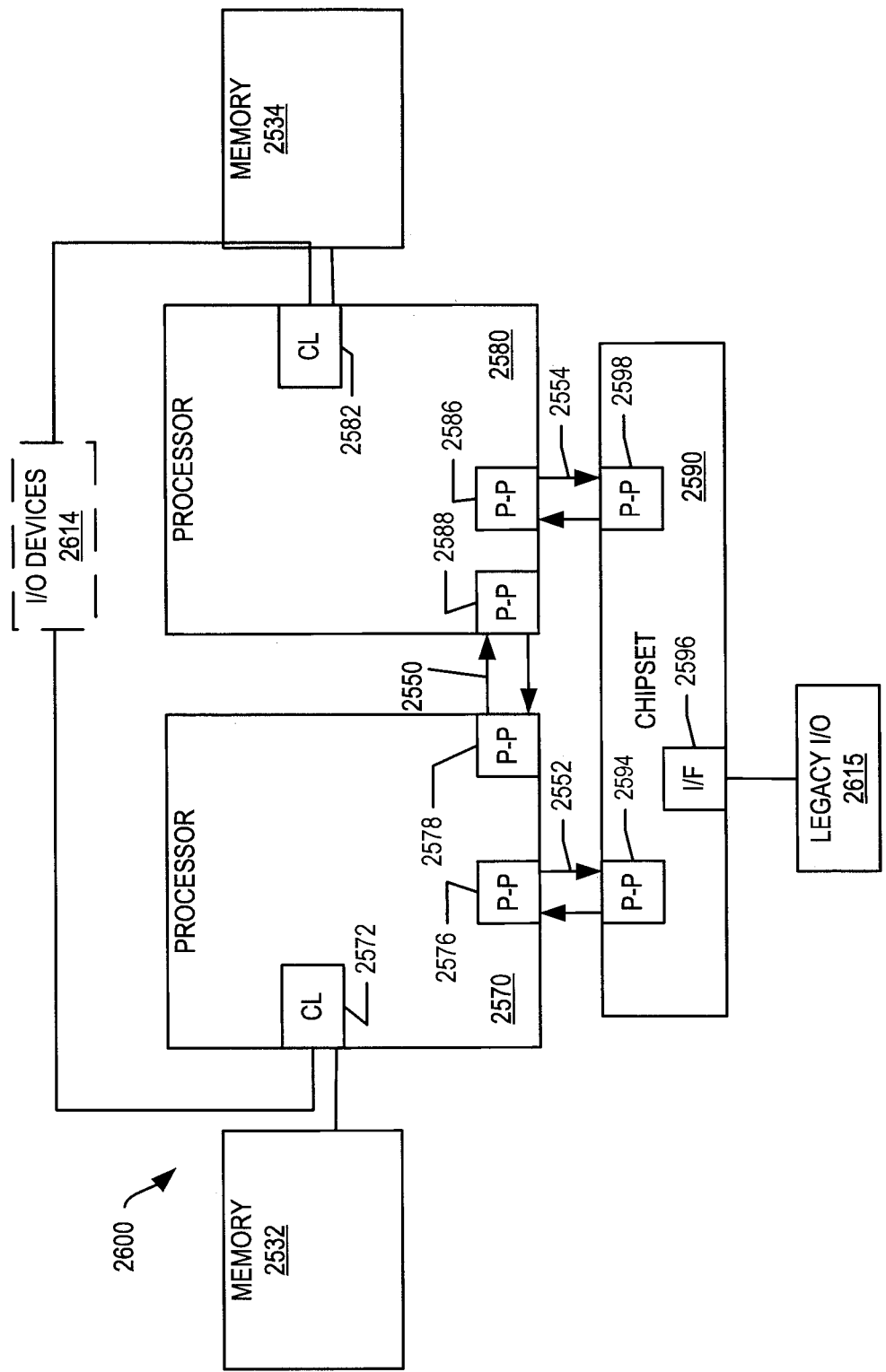
FIG. 26, shown is a block diagram of a second more specific exemplary system in accordance with an embodiment of the present disclosure.

Referring now to FIG. 26, shown is a block diagram of a second more specific exemplary system 2600 in accordance with an embodiment of the present disclosure. Like elements in FIGS. 25 and 26 bear like reference numerals, and certain aspects of FIG. 25 have been omitted from FIG. 26 in order to avoid obscuring other aspects of FIG. 26.

FIG. 26 illustrates that the processors 2570, 2580 may include integrated memory and I/O control logic ("CL") 2572 and 2582, respectively. Thus, the CL 2572, 2582 include integrated memory controller units and include I/O control logic. FIG. 26 illustrates that not only are the memories 2532, 2534 coupled to the CL 2572, 2582, but also that I/O devices 2614 are also coupled to the control logic 2572, 2582. Legacy I/O devices 2615 are coupled to the chipset 2590.

Figure 27:
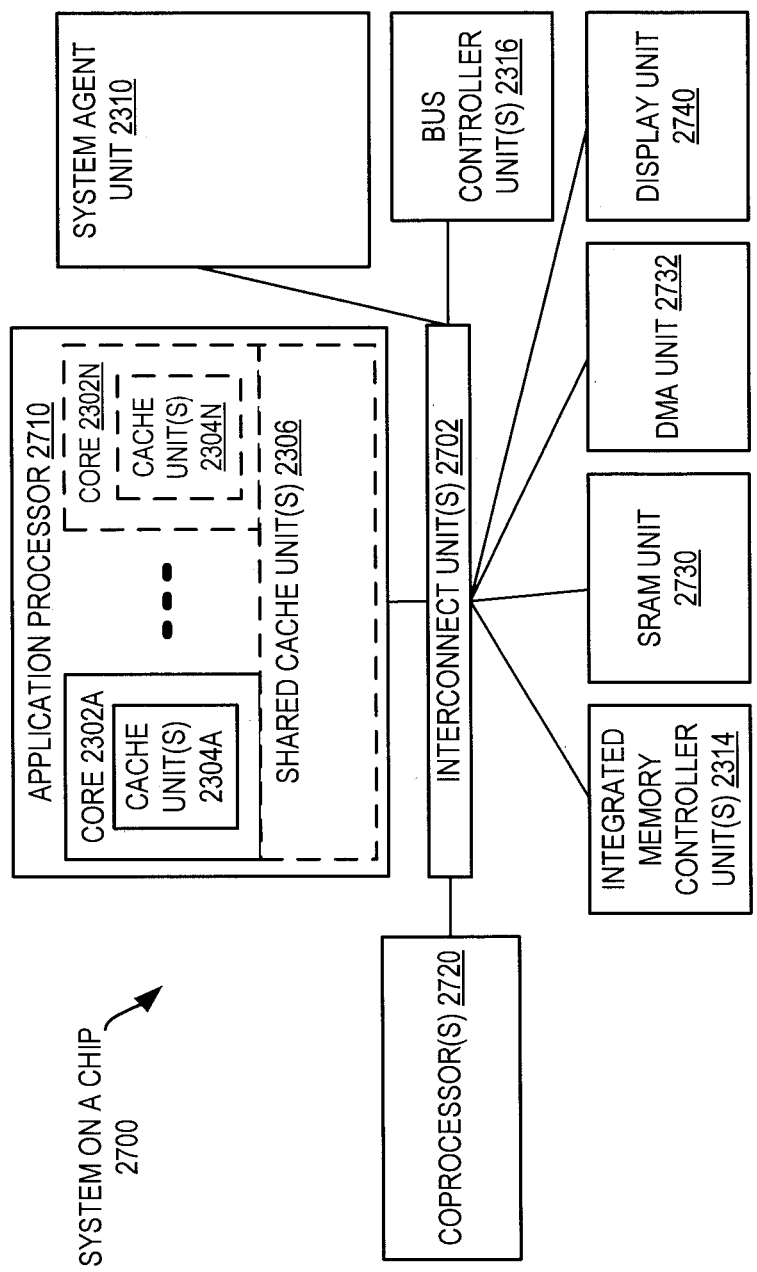
FIG. 27, shown is a block diagram of a system on a chip (SoC) in accordance with an embodiment of the present disclosure.

Referring now to FIG. 27, shown is a block diagram of a SoC 2700 in accordance with an embodiment of the present disclosure. Similar elements in FIG. 23 bear like reference numerals. Also, dashed lined boxes are optional features on more advanced SoCs. In FIG. 27, an interconnect unit(s) 2702 is coupled to: an application processor 2710 which includes a set of one or more cores 202A-N and shared cache unit(s) 2306; a system agent unit 2310; a bus controller unit(s) 2316; an integrated memory controller unit(s) 2314; a set or one or more coprocessors 2720 which may include integrated graphics logic, an image processor, an audio processor, and a video processor; an static random access memory (SRAM) unit 2730; a direct memory access (DMA) unit 2732; and a display unit 2740 for coupling to one or more external displays. In one embodiment, the coprocessor(s) 2720 include a special-purpose processor, such as, for example, a network or communication processor, compression engine, GPGPU, a high-throughput MIC processor, embedded processor, or the like.

Embodiments (e.g., of the mechanisms) disclosed herein may be implemented in hardware, software, firmware, or a combination of such implementation approaches. Embodiments of the disclosure may be implemented as computer programs or program code executing on programmable systems comprising at least one processor, a storage system (including volatile and non-volatile memory and/or storage elements), at least one input device, and at least one output device.

Program code, such as code 2530 illustrated in FIG. 25, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the disclosure also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 28:
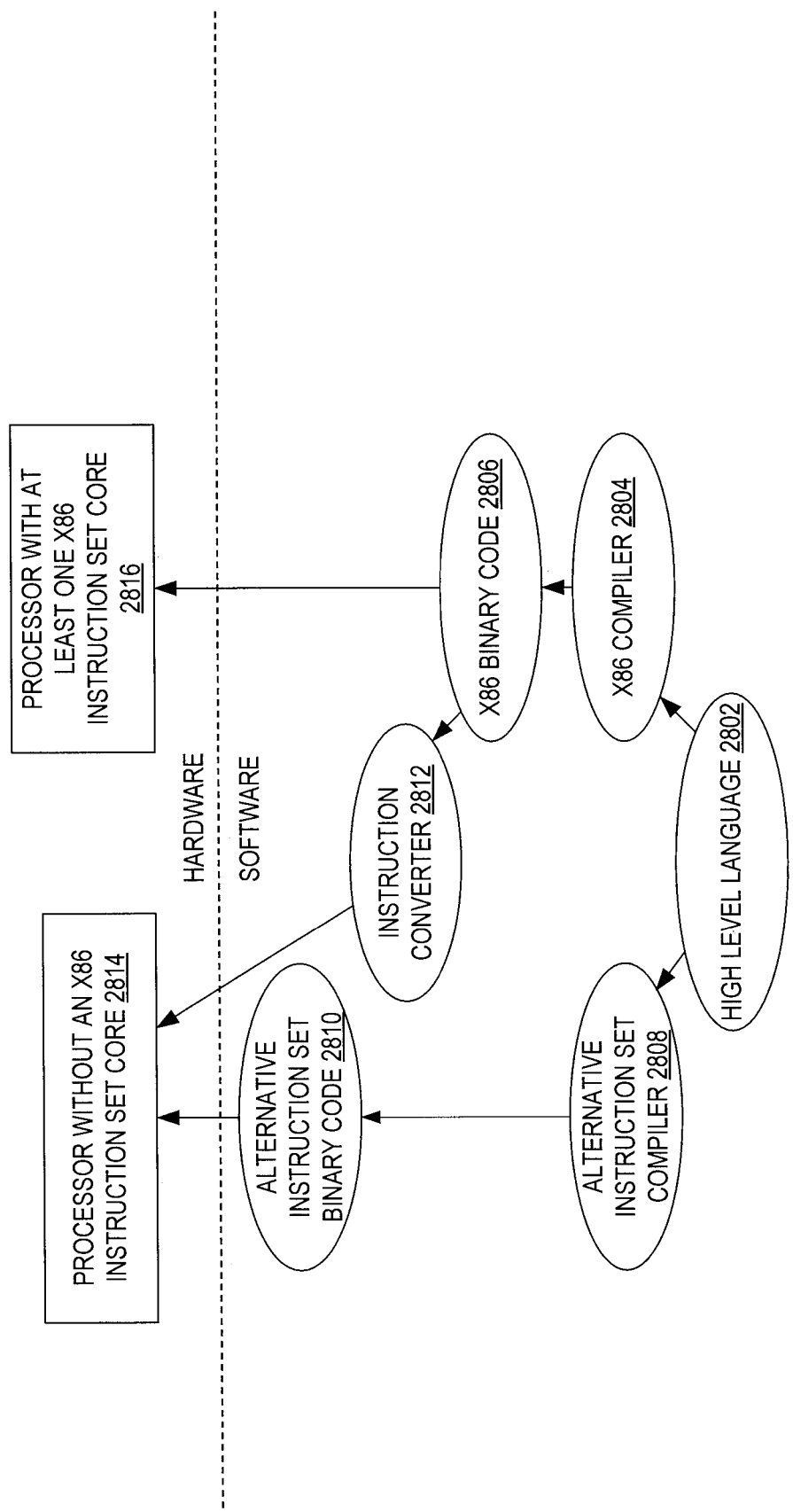
FIG. 28 is a block diagram contrasting the use of a software instruction converter to convert binary instructions in a source instruction set to binary instructions in a target instruction set according to embodiments of the disclosure.

FIG. 28 is a block diagram contrasting the use of a software instruction converter to convert binary instructions in a source instruction set to binary instructions in a target instruction set according to embodiments of the disclosure. In the illustrated embodiment, the instruction converter is a software instruction converter, although alternatively the instruction converter may be implemented in software, firmware, hardware, or various combinations thereof. FIG. 28 shows a program in a high level language 2802 may be compiled using an x86 compiler 2804 to generate x86 binary code 2806 that may be natively executed by a processor with at least one x86 instruction set core 2816. The processor with at least one x86 instruction set core 2816 represents any processor that can perform substantially the same functions as an Intel® processor with at least one x86 instruction set core by compatibly executing or otherwise processing (1) a substantial portion of the instruction set of the Intel® x86 instruction set core or (2) object code versions of applications or other software targeted to run on an Intel® processor with at least one x86 instruction set core, in order to achieve substantially the same result as an Intel® processor with at least one x86 instruction set core. The x86 compiler 2804 represents a compiler that is operable to generate x86 binary code 2806 (e.g., object code) that can, with or without additional linkage processing, be executed on the processor with at least one x86 instruction set core 2816. Similarly, FIG. 28 shows the program in the high level language 2802 may be compiled using an alternative instruction set compiler 2808 to generate alternative instruction set binary code 2810 that may be natively executed by a processor without at least one x86 instruction set core 2814 (e.g., a processor with cores that execute the MIPS instruction set of MIPS Technologies of Sunnyvale, CA and/or that execute the ARM instruction set of ARM Holdings of Sunnyvale, CA). The instruction converter 2812 is used to convert the x86 binary code 2806 into code that may be natively executed by the processor without an x86 instruction set core 2814. This converted code is not likely to be the same as the alternative instruction set binary code 2810 because an instruction converter capable of this is difficult to make; however, the converted code will accomplish the general operation and be made up of instructions from the alternative instruction set. Thus, the instruction converter 2812 represents software, firmware, hardware, or a combination thereof that, through emulation, simulation or any other process, allows a processor or other electronic device that does not have an x86 instruction set processor or core to execute the x86 binary code 2806.

What is claimed is:

1. An apparatus comprising:
a circuit comprising a set of fixed-point multipliers coupled to a set of shift registers coupled to a set of numeric conversion circuits coupled to a set of adders, and a maximum exponent determiner coupled to the set of shift registers and a normalization circuit to produce a resultant; and
at least one switch to change the circuit between a first mode and a second mode, wherein:
in the first mode, each fixed-point multiplier of the set of fixed-point multipliers is to multiply mantissas from a same element position of a first floating-point vector and a second floating-point vector to produce a corresponding product, shift corresponding products with the set of shift registers based on a maximum exponent of exponents for the corresponding products determined by the maximum exponent determiner to produce shifted products, perform a numeric conversion operation on the shifted products with the set of numeric conversion circuits based on sign bits from the same element position of the first floating-point vector and the second floating-point vector to produce signed representations of the shifted products, add the signed representations of the shifted products with the set of adders to produce a single product, and normalize the single product with the normalization circuit based on the maximum exponent into a single floating-point resultant, and
in the second mode, each fixed-point multiplier of the set of fixed-point multipliers is to multiply values from a same element position of a first integer vector and a second integer vector to produce a corresponding product, pass the products through the set of shift registers and the set of numeric conversion circuits to the set of adders without changing the products, add each corresponding product with the set of adders to produce a single integer resultant, and pass the single integer resultant through the normalization circuit without changing the single integer resultant.

2. The apparatus of claim 1, further comprising an accumulator circuit that comprises:
a floating-point adder circuit that adds the single floating-point resultant to a previously generated, single floating-point resultant when the circuit is in the first mode; and
a fixed-point adder circuit that adds the single integer resultant to a previously generated, single integer resultant when the circuit is in the second mode.

3. The apparatus of claim 1, wherein the normalization circuit comprises a rounding circuit to round the single product.

4. The apparatus of claim 1, further comprising an accumulator circuit that comprises a fixed-point adder circuit to add the single product from the set of adders to a previously generated, single product from the set of adders to produce an accumulated product, and normalize the accumulated product with the normalization circuit based on the maximum exponent into the single floating-point resultant when the circuit is in the first mode.

5. The apparatus of claim 1, further comprising a second instance of the circuit, and the circuit is a first instance of the circuit, wherein the first instance of the circuit operates on a first proper subset of the first floating-point vector having a first maximum exponent and the second instance of the circuit operates on a second proper subset of the second floating-point vector having a second maximum exponent when the circuit is in the first mode.

6. The apparatus of claim 5, wherein the first maximum exponent and the second maximum exponent are both multiples of a whole number greater than three.

7. The apparatus of claim 5, further comprising a sorter circuit to sort the corresponding products from each fixed-point multiplier of the set of fixed-point multipliers before shifting each corresponding product with the set of shift registers.

8. The apparatus of claim 1, further comprising a set of rounding circuits between the set of shift registers and the set of numeric conversion circuits to round the shifted products.

9. A method comprising:
switching a circuit comprising a set of fixed-point multipliers coupled to a set of shift registers coupled to a set of numeric conversion circuits coupled to a set of adders, and a maximum exponent determiner coupled to the set of shift registers and a normalization circuit from a first mode to a second mode with at least one switch;
in the first mode, each fixed-point multiplier of the set of fixed-point multipliers multiplying mantissas from a same element position of a first floating-point vector and a second floating-point vector to produce a corresponding product, shifting corresponding products with the set of shift registers based on a maximum exponent of exponents for the corresponding products determined by the maximum exponent determiner to produce shifted products, performing a numeric conversion operation on the shifted products with the set of numeric conversion circuits based on sign bits from the same element position of the first floating-point vector and the second floating-point vector to produce signed representations of the shifted products, adding the signed representations of the shifted products with the set of adders to produce a single product, and normalizing the single product with the normalization circuit based on the maximum exponent into a single floating-point resultant; and in the second mode, each fixed-point multiplier of the set of fixed-point multipliers multiplying values from a same element position of a first integer vector and a second integer vector to produce a corresponding product, passing the products through the set of shift registers and the set of numeric conversion circuits to the set of adders without changing the products, adding each corresponding product with the set of adders to produce a single integer resultant, and passing the single integer resultant through the normalization circuit without changing the single integer resultant.

10. The method of claim 9, further comprising:

adding the single floating-point resultant to a previously generated, single floating-point resultant with a floating-point adder circuit when the circuit is in the first mode; and adding the single integer resultant to a previously generated, single integer resultant with a fixed-point adder circuit when the circuit is in the second mode.

11. The method of claim 9, further comprising rounding the single product with a rounding circuit.

12. The method of claim 9, further comprising adding the single product from the set of adders to a previously generated, single product from the set of adders with a fixed-point adder circuit to produce an accumulated product, and normalizing the accumulated product with the normalization circuit based on the maximum exponent into the single floating-point resultant when the circuit is in the first mode.

13. The method of claim 9, comprising, when the circuit is in the first mode, operating on a first proper subset of the first floating-point vector having a first maximum exponent with the circuit, and operating on a second proper subset of the second floating-point vector having a second maximum exponent with a second instance of the circuit.

14. The method of claim 13, wherein the first maximum exponent and the second maximum exponent are both multiples of a whole number greater than three.

15. The method of claim 13, further comprising sorting the corresponding products from each fixed-point multiplier of the set of fixed-point multipliers with a sorter circuit before shifting each corresponding product with the set of shift registers.

16. The method of claim 9, further comprising rounding the shifted products with a set of rounding circuits between the set of shift registers and the set of numeric conversion circuits.

17. A non-transitory machine readable medium that stores code that when executed by a machine causes the machine to perform a method comprising:

switching a circuit comprising a set of fixed-point multipliers coupled to a set of shift registers coupled to a set of numeric conversion circuits coupled to a set of adders, and a maximum exponent determiner coupled to the set of shift registers and a normalization circuit from a first mode to a second mode with at least one switch;

in the first mode, each fixed-point multiplier of the set of fixed-point multipliers multiplying mantissas from a same element position of a first floating-point vector and a second floating-point vector to produce a corresponding product, shifting corresponding products with the set of shift registers based on a maximum exponent of exponents for the corresponding products determined by the maximum exponent determiner to produce shifted products, performing a numeric conversion operation on the shifted products with the set of numeric conversion circuits based on sign bits from the same element position of the first floating-point vector and the second floating-point vector to produce signed representations of the shifted products, adding the signed representations of the shifted products with the set of adders to produce a single product, and normalizing the single product with the normalization circuit based on the maximum exponent into a single floating-point resultant; and in the second mode, each fixed-point multiplier of the set of fixed-point multipliers multiplying values from a same element position of a first integer vector and a second integer vector to produce a corresponding product, passing the products through the set of shift registers and the set of numeric conversion circuits to the set of adders without changing the products, adding each corresponding product with the set of adders to produce a single integer resultant, and passing the single integer resultant through the normalization circuit without changing the single integer resultant.

18. The non-transitory machine readable medium of claim 17, further comprising:

adding the single floating-point resultant to a previously generated, single floating-point resultant with a floating-point adder circuit when the circuit is in the first mode; and adding the single integer resultant to a previously generated, single integer resultant with a fixed-point adder circuit when the circuit is in the second mode.

19. The non-transitory machine readable medium of claim 17, further comprising rounding the single product with a rounding circuit.

20. The non-transitory machine readable medium of claim 17, further comprising adding the single product from the set of adders to a previously generated, single product from the set of adders with a fixed-point adder circuit to produce an accumulated product, and normalizing the accumulated product with the normalization circuit based on the maximum exponent into the single floating-point resultant when the circuit is in the first mode.

21. The non-transitory machine readable medium of claim 17, comprising, when the circuit is in the first mode, operating on a first proper subset of the first floating-point vector having a first maximum exponent with the circuit, and operating on a second proper subset of the second floating-point vector having a second maximum exponent with a second instance of the circuit.

22. The non-transitory machine readable medium of claim 21, wherein the first maximum exponent and the second maximum exponent are both multiples of a whole number greater than three.

23. The non-transitory machine readable medium of claim 21, further comprising sorting the corresponding products from each fixed-point multiplier of the set of fixed-point multipliers with a sorter circuit before shifting each corresponding product with the set of shift registers.

24. The non-transitory machine readable medium of claim 17, further comprising rounding the shifted products with a set of rounding circuits between the set of shift registers and the set of numeric conversion circuits.

25. An apparatus comprising:

a circuit comprising a set of fixed-point multipliers coupled to a set of shift registers coupled to a set of numeric conversion circuits coupled to a set of adders, and a maximum exponent determiner coupled to the set of shift registers and a normalization circuit to produce a resultant; and means to change the circuit between a first mode and a second mode, wherein:

in the first mode, each fixed-point multiplier of the set of fixed-point multipliers is to multiply mantissas from a same element position of a first floating-point vector and a second floating-point vector to produce a corresponding product, shift corresponding products with the set of shift registers based on a maximum exponent of exponents for the corresponding products determined by the maximum exponent determiner to produce shifted products, perform a numeric conversion operation on the shifted products with the set of numeric conversion circuits based on sign bits from the same element position of the first floating-point vector and the second floating-point vector to produce signed representations of the shifted products, add the signed representations of the shifted products with the set of adders to produce a single product, and normalize the single product with the normalization circuit based on the maximum exponent into a single floating-point resultant, and in the second mode, each fixed-point multiplier of the set of fixed-point multipliers is to multiply values from a same element position of a first integer vector and a second integer vector to produce a corresponding product, pass the products through the set of shift registers and the set of numeric conversion circuits to the set of adders without changing the products, add each corresponding product with the set of adders to produce a single integer resultant, and pass the single integer resultant through the normalization circuit without changing the single integer resultant.

\* \* \* \* \*